United States Patent
Kumar et al.

(10) Patent No.: US 11,054,343 B2
(45) Date of Patent: Jul. 6, 2021

(54) SYSTEMS, DEVICES AND METHODS FOR TESTING SUBSTRATES TO EVALUATE WOUND CLOSURE PRODUCTS

(71) Applicant: Ethicon, Inc., Somerville, NJ (US)

(72) Inventors: Amitha Anand Kumar, Summit, NJ (US); Glenn R. Cook, Clinton, NJ (US); Julian Quintero, Flemington, NJ (US); Shane A. Lacy, Bound Brook, NJ (US)

(73) Assignee: Ethicon, Inc., Somerville, NJ (US)

( * ) Notice: Subject to any disclaimer, the term of this patent is extended or adjusted under 35 U.S.C. 154(b) by 444 days.

(21) Appl. No.: 16/122,252

(22) Filed: Sep. 5, 2018

(65) Prior Publication Data
US 2020/0072708 A1    Mar. 5, 2020

(51) Int. Cl.
*G01M 99/00*    (2011.01)

(52) U.S. Cl.
CPC .................. *G01M 99/008* (2013.01)

(58) Field of Classification Search
CPC .... G01M 99/008; G01M 99/007; G09B 23/32
See application file for complete search history.

(56) References Cited

U.S. PATENT DOCUMENTS

| | | | |
|---|---|---|---|
| 1,479,297 A * | 1/1924 | Harris | A61F 2/60 623/30 |
| 3,551,915 A * | 1/1971 | Woodall | A61F 2/60 623/38 |

(Continued)

FOREIGN PATENT DOCUMENTS

| | | |
|---|---|---|
| CN | 204890013 | 12/2015 |
| CN | 105748157 | 7/2016 |
| WO | 01/32080 | 5/2001 |

OTHER PUBLICATIONS

Ross et al., "Thigh and Calf Girth Following Knee Injury and Surgery," Journal of Orthopaedic & Sports Physical Therapy, Jan. 1998, pp. 9-15, vol. 27, No. 1, US.

Munk et a., "Early Recovery After Fast-Track Oxford Unicompartmental Knee Arthroplasty," Acta Othopaedic, Feb. 2012, pp. 41-41, vol. 83 (1).

(Continued)

*Primary Examiner* — Suman K Nath

(57) ABSTRACT

A system for testing substrates includes a first elongated member including an outer end, an inner end, an outer surface that extends between the outer and inner ends, and a concave surface at the inner end, and a second elongated member including an outer end, an inner end, an outer surface that extends between the outer and inner ends of the second elongated member, and a convex surface at the inner end of the second elongated member that opposes the concave surface at the inner end of the first elongated member. A joint interconnects the first and second elongated members for guiding sliding movement of the concave surface of the first elongated member over the convex surface of the second elongated member between extended and flexed positions. A first clamping assembly is coupled with the first elongated member and at least one first clamping assembly spring normally urges the first clamping assembly away from the inner end of the first elongated member. A second clamping assembly is coupled with the second elongated member and at least one second clamping assembly spring normally urges the second clamping assembly away from the inner end of the second elongated member. A substrate overlying the outer surfaces of the first and second elongated members has a first end secured to the first clamping assembly and a second end secured to the second clamping assembly.

25 Claims, 40 Drawing Sheets

(56) References Cited

U.S. PATENT DOCUMENTS

| | | | |
|---|---|---|---|
| 3,755,920 | A | 9/1973 | Smrcka |
| 4,850,877 | A | 7/1989 | Mason et al. |
| 7,748,984 | B2 | 7/2010 | McAllister et al. |
| 8,425,234 | B2 | 4/2013 | Sakezles |
| 2005/0075594 | A1* | 4/2005 | Hepburn ............... A61F 5/0125 602/16 |
| 2016/0089571 | A1* | 3/2016 | Wesley ................ A61B 5/4528 482/8 |
| 2018/0360636 | A1* | 12/2018 | Rahman ................. A61F 5/013 |

OTHER PUBLICATIONS

Tognetti et al., "Wearable Goniometer and Accelerometer Sensory Fusion for Knee Joint Angle Measurement in Daily Life," Nov. 2015, Sensors 2015, pp. 28435-29455, Italy.

Lisa Coles, "Functional Kinematic Study of Knee Replacement: The Effect of Implant Design and alignment on the Patellofemoral Joint," 2014, Ph.D., University of Bath, 252 pages.

Coles et al., "In Vitro Method of Assessing the Biomechanics of the Patellofemoral Joint Following Total Knee Arthroplasty," Proceedings of the Institution of Mechanical Engineers, Part H—Journal of Engineering in Medicine, 2014, vol. 228, No. 12, pp. 1217.

Mathew Francis Moran, "Computational and Experimental Assessment of Total Knee Replacement Motion," The Pennsylvania State University, The Graduate School, College of Health and Human Development, Aug. 2005, 187 pages.

Balint et al., "Design and Mechanical Evaluation of a Novel Fiber-Reinforced Scaffold for Meniscus Replacement," J. Biomed. Mater. Res. Part A, 2012, 100A, pp. 195-202.

Kadimcherla et al., "Knee Arthrotomy Closure With Barbed Suture in Flexion Versus Extension: A Porcine Study," The Journal of Arthroplasty 29, 2014, pp. 2211-2213.

Vakil et al., "Knee Arthrotomy Repair With a Continuous Barbed Suture: A Biomechanical Study," The Journal of Arthroplasty, 2011, vol. 26, No. 5, pp. 710-713.

International Search Report issued by the International Searching Authority in corresponding International Application No. PCT/IB2019/057244, dated Dec. 12, 2019, 3 pages.

* cited by examiner

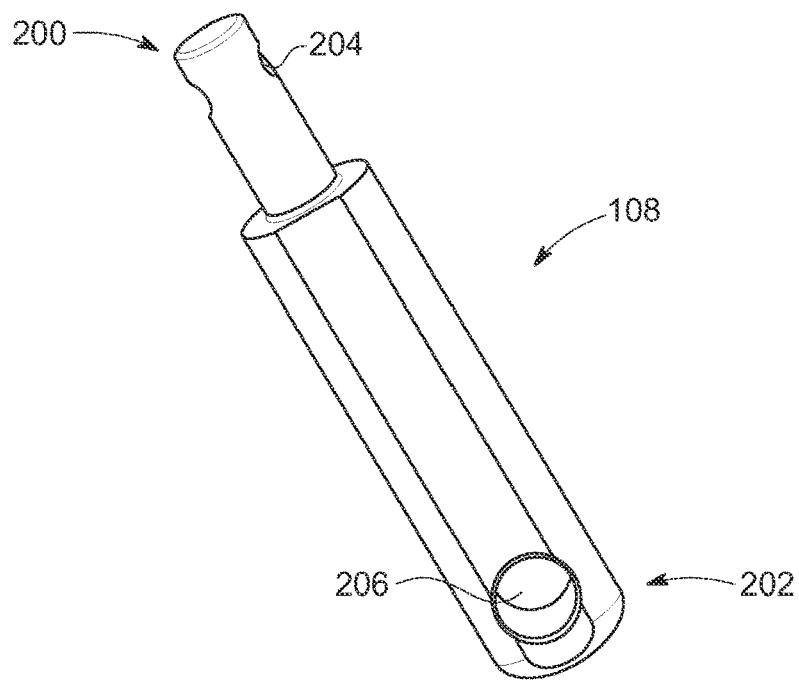
FIG. 9A
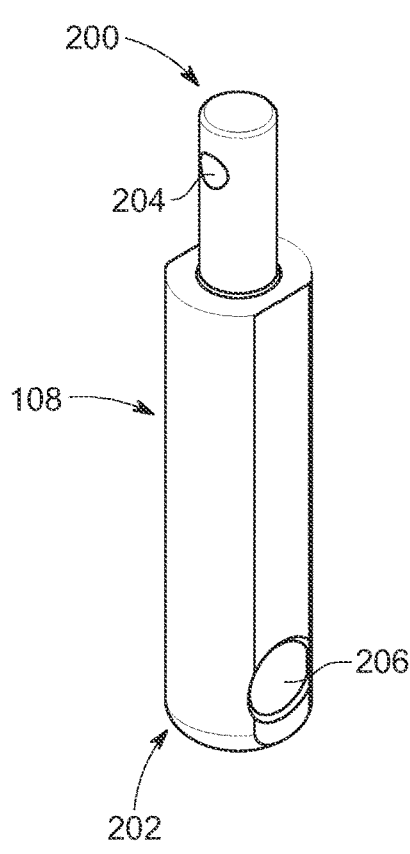 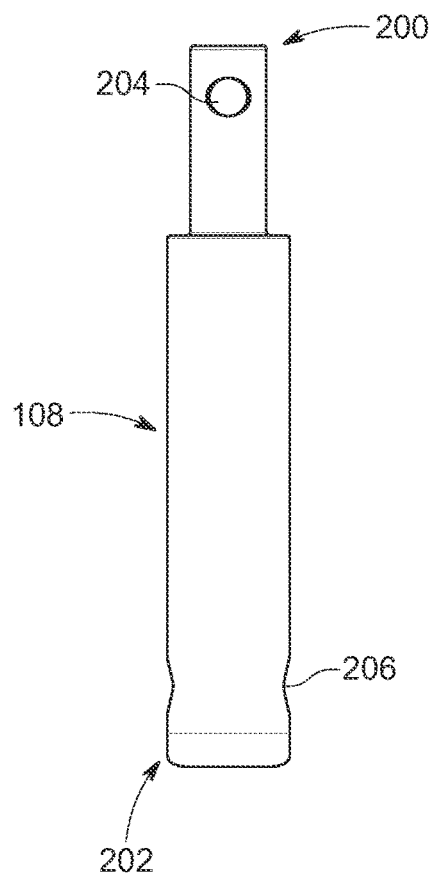
FIG. 9B          FIG. 9C

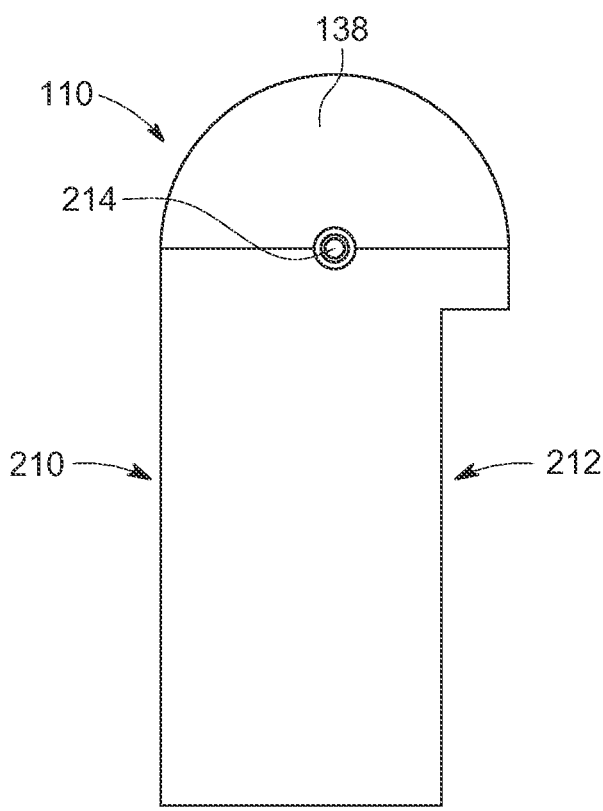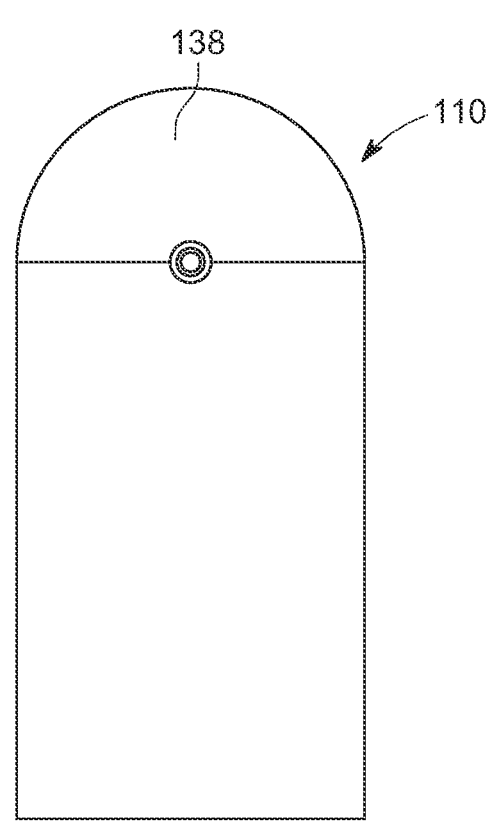
FIG. 13A  FIG. 13B
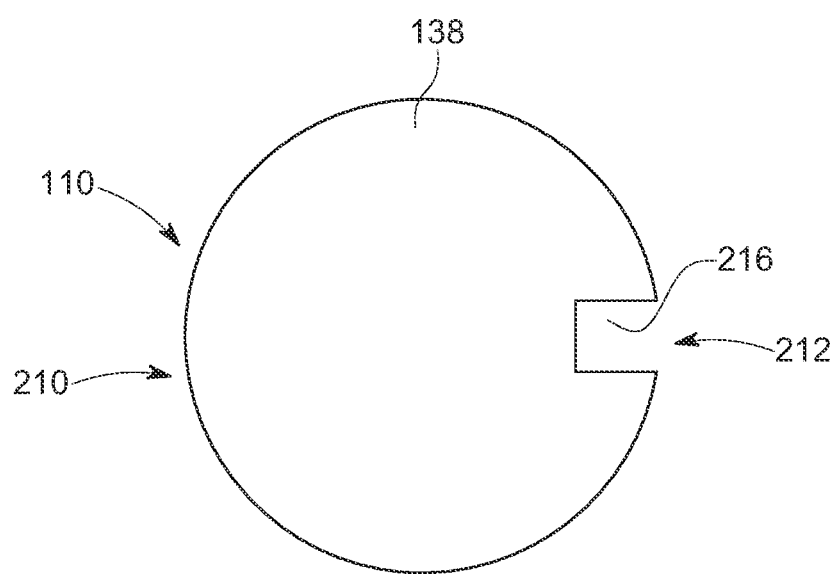
FIG. 13C

SYSTEMS, DEVICES AND METHODS FOR TESTING SUBSTRATES TO EVALUATE WOUND CLOSURE PRODUCTS

BACKGROUND OF THE INVENTION

Field of the Invention

The present patent application is generally related to surgical procedures and medical devices, and is more specifically related to systems, devices and methods for testing substrates to evaluate wound closure products used on knees and flexible joints.

Description of the Related Art

At present, there are a lack of mechanical systems and models having flexible joints for accurately assessing wound closure products used post-operatively on knees and flexible joints.

Animals have four legs and hence cannot be effectively utilized to evaluate wound closure products used to close surgical openings on human knees and joints. Moreover, current bench top models and testing systems are primarily directed to evaluating orthopedic implants such as knee and joint replacement implants so that there are no known bench top models and testing systems that may be used for assessing wound closure products. The lack of both satisfactory animal models and relevant bench top models forces medical evaluators to conduct expensive clinical trials, which may not be feasible for evaluating every type and/or iteration of wound closure product.

Thus, there is a continuing need for bench top models, mechanical systems, and methods that may be used for evaluating wound closure products used to close surgical openings on human knees and flexible joints. There is also a need for bench top models, mechanical systems, and methods that may be used to evaluate products during product development. Moreover, there is a need for bench top models, mechanical systems, and methods that may be used to demonstrate the effectiveness of different types of wound closure products to medical personnel.

SUMMARY OF THE INVENTION

Animal skin is not as flexible and deformable as human skin. A clinical study was conducted on fifteen humans to measure skin deformation (i.e., strain) during flexion of the human knee. The study indicated that tensile strain averaged about 63.8±10.2%. See Skin Strain Measurement During Knee Flexion Using 3D Optical Imaging, Human Clinical Study AST-2011-0289. In contrast, porcine (i.e., pig) skin tissue used as a substrate in knee models deforms only about 5-10%. Thus, it has been a great challenge to identify animal tissues and/or or develop synthetic substrates that have a similar kind of deformation profile as human skin over joints (e.g., the knee).

In order to compensate for the limited deformation of porcine skin tissue, in one embodiment, a system for testing substrates, such as porcine skin and tissue substrates, preferably includes spring-loaded clamping assemblies that are used with a knee model having a flexible joint. In one embodiment, each spring-loaded clamping assembly preferably includes a serrated nylon machined part that is used with a metal torque strap to fix tissue to the clamping assembly. In one embodiment, springs, such as compression springs, compensate for the limited deformation of the animal tissue by allowing the clamping assembly and tissue substrate to slide back and forth on the knee model during knee flexion and extension cycles.

In one embodiment, a system is used for testing substrates that have been subjected to wound closure protocols and/or wound closure products such as wound closure adhesives, adhesively attached tapes and/or meshes, sutures, staples, and combinations of mesh patches and topical skin adhesives. In one embodiment, a skin closure system and/or wound closure product may be the system sold by Ethicon, Inc. of Somerville, N.J. under the trademark DERMA-BOND™ PRINEO™ Skin Closure System. In one embodiment, the system includes a flexible joint, such as a mechanical knee or elbow joint that is used for testing substrates that have been treated with one or more wound closure products in order to evaluate the performance of the one or more wound closure products. In one embodiment, the systems, devices and methods disclosed herein may be used to evaluate and/or identify wound closure products that effectively keep opposing skin edges approximated during simulated postoperative rehabilitation exercises. In one embodiment, the wound closure products are evaluate to determine which wound closure products exhibit maximum tissue holding strength.

In one embodiment, the systems, devices and methods disclosed herein may be used across different projects to evaluate the performance of a wide range of skin closure devices and/or wound closure products (e.g., sutures v. mesh patch/topical skin adhesive combinations).

In one embodiment, a system may include a first generally cylindrical elongated member having a semi-spherical convex terminus, and a second generally cylindrical elongated member having a semispherical concave terminus that is adapted to slidably rotate around the semi-spherical convex terminus of the first member. In one embodiment, the first and second members are attached to each other at the convex and concave surfaces in a flexing relationship. In one embodiment, the first and second elongated members may be made of metal.

In one embodiment, a motorized actuator (e.g., an INSTRON® tester, a Material Testing System (MTS), or a Fatigue tester)) may be coupled with the first and second elongated members to flex and extend a first elongated member relative to a second elongated member from an angle of about 0-10 degrees to an angle of about 120-150 degrees against the second cylinder and back for multiple cycles (e.g., hundreds, thousands, or hundreds of thousands of cycles).

In one embodiment, outer surfaces of the first and second elongated members are at least partially covered by an elongated substrate (e.g., a polymer substrate modeled on animal tissue or skin; actual animal tissue or skin).

In one embodiment, a system for testing substrates preferably includes first and second elongated members that have outer diameters that are similar in size to the diameters found in human limbs.

In one embodiment, a system for testing substrates preferably includes at least two substrate clamping assemblies that are disposed about the respective first and the second elongated members and that are configured to secure and immobilize ends of the substrate.

In one embodiment, a system for testing substrates preferably includes an expandable bladder that may be disposed between an elongated substrate strip and the outer surfaces of the first and second elongated members. The expandable bladder may be located in the area of the convex and concave termini of the respective first and second elongated members. In one embodiment, the expandable bladder may be configured to be filled with a filler (e.g., gel, a saline solution), to expand in volume, and to reduce in volume to simulate post-surgical swelling and subsiding of swelling of a joint (e.g., a knee joint).

In one embodiment, the outer ends of the first and second elongated members that are opposite the opposing concave and convex termini may have flexing or pivoting external connectors coupled thereto for connecting to an actuator or to an immobilized or stationary support.

In one embodiment, the substrate strip has wound closure components disposed thereon. In one embodiment, the wound closure components may include but are not limited to sutures, staples, skin adhesives, adhesive patches, and/or mesh patch/topical skin adhesive combinations.

In one embodiment, a system preferably includes a mechanical model having a flexible joint, such as a human knee model, that may be used to evaluate the efficacy of wound closure products on substrates (e.g., polymer materials, porcine tissue) such as tissue adhesives, mesh/adhesive systems, sutures, and surgical staples.

In one embodiment, the mechanical model may be used to simulate post-operative rehabilitation exercises in order to assess the effectiveness of wound closure products.

In one embodiment, a system preferably includes a human knee model having a flexible joint. In one embodiment, a substrate such as porcine skin may be attached to the human knee model. In turn, the human knee model may be attached to a mechanical tester such as an INSTRON® material testing machine to simulate the human knee movement associated with postoperative rehabilitation following knee surgery.

In one embodiment, the system may be used to closely match the tissue approximation forces to human cadaver knee at various flexion angles. A material testing machine may be programmed to use the model to simulate knee motion for several fatigue cycles. Each cycle may be programmed to simulate knee flexion between about 5-120 degrees.

In one embodiment, a silicon breast implant may be used as a bladder to simulate post-operative swelling.

In one embodiment, a system for testing substrates preferably includes a first elongated member having an outer end and an inner end, and a second elongated member having an outer end and an inner end that opposes the inner end of the first elongated member. In one embodiment, a joint preferably interconnects the first elongated member with the second elongated member for enabling the first and second elongated members to move relative to one another.

In one embodiment, the system preferably includes a first clamping assembly that is coupled with the first elongated member. In one embodiment, the first clamping assembly preferably includes at least one first clamping assembly spring that normally urges the first clamping assembly away from the inner end of the first elongated member.

In one embodiment, the system preferably includes a second clamping assembly that is coupled with the second elongated member. In one embodiment, the second clamping assembly preferably has at least one second clamping assembly spring that normally urges the second clamping assembly away from the inner end of the first second elongated member.

In one embodiment, the inner end of the first elongated member has a concave surface and the inner end of the second elongated member has a convex surface that opposes the concave surface of the first elongated member. In one embodiment, the concave surface of the first elongated member and the convex surface of the second elongated member are adapted to slide over one another as the first and second elongated members move relative to one another.

In one embodiment, the concave surface at the inner end of the first elongated member includes a semi-spherical concave surface. In one embodiment, the convex surface at the inner end of the second elongated member includes a semi-spherical convex surface.

In one embodiment, the joint may be a hinge joint that limits flexing and extending movement of the first and second elongated members to one axis when moving between an extended configuration and a flexed configuration.

In one embodiment, the hinge joint may include a first end that is fixedly secured to the first elongated member, and a second end that is pivotally secured to the second elongated member. In one embodiment, the second end of the hinge joint preferably has an opening, and a pivot pin may extend laterally through the second elongated member and the opening at the second end of the hinge joint for pivotally securing the first elongated member to the second elongated member.

In one embodiment, a system may include a substrate having a first end secured to the first clamping assembly, a second end secured to the second clamping assembly, and an intermediate section overlying the joint, whereby the substrate overlies and conforms to the outer surfaces of the respective first and second elongated members.

In one embodiment, the substrate may include pliable materials such as polymer materials, human tissue, human skin, animal tissue, and/or animal skin.

In one embodiment, the first clamping assembly may include a first roughened surface (e.g., teeth). In one embodiment, a system may have at least one first clamping assembly locking band for securing a first end of the substrate against the first roughened surface.

In one embodiment, the second clamping assembly may include a second roughened surface (e.g., teeth). In one embodiment, a system may have at least one second clamping assembly locking band for securing a second end of the substrate against the second roughened surface.

In one embodiment, the outer surface of the first elongated member has a cylindrical shape. In one embodiment, the first clamping assembly may include a first clamping assembly sleeve adapted to slide over the cylindrical-shaped outer surface of the first elongated member. In one embodiment, the first clamping assembly sleeve preferably includes the first roughened surface in contact with the first end of the substrate. The first roughened surface may include teeth for biting into a substrate.

In one embodiment, the at least one first clamping assembly spring of the first clamping assembly may extend between the outer end of the first elongated member and a spring engaging surface on the first clamping assembly sleeve for normally urging the first clamping assembly sleeve away from the inner end of the first elongated member.

In one embodiment, the outer surface of the second elongated member has a cylindrical shape. In one embodiment, the second clamping assembly may include a second clamping assembly sleeve adapted to slide over the cylindrical-shaped outer surface of the second elongated member. In one embodiment, the second clamping assembly sleeve may include the second roughened surface in contact with the second end of the flexible substrate.

In one embodiment, the at least one second clamping assembly spring may extend between the outer end of the second elongated member and a spring engaging surface on the second clamping assembly sleeve for normally urging the second clamping assembly sleeve away from the inner end of the second elongated member.

In one embodiment, a system for testing substrates may have at least one first clamping assembly fastener for securing the first clamping assembly sleeve to the outer end of the first elongated member. In one embodiment, the at least one first clamping assembly fastener may be a shoulder screw that has an elongated shaft with a non-threaded section. In one embodiment a first clamping assembly spring extends over the non-threaded section of the elongated shaft of the at least one first clamping assembly fastener.

In one embodiment, the system may have at least one second clamping assembly fastener for securing the second clamping assembly sleeve to the outer end of the second elongated member. In one embodiment, the at least one second clamping assembly fastener may be a shoulder screw having an elongated shaft with a non-threaded section, and a second clamping assembly spring extends over the non-threaded section of the elongated shaft of the at least one second clamping assembly fastener.

In one embodiment, the system may include a first external connector having an end pivotally secured to the outer end of the first elongated member, and a second external connector having an end pivotally secured to the outer end of the second elongated member.

In one embodiment, an actuator may be connected to a second end of the first external connector. In one embodiment, a stationary base may be connected to a second end of the second external connector. In one embodiment, the actuator is desirably configured to cycle between a first position and a second position for moving the first and second elongated members between an extended configuration and a flexed configuration as the second end of the second elongated member remains connected to the stationary base through the second external connector.

In one embodiment, a system for testing flexible substrates preferably includes a first elongated member having an outer end, an inner end, an outer surface having a cylindrical shape that extends between the outer end to the inner end, and a semi-spherical concave surface at the inner end. In one embodiment, the system preferably includes a second elongated member having an outer end, an inner end, an outer surface having a cylindrical shape that that extends between the outer end and the inner end of the second elongated member, and a semi-spherical convex surface at the inner end of the second elongated member that opposes the semi-spherical concave surface at the inner end of the first elongated member.

In one embodiment, the system may include a joint interconnecting the inner end of the first elongated member and the inner end of the second elongated member for guiding sliding movement of the semi-spherical concave surface of the first elongated member over the semi-spherical convex surface of the second elongated member as the first and second elongated members move between an extended configuration and a flexed configuration.

In one embodiment, the system preferably has a first clamping assembly coupled with the first elongated member. In one embodiment, the first clamping assembly desirably has at least one first clamping assembly spring that normally urges the first clamping assembly away from the inner end of the first elongated member.

In one embodiment, the system preferably has a second clamping assembly coupled with the second elongated member. In one embodiment, the second clamping assembly desirably includes at least one second clamping assembly spring that normally urges the second clamping assembly away from the inner end of the first second elongated member.

In one embodiment, the first clamping assembly preferably includes a first clamping assembly sleeve that is configured to slide over the cylindrical-shaped outer surface of the first elongated member. In one embodiment, the at least one first clamping assembly spring extends between the outer end of the first elongated member and an opposing spring engaging surface on the first clamping assembly sleeve for normally urging the first clamping assembly sleeve away from the inner end of the first elongated member.

In one embodiment, the second clamping assembly preferably includes a second clamping assembly sleeve that is configured to slide over the cylindrical-shaped outer surface of the second elongated member. In one embodiment, the at least one second clamping assembly spring extends between the outer end of the second elongated member and an opposing spring engaging surface on the second clamping assembly sleeve for normally urging the second clamping assembly sleeve away from the inner end of the second elongated member.

In one embodiment, a system preferably includes a flexible substrate having a first end and a second end. In one embodiment, the first end of the flexible substrate is secured to a first clamping assembly sleeve, and the second end of the flexible substrate is secured to a second clamping assembly sleeve.

In one embodiment, when the first and second elongated members are in a flexed position, the flexible substrate secured to the first and second clamping assemblies is under tension for pulling the first and second clamping assembly sleeves toward the inner ends of the respective first and second elongated members for compressing the at least one first clamping assembly spring and the at least one second clamping assembly spring.

In one embodiment, the flexible substrate preferably includes a pliable material that conforms to the cylindrical-shaped outer surfaces of the respective first and second elongated members as the first and second elongated members move between the extended configuration and the flexed configuration.

In one embodiment, the pliable material may be in contact with a greater area of the semi-spherical convex surface of the second elongated member when the first and second elongated members are in the flexed configuration and a smaller area of the semi-spherical convex surface of the second elongated member when the first and second elongated members are in the extended configuration.

In one embodiment, a joint may include a hinge joint that limits and/or constrains the movement of the first and second elongated members between the flexed configuration and the extended configuration to a single plane.

In one embodiment, a system for testing substrates preferably includes a first elongated member having an outer end, an inner end, an outer surface that extends between the outer and inner ends, and a concave surface at the inner end. In one embodiment, the system preferably includes a second elongated member having an outer end, an inner end, and an outer surface that extends between the outer and inner ends of the second elongated member. In one embodiment, a convex surface at the inner end of the second elongated member opposes the concave surface at the inner end of the first elongated member.

In one embodiment, the system preferably includes a joint interconnecting the first elongated member and the second elongated member for guiding sliding movement of the concave surface of the first elongated member over the convex surface of the second elongated member. In one embodiment, the joint is moveable between an extended position and a flexed position.

In one embodiment, the system preferably includes a first clamping assembly coupled with the first elongated member. In one embodiment, the first clamping assembly desirably includes at least one first clamping assembly spring that normally urges the first clamping assembly away from the inner end of the first elongated member.

In one embodiment, the system preferably includes a second clamping assembly coupled with the second elongated member. In one embodiment, the second clamping assembly desirably includes at least one second clamping assembly spring that normally urges the second clamping assembly away from the inner end of the second elongated member.

In one embodiment, a substrate preferably overlies the outer surfaces of the respective first and second elongated members. In one embodiment, the substrate has a first end secured to the first clamping assembly and a second end secured to the second clamping assembly.

In one embodiment, when the joint of the system is in a flexed position, the substrate is under tension for pulling the first clamping assembly toward the inner end of the first elongated member to compress the at least one first clamping assembly spring and pulling the second clamping assembly toward the inner end of the second elongated member to compress the at least one second clamping assembly spring.

In one embodiment, the concave surface at the inner end of the first elongated member preferably includes a semi-spherical concave surface, and the convex surface at the inner end of the second elongated member preferably includes a semi-spherical convex surface.

In one embodiment, the outer surface of the first elongated member has a cylindrical shape. In one embodiment, the first clamping assembly desirably includes a first clamping assembly sleeve adapted to slide over the cylindrical-shaped outer surface of the first elongated member. In one embodiment, the first clamping assembly sleeve preferably includes a first roughened surface in contact with the first end of the substrate. In one embodiment, the system preferably includes at least one first clamping assembly locking band for securing the first end of the substrate against the first roughened surface of the first clamping assembly sleeve. In one embodiment, at least one first clamping assembly spring of the first clamping assembly extends between the outer end of the first elongated member and a spring engaging surface on the first clamping assembly sleeve for normally urging the first clamping assembly sleeve away from the inner end of the first elongated member.

In one embodiment, the outer surface of the second elongated member has a cylindrical shape. In one embodiment, the second clamping assembly desirably includes a second clamping assembly sleeve adapted to slide over the cylindrical-shaped outer surface of the second elongated member. In one embodiment, the second clamping assembly sleeve preferably includes a second roughened surface in contact with the second end of the flexible substrate. In one embodiment, at least one second clamping assembly locking band secures the second end of the substrate against the second roughened surface of the first clamping assembly sleeve. In one embodiment, at least one second clamping assembly spring extends between the outer end of the second elongated member and a spring engaging surface on the second clamping assembly sleeve for normally urging the second clamping assembly away from the inner end of the second elongated member.

In one embodiment, a system preferably includes at least one first clamping assembly fastener, such as a shoulder screw, for securing the first clamping assembly sleeve to the outer end of the first elongated member. In one embodiment, the at least one first clamping assembly fastener desirably has an elongated shaft with a non-threaded section. In one embodiment, a first clamping assembly spring preferably extends over the non-threaded section of the elongated shaft of the at least one first clamping assembly fastener.

In one embodiment, the system desirably includes at least one second clamping assembly fastener, such as a shoulder screw, for securing the second clamping assembly sleeve to the outer end of the second elongated member. In one embodiment, the at least one second clamping assembly fastener has an elongated shaft with a non-threaded section. In one embodiment, a second clamping assembly spring extends over the non-threaded section of the elongated shaft of the at least one second clamping assembly fastener.

These and other preferred embodiments of the present invention will be described in more detail below.

BRIEF DESCRIPTION OF THE DRAWINGS

FIG. 9A shows a perspective view of a first external connector that is connected with the first elongated member shown in FIGS. 4A-4F, in accordance with one embodiment of the present patent application.

FIG. 9B shows a front elevation view of the first external connector shown in FIG. 9A.

FIG. 9C shows a side elevation view of the first external connector shown in FIGS. 9A and 9B.

FIG. 13A shows a side elevation view of a second elongated member for a system for testing substrates on a flexible joint, in accordance with one embodiment of the present patent application.

FIG. 13B shows a front elevation view of the second elongated member shown in FIG. 13A.

FIG. 13C shows a top plan view of the second elongated member shown in FIGS. 13A and 13B.

DETAILED DESCRIPTION OF PREFERRED EMBODIMENTS

Figure 1A:
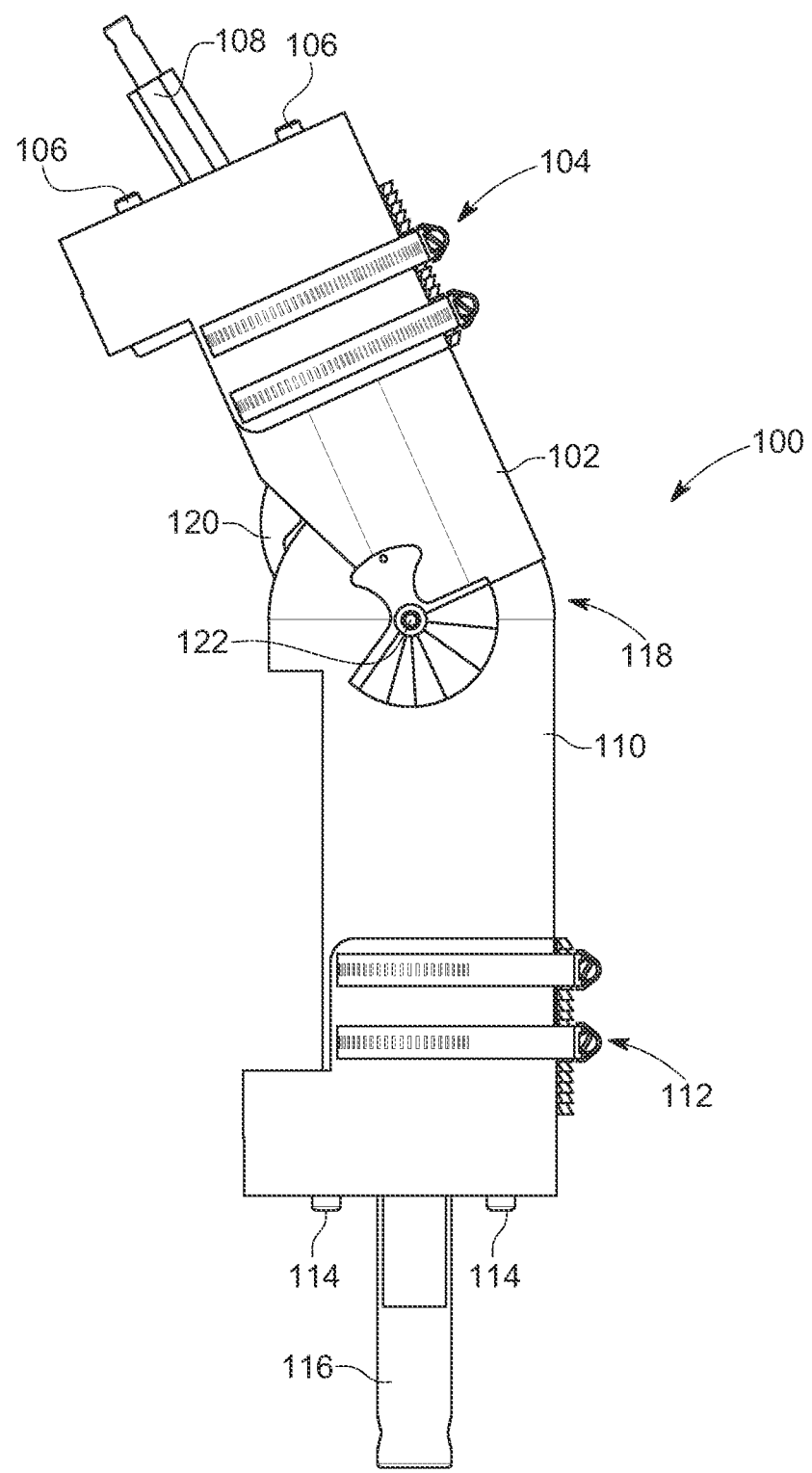
FIG. 1A shows a side view of a system for testing substrates on a flexible joint, in accordance with one embodiment of the present patent application.
Figure 1B:
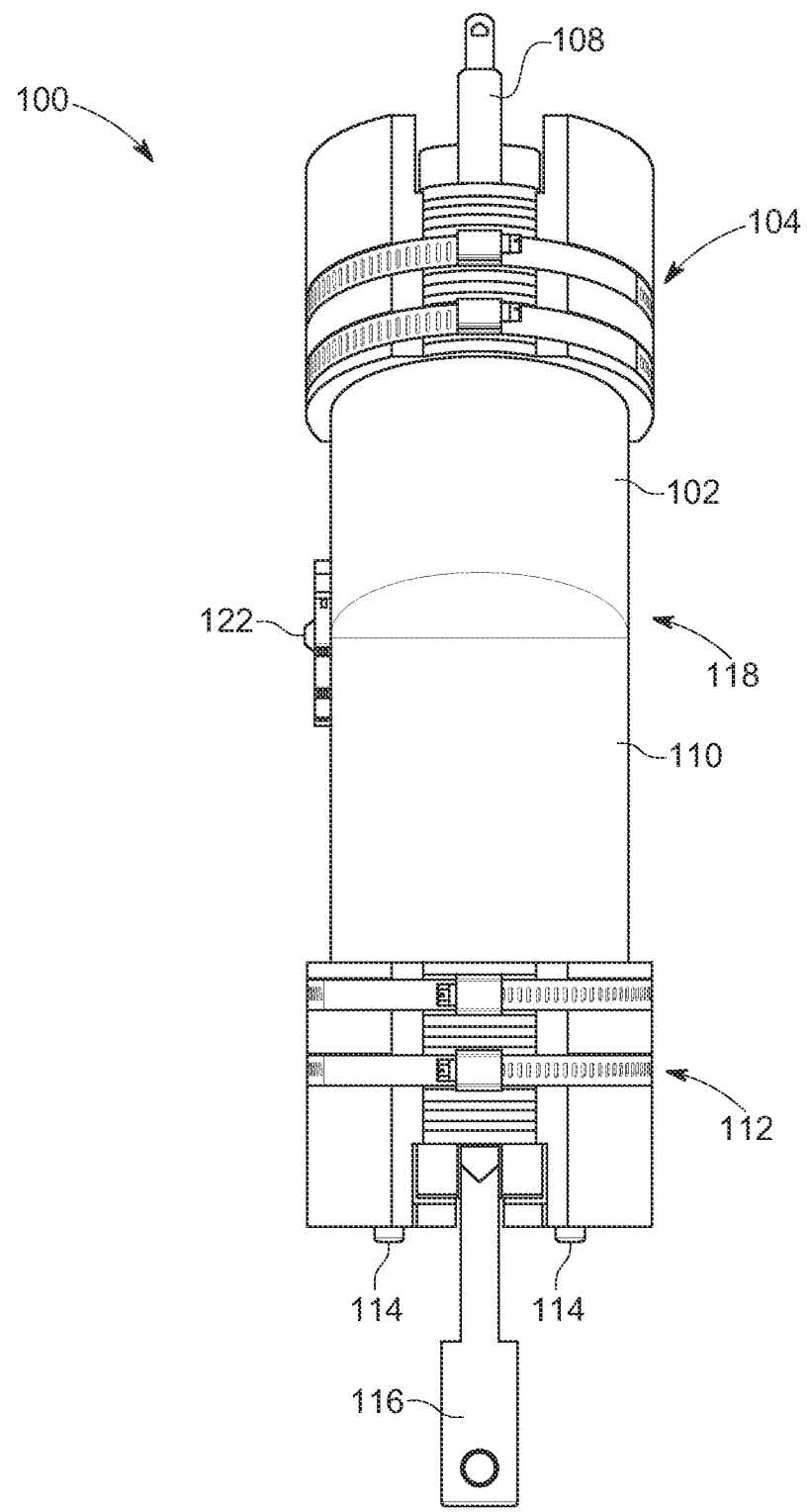
FIG. 1B shows a front view of the system for testing substrates shown in FIG. 1A.

Referring to FIGS. 1A and 1B, in accordance with one embodiment, a system 100 for testing substrates on a flexible joint preferably includes a first elongated member 102, and a first clamping assembly 104 coupled with the first elongated member. In one embodiment, the first clamping assembly 104 is desirably coupled with an upper end of the first elongated member 102. In one embodiment, the first clamping assembly 104 preferably includes one or more first clamping assembly fasteners 106 that are used for securing the first clamping assembly 104 to the upper end of the first elongated member 102. In one embodiment, the system 100 may include a first external connector 108 having a lower end that is connected with the upper end of the first elongated member 102. In one embodiment, the lower end of the first external connector 108 is pivotally connected with the upper end of the first elongated member.

In one embodiment, the system 100 for testing substrates on a flexible joint preferably includes a second elongated member 110 having a second clamping assembly 112 coupled with the second elongated member 110. In one embodiment, the second clamping assembly 112 is desirably coupled with a lower end of the second elongated member 110. In one embodiment, the second clamping assembly 112 preferably includes one or more second clamping assembly fasteners 114 that are used for securing the second clamping assembly 112 to the lower end of the second elongated member 110. In one embodiment, the system 100 may include a second external connector 116 having an upper end that is connected with the lower end of the second elongated member 110. In one embodiment, the upper end of the second external connector 116 is pivotally connected with the lower end of the second elongated member 110.

In one embodiment, the lower end of the first elongated element 102 is interconnected with an upper end of the second elongated element 110 via a joint 118 that enables the first elongated member 102 and the second elongated member 110 to move relative to one another between an extended configuration and a flexed configuration. In one embodiment, the joint 118 is flexible. In one embodiment, the joint 118 desirably includes a hinge joint 120 (FIG. 1A) that interconnects a lower end of the first elongated member 102 with an upper end of the second elongated member 110 for guiding movement of the first elongated member and the second elongated member relative to one another. In one embodiment, the joint 118 may include a pivot pin 122 that extends laterally through an upper end of the second elongated member 110 and passes through an opening (not shown) at the lower end of the hinge joint 120.

Figure 2A:
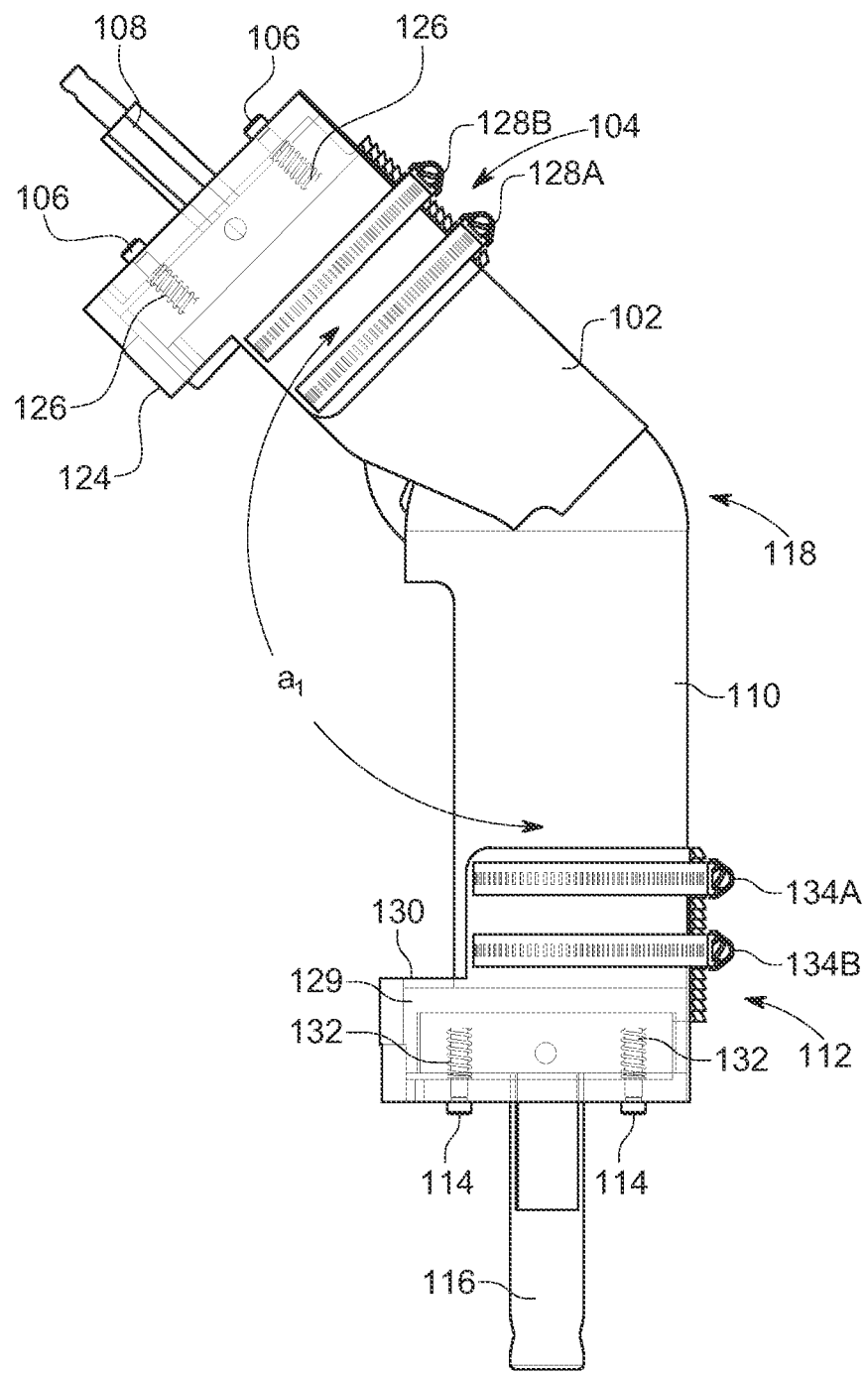
FIG. 2A shows another side view of the system for testing substrates shown in FIG. 1A.
Figure 2B:
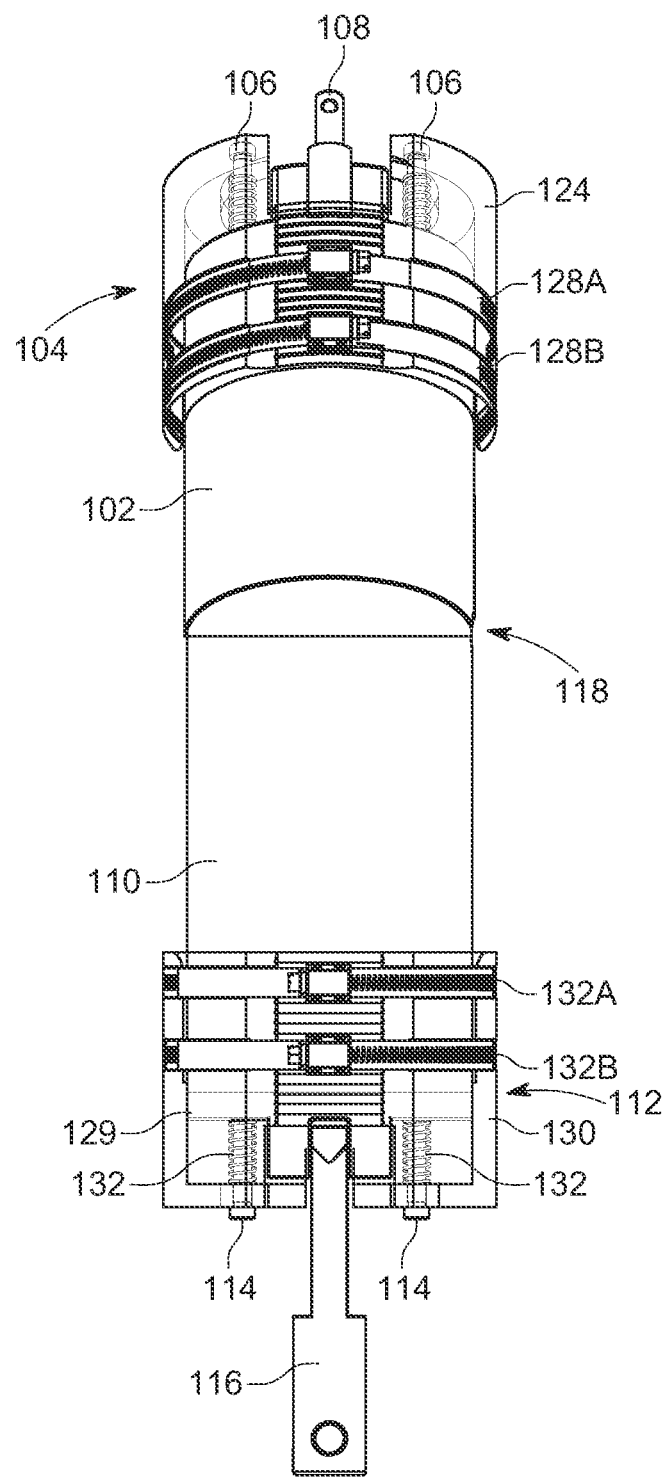
FIG. 2B shows a front view of the system for testing substrates shown in FIG. 2A.

Referring to FIGS. 2A and 2B, in one embodiment, the first clamping assembly 104 coupled with the first elongated member 102 preferably includes a first clamping assembly sleeve 124. In one embodiment, the first clamping assembly fasteners 106 are utilized for securing the first clamping assembly sleeve 124 to the upper end of the first elongated member 102. In one embodiment, each of the first clamping assembly fasteners 106 preferably has a first clamping assembly spring 126 that is assembled therewith. In one embodiment, the first clamping assembly springs 126 are desirably assembled over the elongated shafts of the respective first clamping assembly fasteners 106. In one embodiment, the first clamping assembly springs 126 are desirably compression springs that extend between the upper end of the first elongated member 102 and an opposing surface on the first clamping assembly sleeve 124 for normally urging the first clamping assembly sleeve to move away from a lower end of the first elongated member 102. In one embodiment, as the first clamping assembly sleeve 124 moves toward the lower end of the first elongated member 102, the first clamping assembly springs 126 are compressed between a surface on the first clamping assembly sleeve 124 and an opposing surface at the upper end of the first elongated member 102 for storing potential energy in the springs 126.

In one embodiment, the first clamping assembly 104 desirably includes a pair of first clamping assembly locking bands 128A, 128B that extend at least partially around the outer surface of the first clamping assembly sleeve 124. In one embodiment, the first clamping assembly locking bands 128A, 128B may be selectively loosened and tightened. In one embodiment, the first clamping assembly locking bands 128A, 128B may be loosened for positioning an end of a flexible substrate under the bands and tightened for securing the end of the flexible substrate in place under the bands 128A, 128B. In one embodiment, the first clamping assembly locking bands 128A, 128B may be worm-drive clamping bands having captured screws that are rotatable for selectively loosening and tightening the locking bands.

In one embodiment, the system 100 preferably includes the first external connector 108 having a lower end that is pivotally secured to an upper end of the first elongated member 102. In one embodiment, an upper end of the first external connector 108 may be secured to an external component, such as an actuator (e.g., an INSTRON® testing system), that moves the first elongated member through a repeating cycle of motion (e.g., an up and down cycle).

In one embodiment, the second elongated member preferably includes a lower plate 129 that is secured to a lower end of the second elongated member 110. In one embodiment, the lower plate 129 is secured to the lower end of the second elongated member 110 using screw fasteners. In one embodiment, after the lower plate 129 is secured to the lower end of the second elongated member, the lower plate is locked in place and cannot move relative to the lower end of the second elongated member.

In one embodiment, the second clamping assembly 112 is desirably coupled with the lower plate 129 using the second clamping assembly fasteners 114. In one embodiment, the second clamping assembly 112 that is coupled with the lower end of the second elongated member 110 preferably includes a second clamping assembly sleeve 130. In one embodiment, the second clamping assembly fasteners 114 are utilized for securing the second clamping assembly sleeve 130 to the lower plate 129, which, in turn, is secured to the lower end of the second elongated member 110. In one embodiment, each of the second clamping assembly fasteners 114 preferably has a second clamping assembly spring 132 that is assembled therewith. In one embodiment, the second clamping assembly springs 132 are desirably assembled over the elongated shafts of the respective second clamping assembly fasteners 114. In one embodiment, the second clamping assembly springs 132 are desirably compression springs that extend between the lower plate 129 secured to the lower end of the second elongated member 110 and an opposing surface on the second clamping assembly sleeve 130 for normally urging the second clamping assembly sleeve away from an upper end of the second elongated member 110. In one embodiment, as the second clamping assembly sleeve moves toward the upper end of the second elongated member 110, the second clamping assembly springs 132 are compressed for storing potential energy in the springs.

In one embodiment, the second clamping assembly 130 desirably includes a pair of second clamping assembly locking bands 134A, 134B that extend at least partially around the outer surface of the second clamping assembly sleeve 130. In one embodiment, the second clamping assembly locking bands 134A, 134B may be selectively loosened and tightened. For example, the second clamping assembly locking bands 134A, 134B may be loosened for positioning an end of a flexible substrate under the bands and tightened for securing the end of the flexible substrate in place under the locking bands 134A, 134B. In one embodiment, the second clamping assembly locking bands 134A, 134B may be worm-drive clamping bands having captured screws that may be rotated for selectively loosening and tightening the locking bands.

In one embodiment, the system 100 preferably includes the second external connector 116 having an upper end that is pivotally secured to the lower plate 129, which, in turn, is affixed to the lower end of the second elongated member 110. In one embodiment, a lower end of the second external connector 116 may be secured to an external component, such as a stationary base of a testing machine (e.g., an INSTRON® testing system).

Figure 3A:
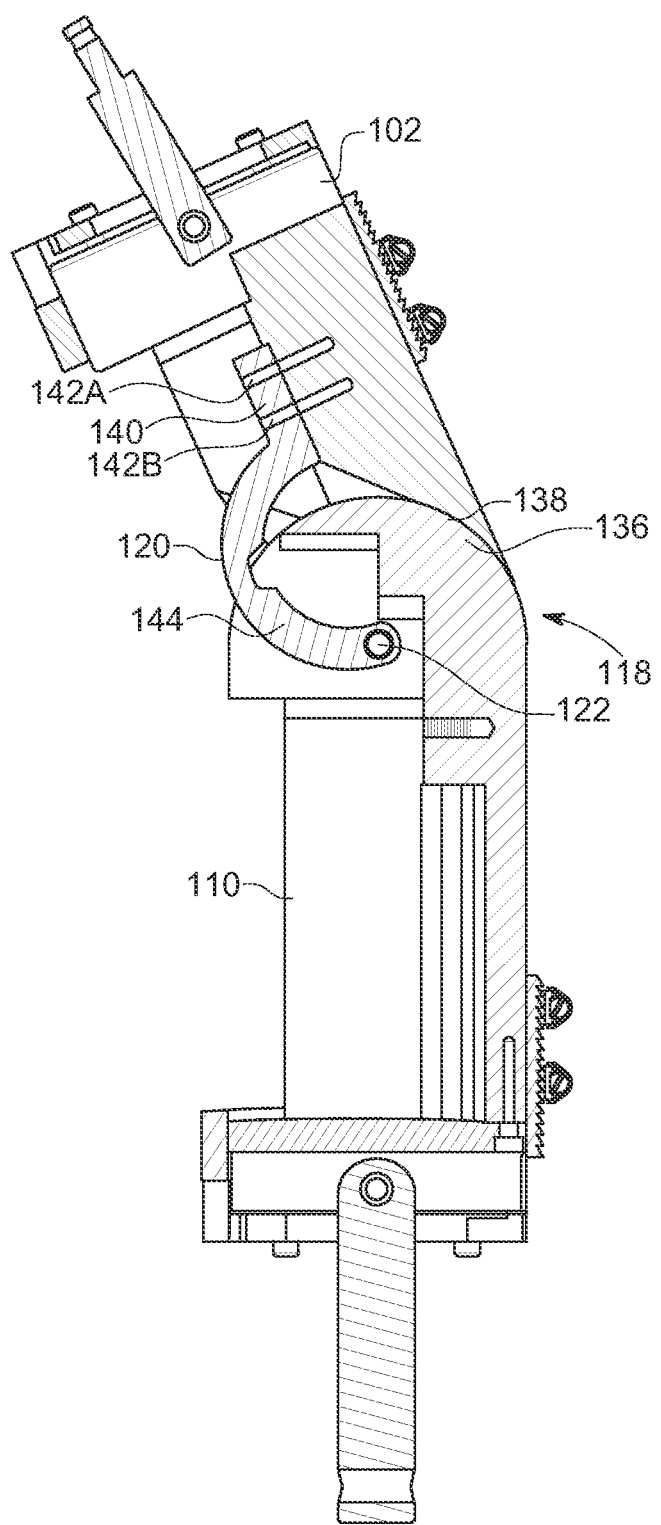
FIG. 3A shows a cross-sectional side view of a system for testing substrates on a flexible joint, in accordance with one embodiment of the present patent application.
Figure 3B:
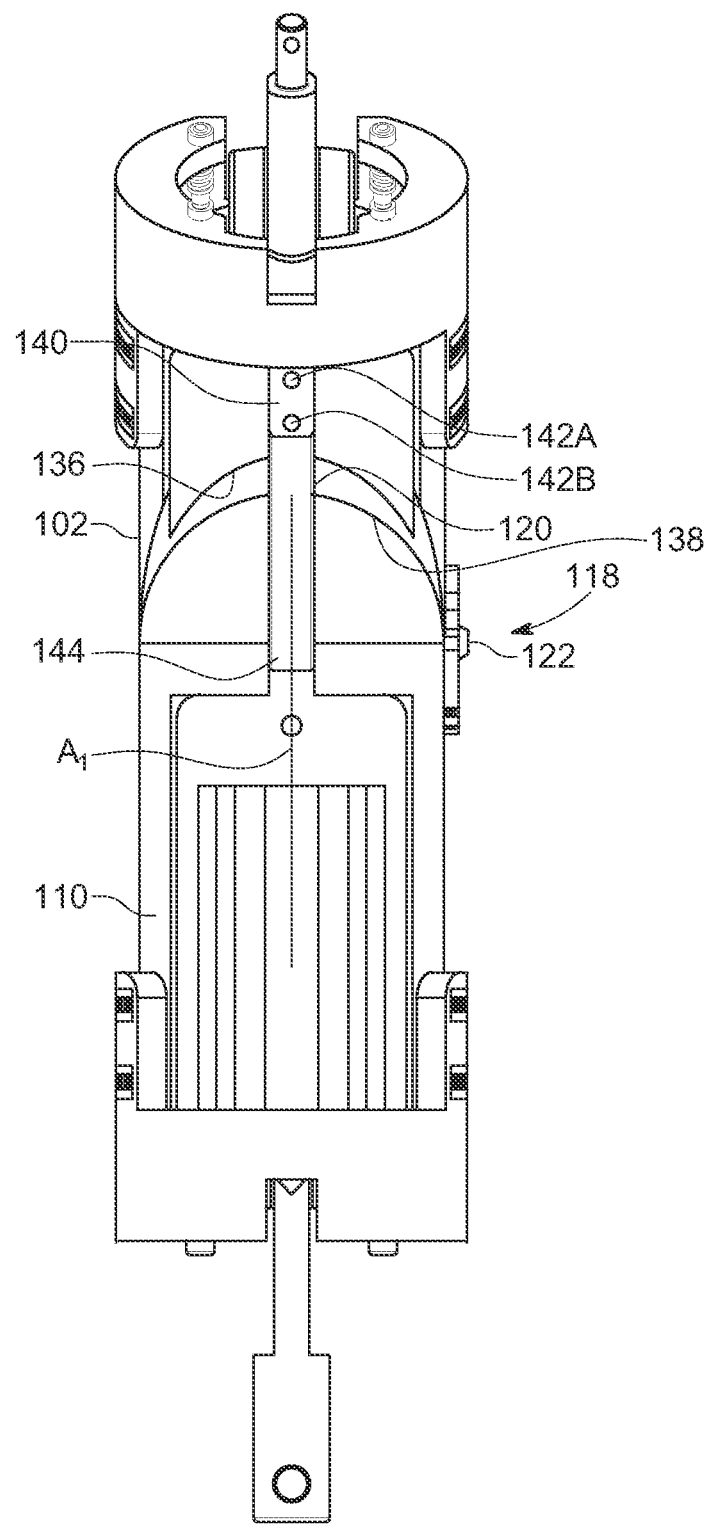
FIG. 3B shows a rear view of the system for testing substrates shown in FIG. 3A.

Referring to FIGS. 3A and 3B, in one embodiment, the first elongated element 102 preferably has a lower end that includes a concave surface 136. In one embodiment, the concave surface 136 may include a semi-spherical concave surface. In one embodiment, the second elongated member 110 preferably has an upper end including a convex surface 138 that is adapted to oppose the concave surface 136 at the lower end of the first elongated member 102. In one embodiment, the convex surface at the upper end of the second elongated member 110 may include a semi-spherical convex surface that is adapted to oppose the semi-spherical concave surface at the lower end of the first elongated member 102. In one embodiment, the joint 118 that enables extension and flexion of the system may include the hinge joint 120 having an upper end 140 that is secured to the first elongated member 102 via hinge joint fasteners 142A, 142B and a lower end 144 that is pivotally secured to the second elongated member 110 via the pivot pin 122.

In one embodiment, during flexion and extension of the system through the joint 118, the semi-spherical concave surface 136 at the lower end of the first elongated member 102 preferably slides over the semi-spherical convex surface 138 at the upper end of the second elongated member 110. The hinge joint 120 and the pivot pin 122 desirably hold the first elongated member 102 and the second elongated member 110 together as the semi-spherical concave surface 136 at the lower end of the first elongated member 102 slides over the semi-spherical convex surface 138 at the upper end of the second elongated member 110. In one embodiment, the hinge joint 120 preferably limits the flexion and extension movement of the first and second elongated members to a single plane. Referring to FIG. 3B, in one embodiment, the first and second elongated members 102, 110 extend along a longitudinal axis $A_1$ and the hinge joint 120 limits the flexion and extension movement to a single plane that is parallel with the axis $A_1$.

Referring to FIGS. 4A-4D, in one embodiment, the first elongated member 102 of the system preferably has an upper end 146 and a lower end 148 that includes the concave surface. In one embodiment, the first elongated member 102 preferably has a top surface 150 that includes spaced, internally threaded bores 152A-152D formed therein that are adapted to receive threaded ends of the first clamping assembly fasteners 106 (FIG. 2A) to secure the first clamping assembly sleeve 124 (FIG. 2A) to the upper end 146 of the first elongated member 102.

In one embodiment, the upper end of the first elongated member 102 preferably includes a pair of spaced flanges 154A, 154B that extend across the top surface 150 of the first elongated member. In one embodiment, each of the spaced flanges 154A, 154B desirably has an aligned opening 156A, 156B, respectively, formed therein for pivotally coupling a lower end of the first external connector 108 (FIG. 1A) with the upper end of the first elongated member 102.

In one embodiment, the first elongated member 102 desirably has a cylindrical-shaped outer surface 160 that extends over front and lateral regions of the first elongated member 102. The cylindrical shape may replicate the shape of an upper part of a human leg. Referring to FIG. 4B, in one embodiment, a rear side 162 of the first elongated member 102 is hollow and/or defines a concave area that extends between the upper end 146 and the lower end 148 of the first elongated member. In one embodiment, the first elongated member 102 includes an arcuate-shaped cutout 164 that is preferably located adjacent the pivot pin 122 (FIG. 3A) when the first elongated member is assembled with an upper end of the second elongated member 110 (FIG. 3A).

Figure 4A:
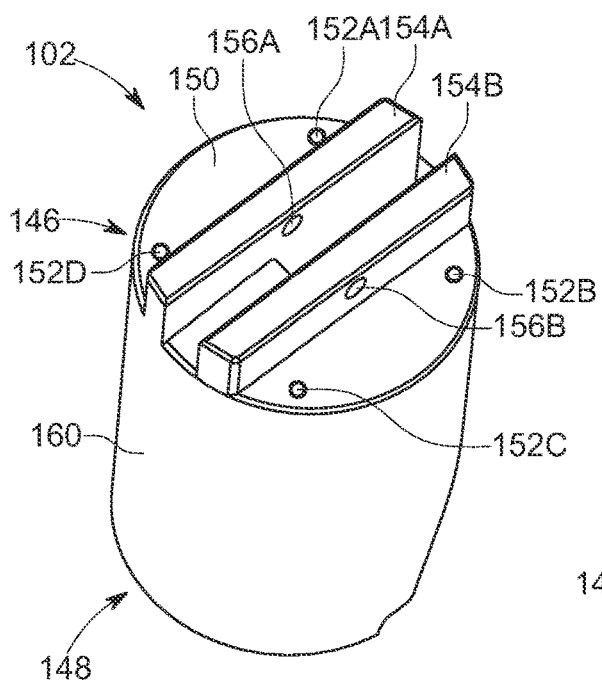
FIG. 4A shows a perspective top view of a first elongated member of a system for testing substrates on a flexible joint, in accordance with one embodiment of the present patent application.
Figure 4B:
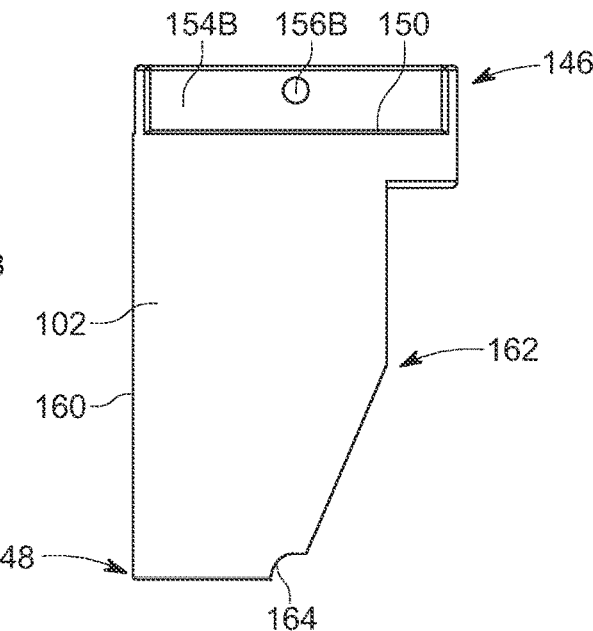
FIG. 4B shows a side elevation view of the first elongated member shown in FIG. 4A.
Figure 4C:
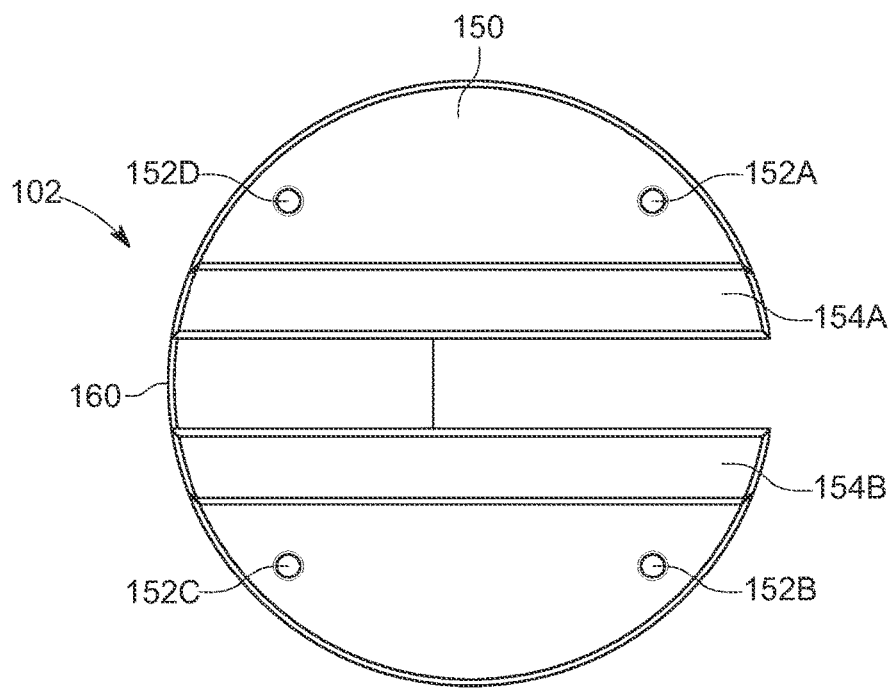
FIG. 4C shows a top plan view of the first elongated member shown in FIGS. 4A and 4B.
Figure 4D:
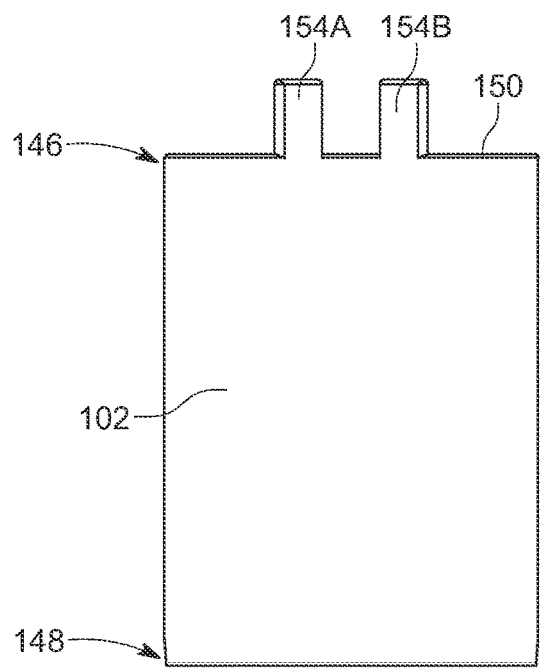
FIG. 4D shows a front elevation view of the first elongated member shown in FIGS. 4A-4C.
Figure 4E:
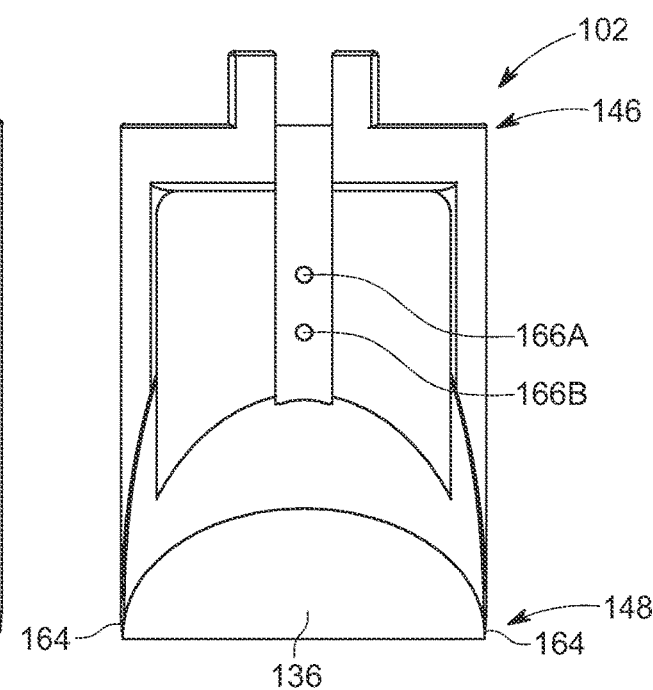
FIG. 4E shows a rear elevation view of the first elongated member shown in FIGS. 4A-4D.
Figure 4F:
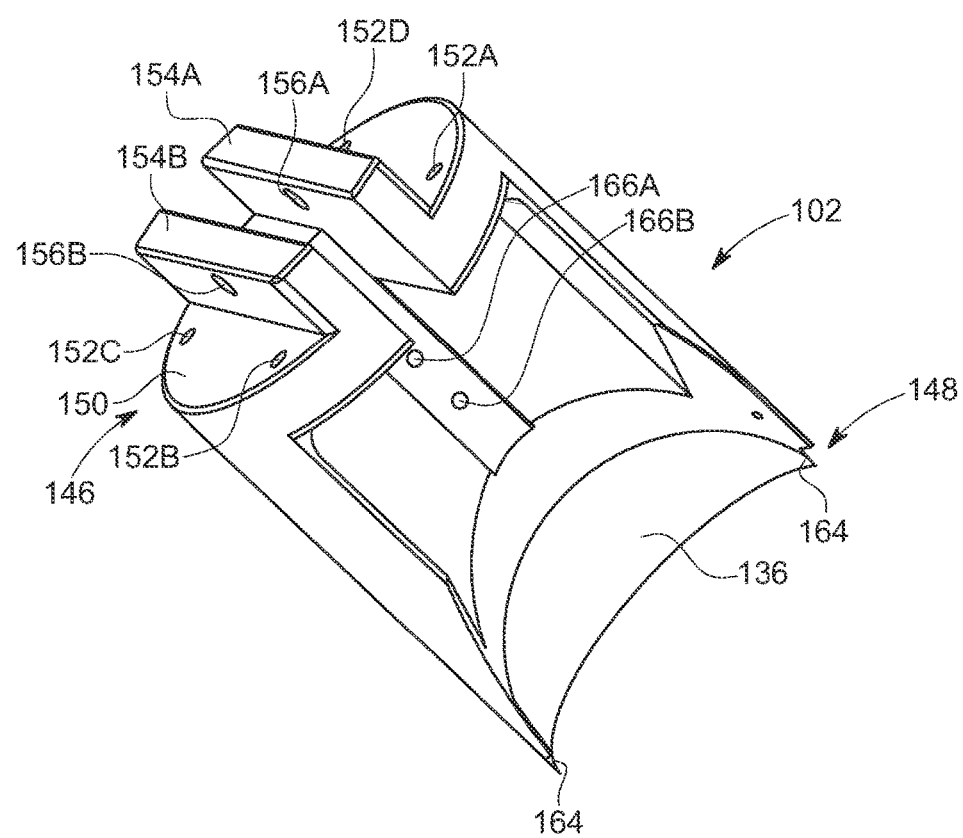
FIG. 4F shows a perspective view of a rear side of the first elongated member shown in FIGS. 4A-4E.
Figure 5A:
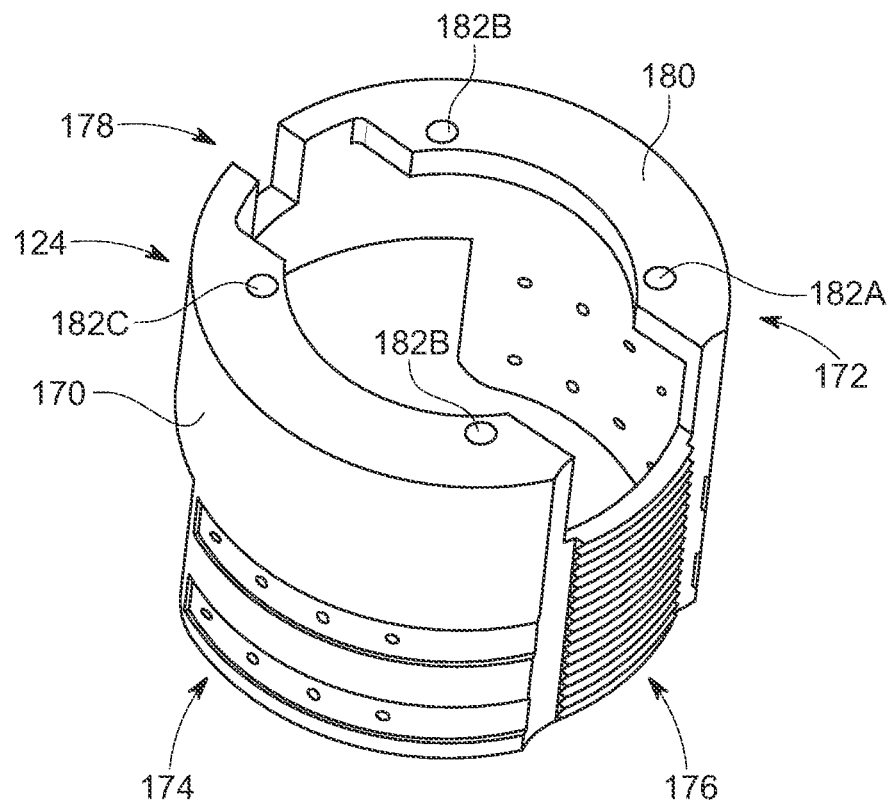
FIG. 5A shows a perspective view a top side of a first clamping assembly sleeve of a system for testing substrates, in accordance with one embodiment of the present patent application.
Figure 5B:
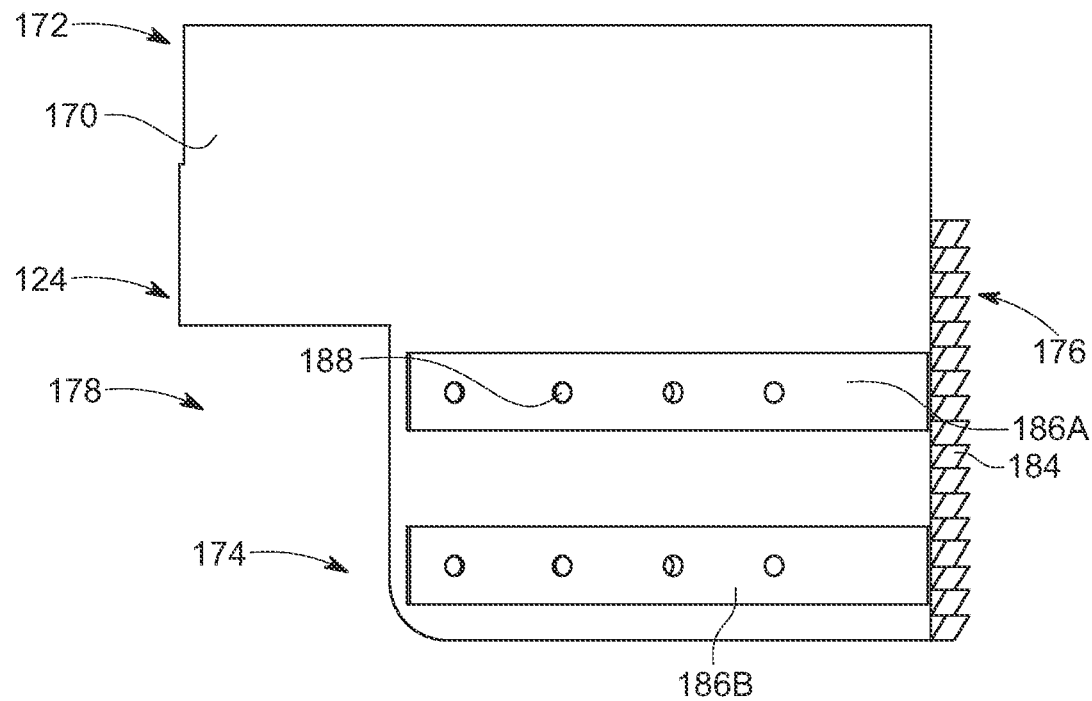
FIG. 5B shows a side elevation view of the first clamping assembly sleeve shown in FIG. 5A.
Figure 5C:
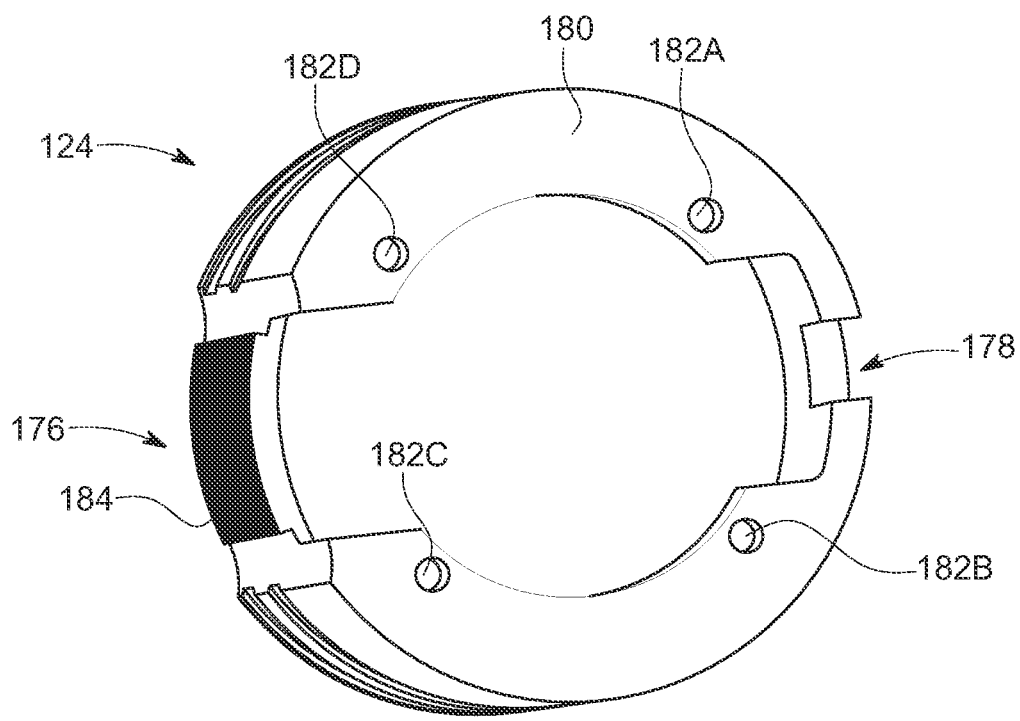
FIG. 5C shows another perspective view of a top side of the first clamping assembly sleeve shown in FIGS. 5A and 5B.
Figure 5D:
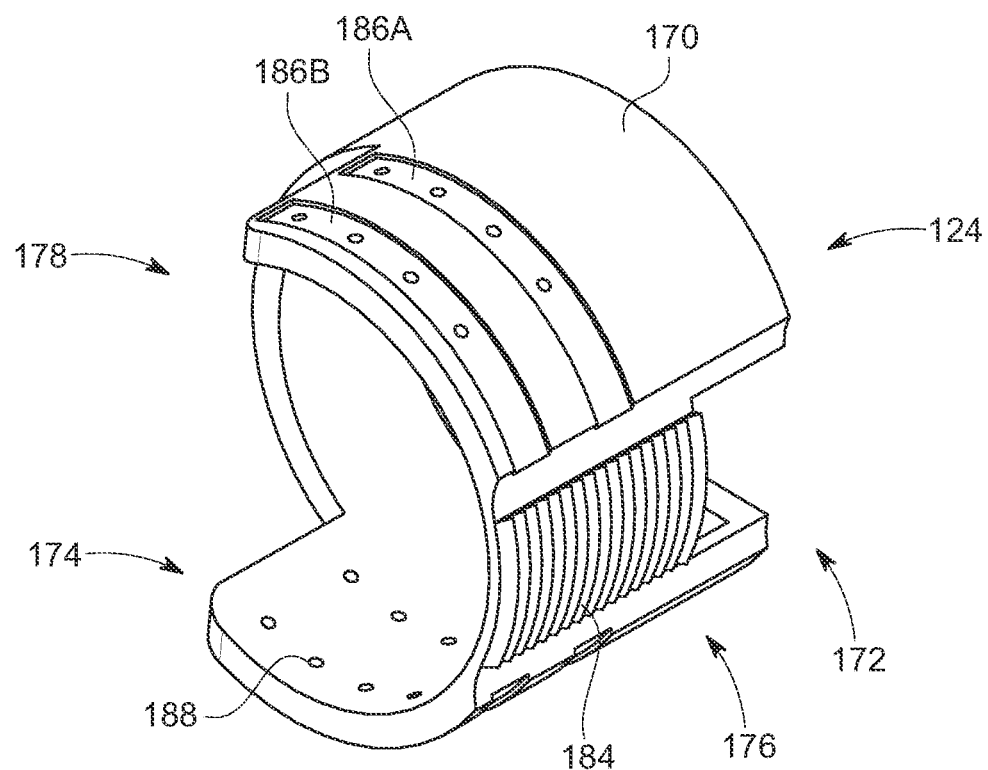
FIG. 5D shows a perspective view of an underside of the first clamping assembly sleeve shown in FIGS. 5A-5C.

Referring to FIGS. 4E and 4F, in one embodiment, the rear side of the first elongated member 102 may be hollow or open, such as by removing material from the rear side of the first elongated member. The hollowed out rear side of the first elongated member 102 preferably includes a pair of internally threaded bores 166A, 166B that are adapted to receive the hinge joint fasteners 142A, 142B (FIG. 3B) used to secure the upper end of the hinge joint 120 (FIG. 3B) to the rear side of the first elongated member 102. In one embodiment, the arcuate-shaped cutout 164 is located at both lower, lateral sides of the first elongated member 102. In one embodiment, at the lower end 148 thereof, the hollowed out rear side of the first elongated member 102 preferably includes the semi-spherical concave surface 136 formed therein that is adapted to slide over the opposing semi-spherical convex surface at the upper end of the second elongated member.

Referring to FIG. 4F, in one embodiment, the spaced flanges 154A, 154B desirably project from the top face 150 of the first elongated member 102. The spaced flanges 154A, 154B preferably have aligned openings 156A, 156B formed therein. The top face 150 of the first elongated member 102 desirably includes the internally threaded bores 152A-152D that are adapted to receive the first clamping assembly fasteners 106 (FIG. 2A) for securing the first clamping assembly sleeve 124 (FIG. 2A) to the upper end 146 of the first elongated member 102.

Referring to FIGS. 5A-5D, in one embodiment, a system for testing substrates desirably includes the first clamping assembly sleeve 124 that is adapted to be coupled with the first elongated member 102 (FIG. 4A). In one embodiment, the first clamping assembly sleeve is adapted to be coupled with the upper end of the first elongated member. In one embodiment, the first clamping assembly sleeve 124 desirably has a cylindrical shaped body 170 with an upper end 172, a lower end 174, a front side 176 and a rear side 178. In one embodiment, the body 170 of the first clamping assembly sleeve 124 is hollow for sliding over an outer surface of the first elongated member.

In one embodiment, the first clamping assembly sleeve 124 preferably includes a fastener flange 180 that projects inwardly at the upper end 172 of the cylindrical shaped body 170. In one embodiment, the fastener flange 180 preferably has spaced through bores 182A-182D formed therein. In one embodiment, the spaced through bores 182A-182D are configured to receive the first clamping assembly sleeve fasteners 106 (FIG. 2A) that are utilized for securing the first clamping assembly sleeve to the upper end of the first elongated member.

In one embodiment, the front side 176 of the first clamping assembly sleeve 124 preferably has a roughened surface that is adapted to engage a substrate when the substrate is secured to the first clamping assembly sleeve. In one embodiment, the roughened surface may include a plurality of teeth 184 that project from the outer surface of the body 170. The teeth may be configured to bite into the substrate.

In one embodiment, the first clamping assembly sleeve 124 preferably includes first and second grooves 186A, 186B that are formed in the outer surface of the body 170, and that are adapted to seat the first clamping assembly locking bands 128A, 128B (FIG. 2A). In one embodiment, each of the grooves 186A, 186B desirably includes a series of spaced openings 188 that may receive fasteners for securing the locking bands 128A, 128B in place within the grooves 186A, 186B. In one embodiment, the teeth 184 are adapted to engage an upper end of a substrate when the substrate is secured to the first clamping assembly sleeve 124. The first clamping assembly locking bands 128A, 128B (FIG. 2A) may be tightened to pinch the upper end of the substrate between the locking bands and the plurality of teeth 184.

Figure 6:
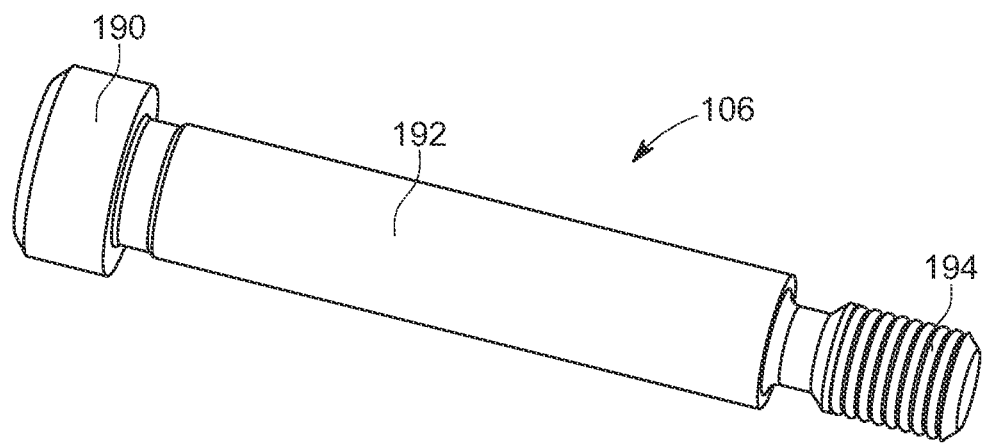
FIG. 6 shows a perspective view of a fastener used to secure the first clamping assembly sleeve of FIGS. 5A-5D with the first elongated member of FIGS. 4A-4F, in accordance with one embodiment of the present patent application.

Referring to FIG. 6, in one embodiment, a first clamping assembly fastener 106 may be utilized for securing the first clamping assembly sleeve 124 (FIG. 5A) to the upper end of the first elongated member 102 (FIG. 2A). In one embodiment, the first clamping assembly fastener 106 may be a shoulder screw having a head 190, a shoulder section 192 that is non-threaded, and a distal end having a section with threads 194. In one embodiment, the head 190 forms the largest diameter section of the shoulder screw, which prevents the head from passing through the bores 182A-182D (FIG. 5A) of the first clamping assembly sleeve. The head also provides a bearing surface. The head 190 preferably has a drive mechanism so that the shoulder screw may have torque applied for its installation. In one embodiment, the shoulder section 192 is smooth for enabling an item to slide or move over the shoulder section 192. In one embodiment, the shoulder screw 106 preferably includes the threaded section 194 having helical grooves. The threaded section is desirably located at the distal-most end of the shoulder screw. In one embodiment, the threaded section 194 may have a diameter that is smaller than the diameter of the shoulder section 192. The threaded section 194 is preferably adapted for insertion into an internally threaded hole or bore. In one embodiment, the threaded section 194 is preferably inserted into one of the internally threaded bores 152A-152D formed in the top surface 150 of the first elongated member 102 (FIG. 4A).

Figure 7:
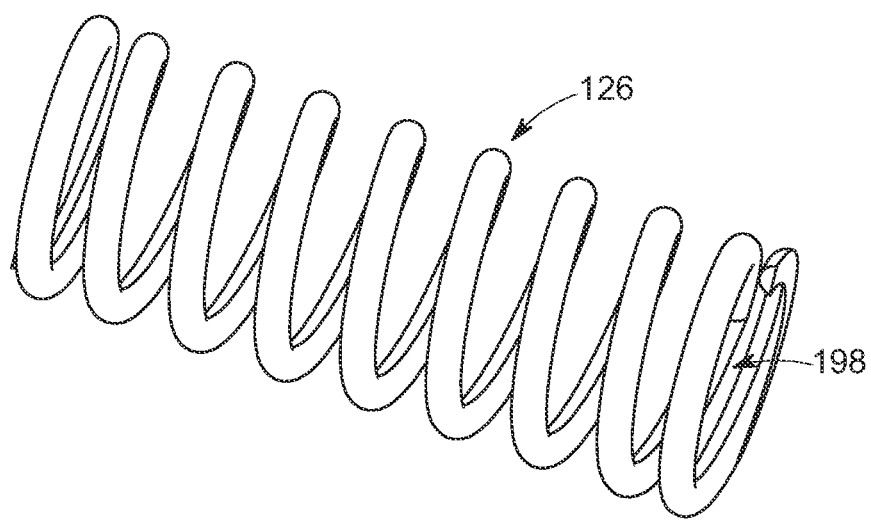
FIG. 7 shows a perspective view of a spring that is utilized with the fastener of FIG. 6, in accordance with one embodiment of the present patent application.

Referring to FIG. 7, in one embodiment, a first clamping assembly spring 126 (FIG. 2A) is adapted to be assembled with the first clamping assembly fastener 106 shown in FIG. 6. In one embodiment, the spring 126 is a helical spring. In one embodiment, the spring 126 is a compression spring that stores energy when it is compressed and releases the stored energy when it is free to return to its normal configuration. In one embodiment, the spring 126 has a central conduit 198 that extends along the length thereof so that the spring 126 may be positioned over the shoulder section 192 of the first clamping assembly fastener 106 (FIG. 6).

Figure 8A:
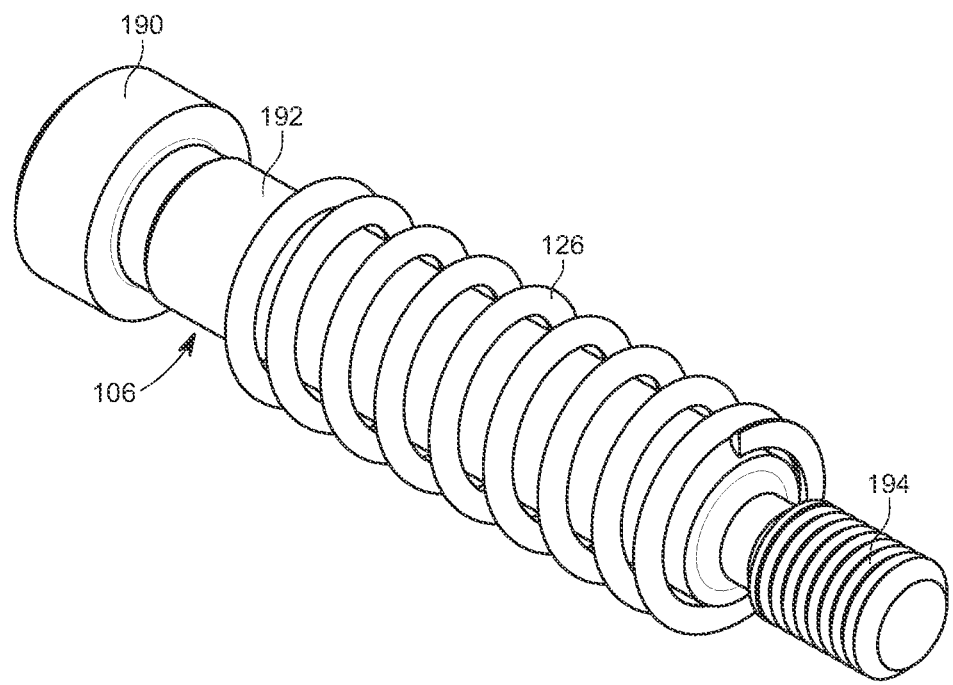
FIG. 8A shows a perspective view of the fastener of FIG. 6 and the spring of FIG. 7 assembled together, in accordance with one embodiment of the present patent application.
Figure 8B:
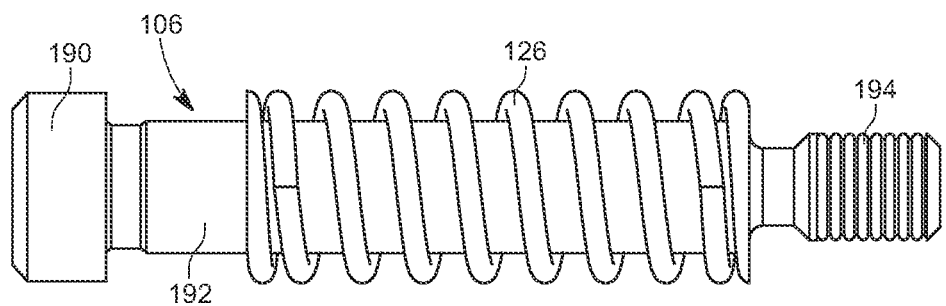
FIG. 8B shows a side elevation view of the fastener and the spring of FIG. 8A.

Referring to FIGS. 8A and 8B, in one embodiment, the spring 126 is positioned over the shoulder section 192 of the shoulder screw 106. The spring 126 is preferably located between the head 190 and the threaded section 194 of the shoulder screw 106. In one embodiment, the spring 126 is free to slide over the smooth, non-threaded shoulder section 192 of the screw 106. The fastener and spring embodiments shown and described in FIGS. 6-8B are disclosed as being used in conjunction with the coupling and/or securing the first clamping assembly sleeve with the first elongated member, however, the fastener and spring embodiments of FIGS. 6-8B may also be utilized in conjunction with coupling and/or securing the second clamping assembly sleeve with the second elongated member.

Referring to FIGS. 9A-9C, in one embodiment, the system may include a first external connector 108 (FIG. 1A) that is connected with the upper end of the first elongated member 102 (FIG. 2A). In one embodiment, the first external connector may be pivotally connected with the upper end of the first elongated member. In one embodiment, the first external connector 108 preferably has an upper end 200 and a lower end 202. In one embodiment, the upper end 200 has an outer diameter that is smaller than the outer diameter at the lower end 202. In one embodiment, the upper end 200 of the first external connector preferably includes an upper opening 204 for connecting the first external connector 108 to an external device (e.g., an INSTRON™ machine), and the lower end 202 has a lower opening 206 for forming a pivotal connection with the spaced flanges 154A, 154B (FIG. 4A) at the upper end of the first elongated member 102 (FIG. 4A). The upper and lower openings 204, 206 preferably pass completely through the first external connector 108 so that connecting pins may be inserted into the respective openings 204, 206.

Figure 10A:
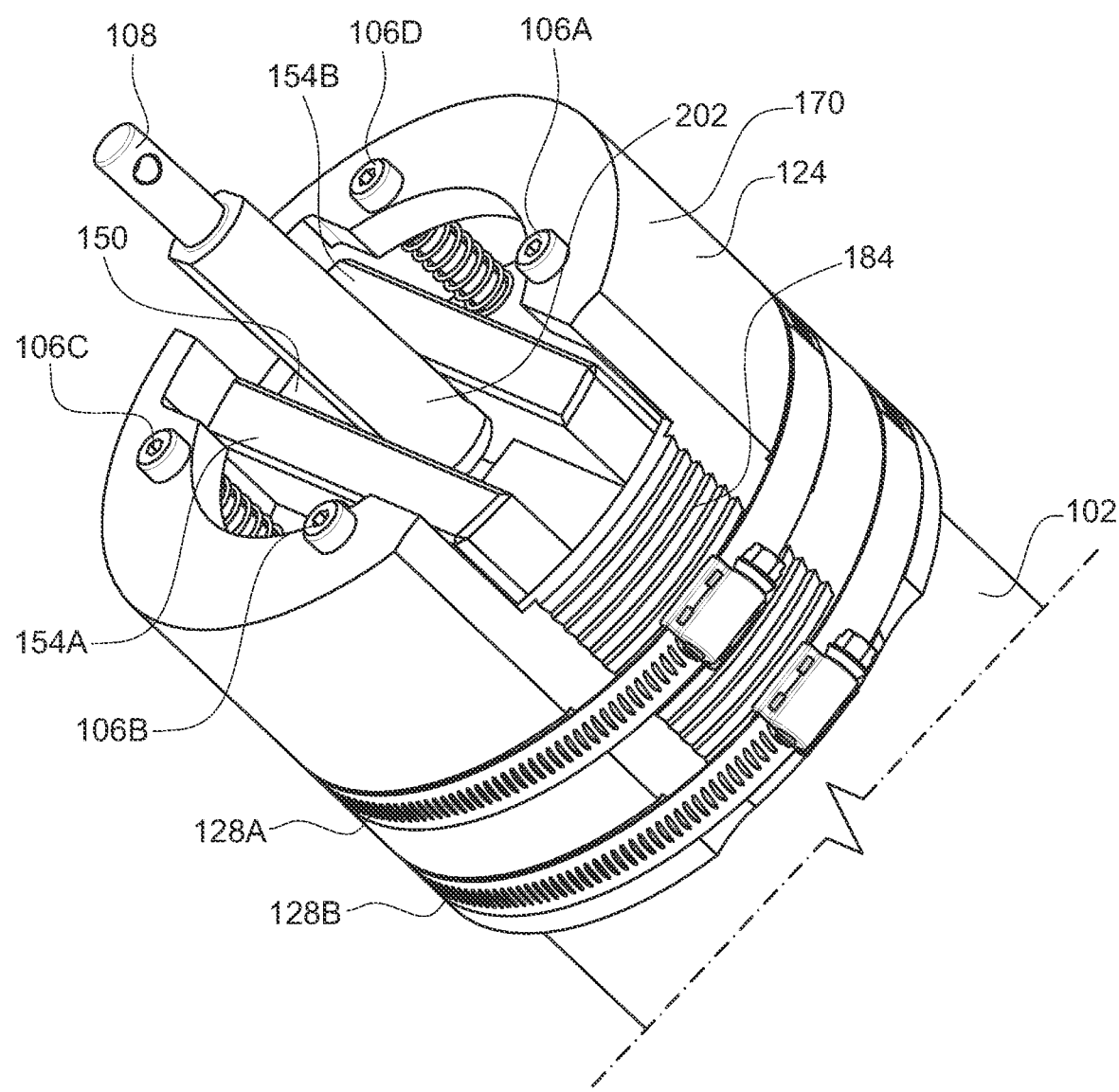
FIG. 10A shows a perspective view of the first clamping assembly sleeve of FIGS. 5A-5D being coupled with an upper end of the first elongated member of FIGS. 4A-4F, in accordance with one embodiment of the present patent application.
Figure 10B:
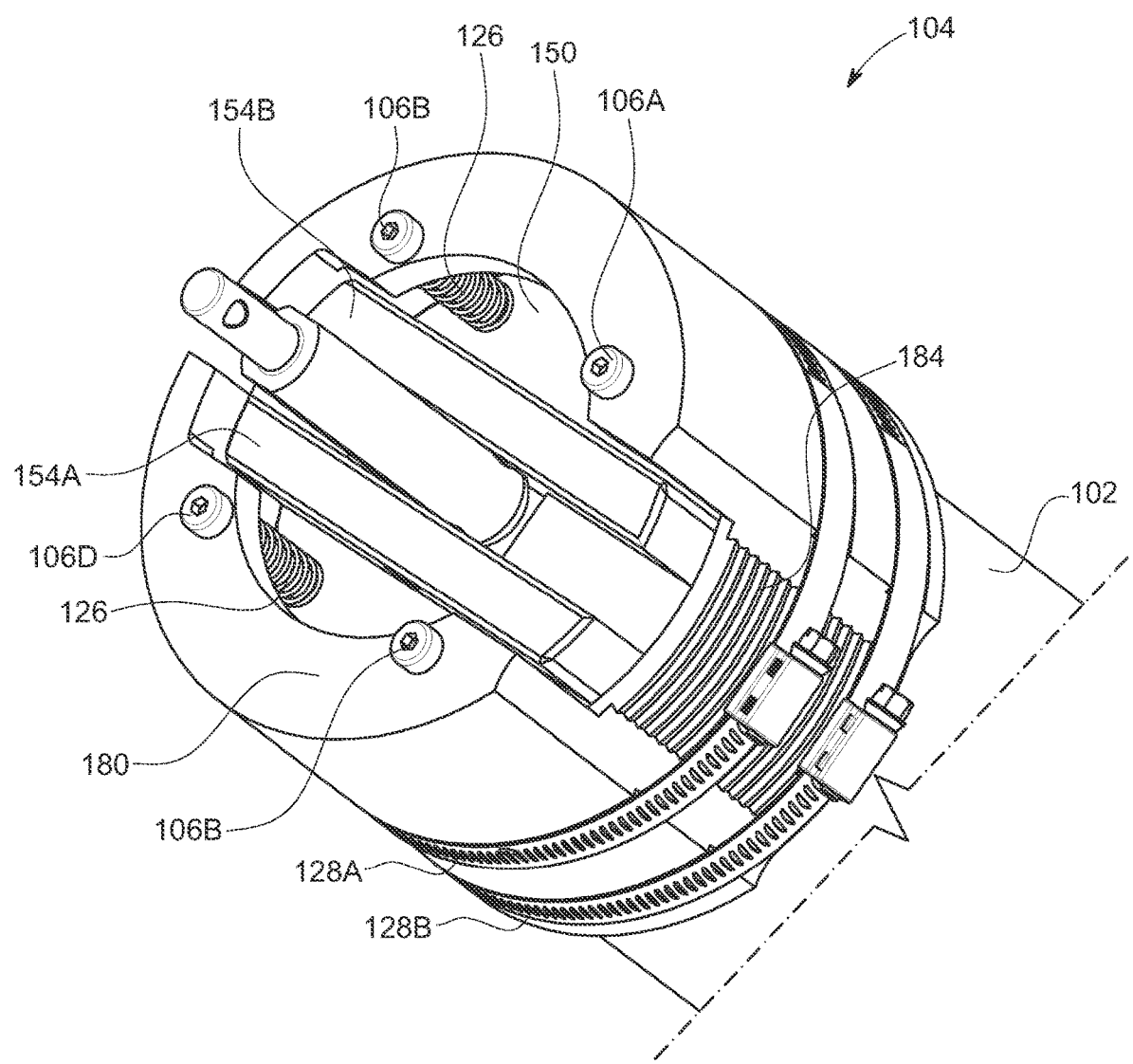
FIG. 10B shows another perspective view of the first clamping assembly sleeve and the first elongated member of FIG. 10A.
Figure 10C:
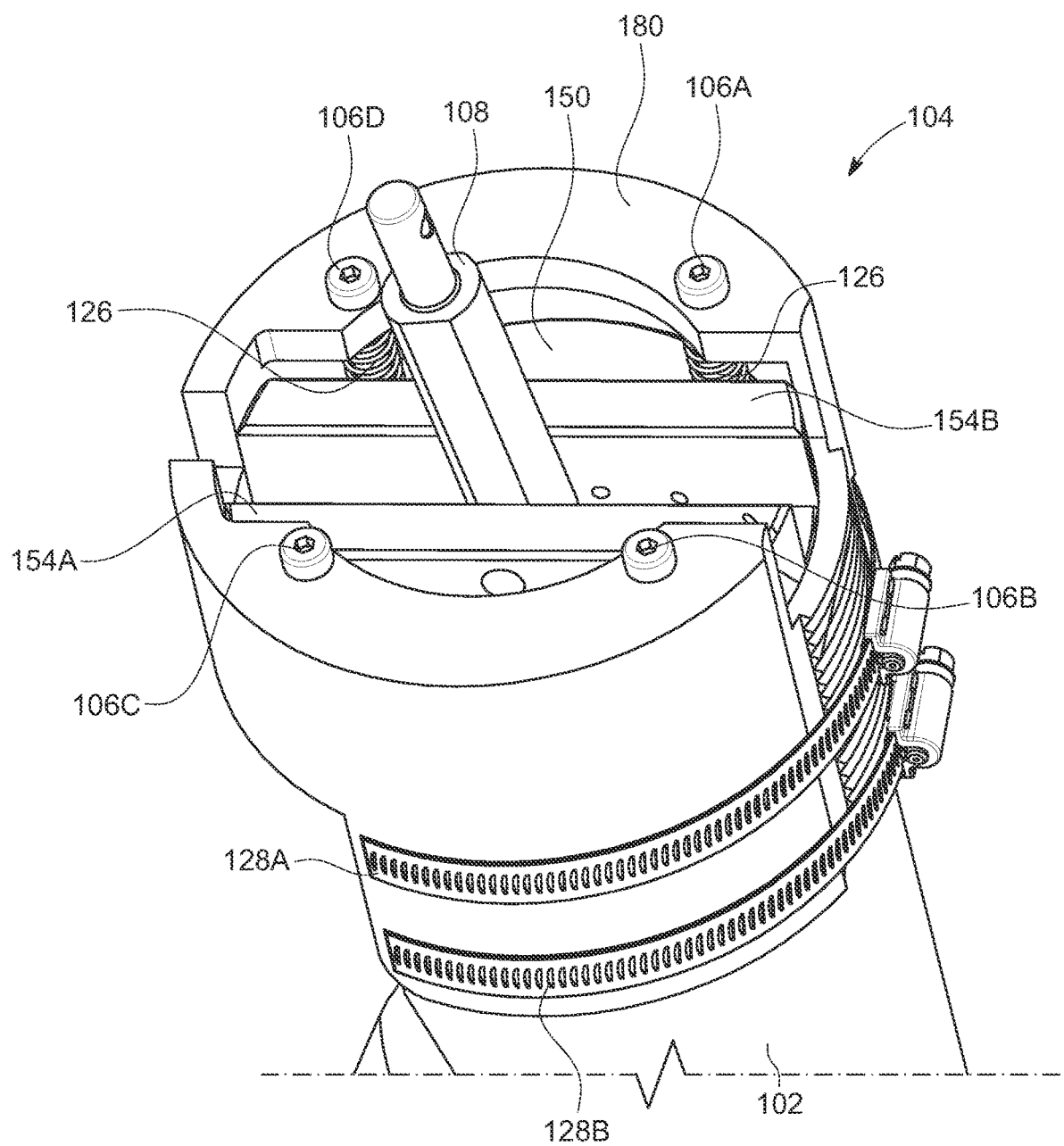
FIG. 10C shows yet another perspective view of the first clamping assembly sleeve and the first elongated member of FIGS. 10A and 10B.

Referring to FIGS. 10A-10C, in one embodiment, the first clamping assembly sleeve 124 of the first clamping assembly 104 (FIG. 1A) is preferably coupled with the upper end of the first elongated member 102. In one embodiment, the hollow body 170 of the first clamping assembly sleeve 124 is placed over the upper end of the first elongated member 102, whereby the hollow body covers the upper end of the first elongated member. In one embodiment, the spaced flanges 154A, 154B at the upper end of the first elongated member are adjacent the fastener flange 150 at the upper end of the first clamping assembly sleeve 124. A pivot pin (not shown) preferably pivotally connects the lower end 202 of the first external connector 108 with the spaced flanges 154A, 154B. The first clamping assembly fasteners 106A-106D pass through the spaced bores formed in the fastener flange 180 of the first clamping assembly sleeve 124 and the threaded ends of the respective first clamping assembly fasteners 106A-106D are threaded into the internally threaded bores 152A-152D (FIG. 4A) provided at the top surface 150 of the first elongated member 102 for securing the first clamping assembly sleeve 124 to the upper end of the first elongated member 102. The first clamping assembly springs 126 preferably extend between an underside of the first clamping assembly fastener flange 180 of the first clamping assembly sleeve 124 and the top surface 150 of the first elongated member 102.

In one embodiment, the front face of the first clamping assembly sleeve 124 desirably has a plurality of teeth 184 projecting therefrom that are adapted to engage a substrate secured to the first clamping assembly sleeve 124. The first clamping assembly locking bands 128A, 128B may be secured over the outer surface of the first clamping assembly sleeve 124. The locking bands 128A, 128B are preferably aligned with the plurality of teeth 184 that project from the front side of the first clamping assembly sleeve 124. The locking bands 124A, 124B may be selectively loosened and tightened for securing an end of a substrate to the first clamping assembly sleeve 124 of the first clamping assembly 104 (FIG. 2A). In one embodiment, the bands may be tightened for pinching a substrate against the teeth to lock the substrate in place on the outer surface of the first clamping assembly sleeve.

Figure 11:
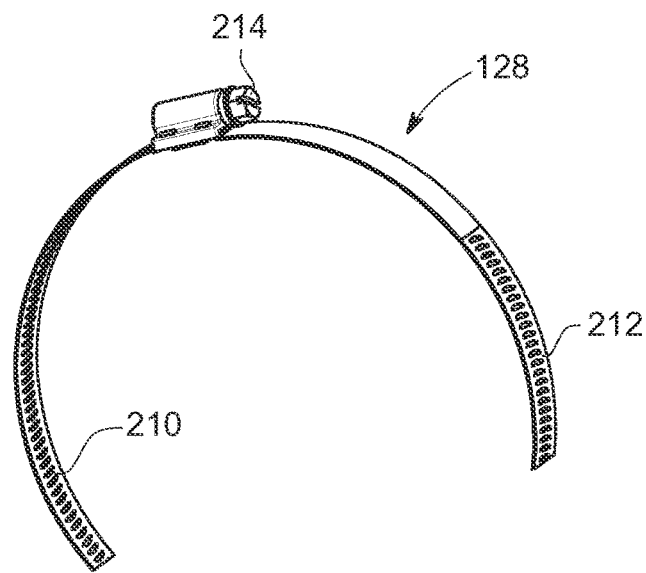
FIG. 11 shows perspective view of a clamping assembly sleeve locking band, in accordance with one embodiment of the present patent application.

Referring to FIG. 11, in one embodiment, a clamping assembly locking band 128 may include a first elongated band 210, a second elongated band 212, and a captive screw 214 that may be rotated in a first direction for loosening the elongated bands 210, 212 and a second, opposite direction for tightening the elongated bands 210, 212.

Figure 12:
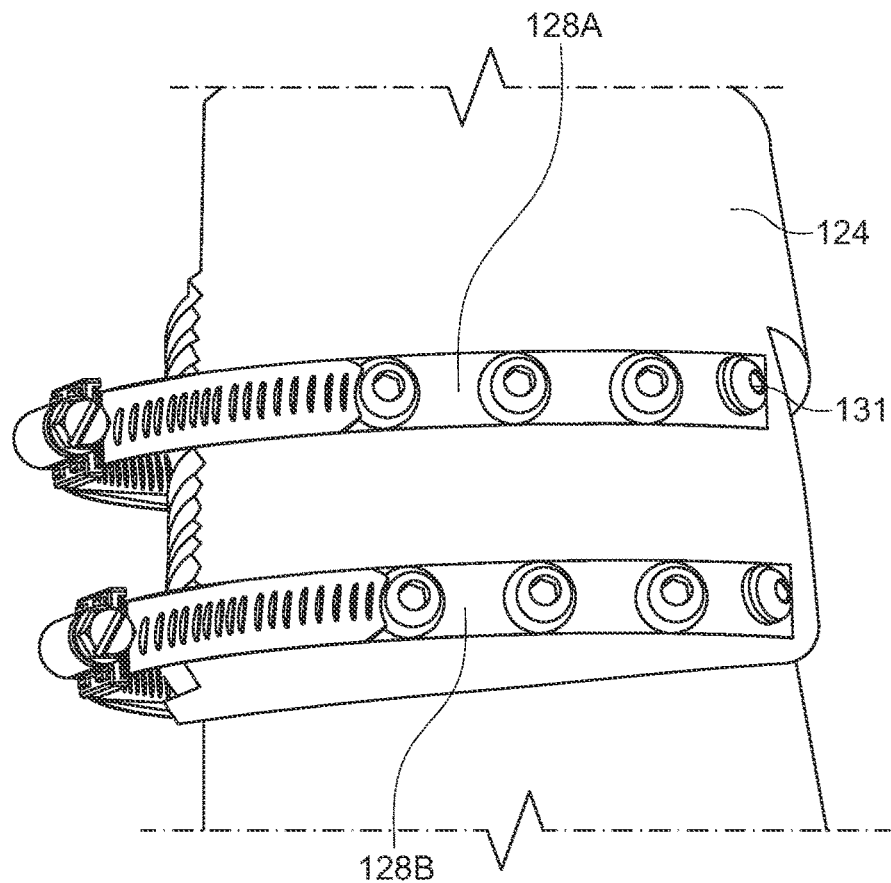
FIG. 12 shows a perspective view of two clamping assembly sleeve locking bands being secured to the first clamping assembly sleeve of FIGS. 5A-5D, in accordance with one embodiment of the present patent application.

Referring to FIG. 12, in one embodiment, a system 100 (FIG. 1A) may include an upper first clamping assembly locking band 128A secured within an upper groove formed in the outer surface of the first clamping assembly sleeve 124, and a lower first clamping assembly locking band 128B secured within a lower groove formed in the outer surface of the first clamping assembly sleeve 124. One or more fasteners 131 may be driven through the respective locking bands 128A, 128B for securing the elongated bands of the respective locking bands 128A, 128B to the outer surface of the first clamping assembly sleeve 124.

Referring to FIGS. 13A-13D, in one embodiment, the second elongated member 110 preferably includes an upper end and a lower end. In one embodiment, the second elongated member 110 may have an elongated cylindrical shape with a convex surface 138 located at the upper end thereof. The cylindrical shape of the second elongated member may replicate the shape of a lower leg of a human including the knee portion of the leg. In one embodiment, the convex surface 138 may include a semi-spherical convex surface. In one embodiment, the semi-spherical convex surface 138 is adapted to engage the semi-spherical concave surface 136 (FIGS. 3A and 3B) located at the lower end of the first elongated member 102 (FIG. 3A). In one embodiment, the second elongated member 110 preferably includes a front side 210 that is solid and rear side 212 that is hollow or concave. In one embodiment, the second elongated member 110 desirably includes a laterally extending bore 214 that is adapted to receive the pivot pin 122 that passes through the opening at the lower end 144 of the hinge joint 120 (FIG. 3A).

Figure 13D:
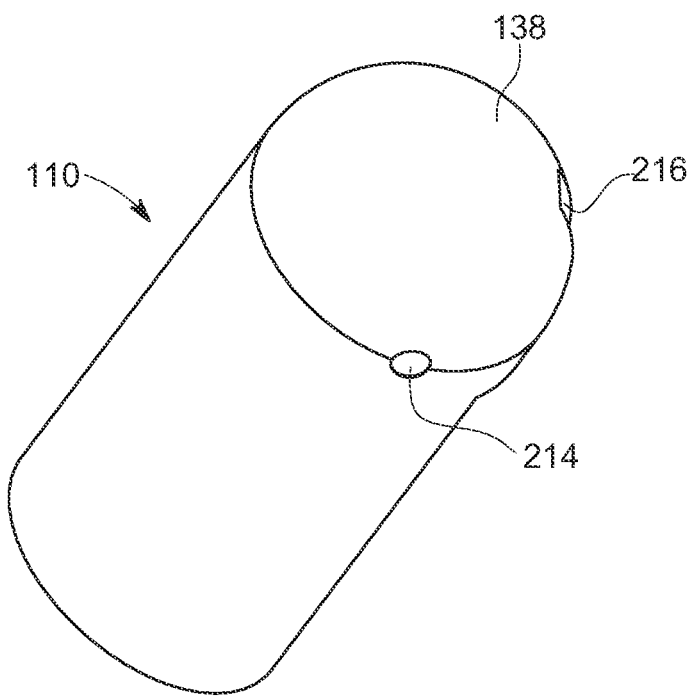
FIG. 13D shows a perspective view of an upper end of the second elongated member shown in FIGS. 13A-13C.
Figure 13E:
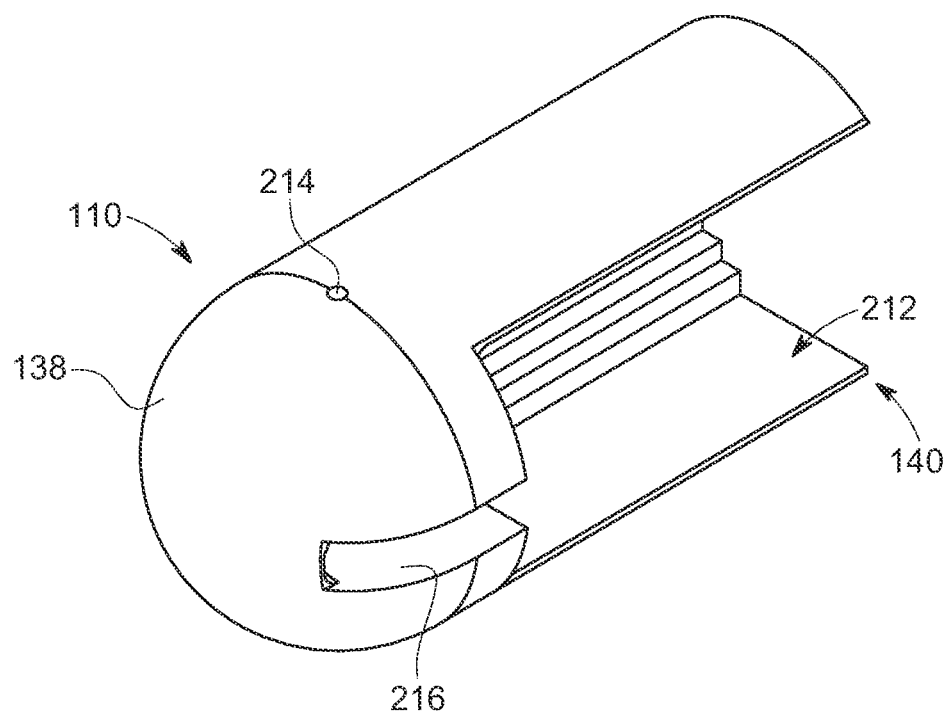
FIG. 13E shows a perspective view of a rear side of the second elongated member shown in FIGS. 13A-13D.

Referring to FIGS. 13C-13E, in one embodiment, the second elongated member 110 preferably has a slot 216, such as a vertically extending slot, formed therein that is adapted to receive a portion of the hinge joint 120 (FIG. 3A). During flexion and extension of the hinge joint, a portion of the hinge joint may swing through the slot 216. In one embodiment, the width of the vertical slot 216 is preferably slightly wider than the width of the hinge joint 120 (FIG. 3B) to enable the hinge joint 120 to move and/or swing through the vertically extending slot 216 as the first and second elongated members pivot relative to one another for flexing and extending the system.

Figure 13F:
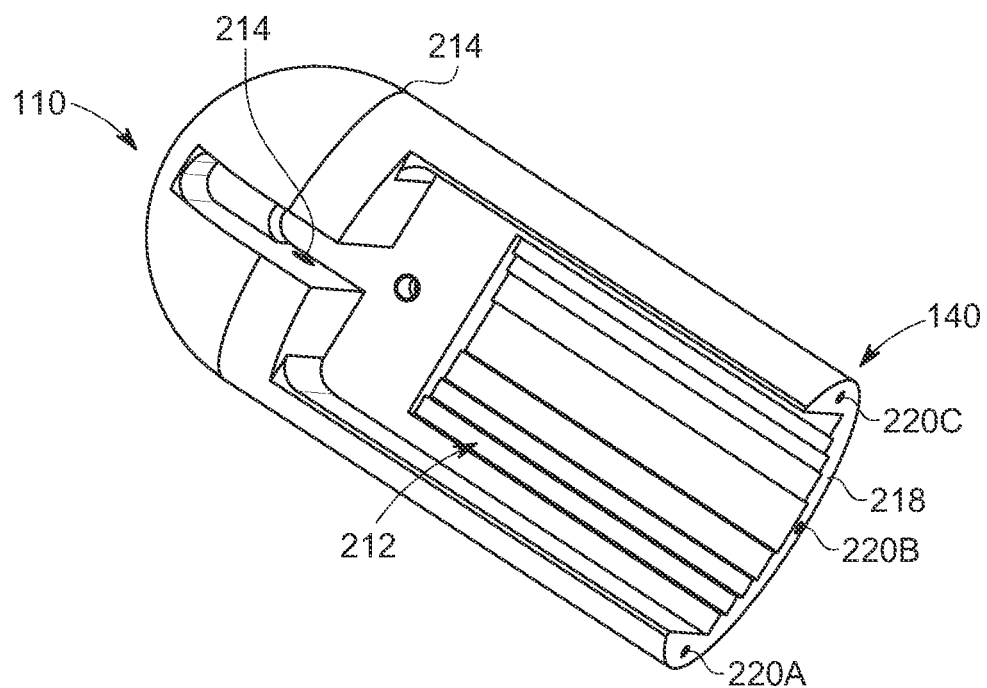
FIG. 13F shows another perspective view of the rear side of the second elongated member shown in FIGS. 13A-13E.
Figure 13G:
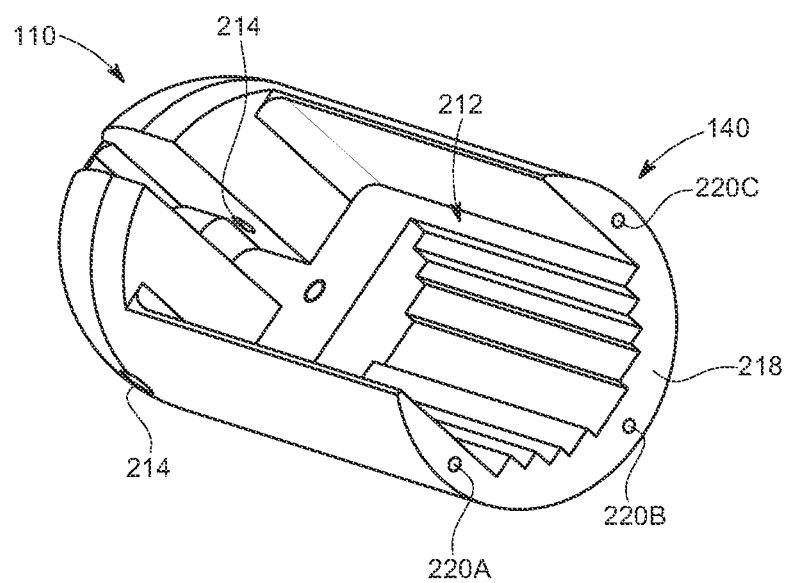
FIG. 13G shows a perspective view of an underside of the second elongated member shown in FIGS. 13A-13F.

Referring to FIGS. 13E-13G, in one embodiment, the rear side 212 of the second elongated member 110 is preferably hollow. The bore 214 preferably extends laterally from one side of the second elongated member 110 to the opposite side of the second elongated member so that the pivot pin 122 (FIG. 3B) may extend through the second elongated member. The lower end of the second elongated member 110 desirably has a lower end face 218 having internally threaded bores 220A-220C that are adapted to receive lower plate fasteners (not shown) for securing the lower plate 129 (FIGS. 2A and 2B) to the lower end 140 of the second elongated member 110.

Referring to FIGS. 14A-14D, in one embodiment, the system 100 (FIG. 1A) desirably includes a lower plate 129 (FIG. 2A) that may be secured to the lower end of the second elongated member 110 (FIGS. 13F and 13G). In one embodiment, the lower plate 129 desirably includes a disc 222 having a bottom surface 224 and a top surface 226. In one embodiment, the lower plate 129 preferably includes lower plate openings 228A-228C that are spaced from one another. In one embodiment, the lower plate openings 228A-228C are configured for alignment with the internally threaded openings 220A-220C found at the lower end of the second elongated member 110 (FIG. 13G), which are used for securing the lower plate to the lower end of the second elongated member. In one embodiment, threaded fasteners are passed through the openings 228A-228C in the lower plate for securing the lower plate 129 to the lower end of the second elongated member 110 (FIG. 13G). In one embodiment, the lower plate 129 preferably includes internally threaded openings 230A-230D that are spaced from one another around the outer perimeter of the disc 222. In one embodiment, the internally threaded openings 230A-230D are adapted to receive the second clamping assembly fasteners 114 for coupling the second clamping assembly sleeve 130 (FIGS. 2A and 2B) with the lower plate 129 secured to the lower end of the second elongated member 110 (FIG. 13G).

In one embodiment, the lower plate 129 preferably includes first and second spaced flanges 232A that project from the bottom surface 224 of the disc 222. In one embodiment, the spaced flanges 232A, 232B have aligned openings 234A, 234B that are adapted to receive a pin for pivotally connecting an upper end of the second external connector 116 (FIG. 2B) with the lower plate 129, whereupon the second external connector is configured to pivot relative to the spaced flanges 232A, 232B of the lower plate 129.

Referring to FIGS. 15A-15D, in one embodiment, the system preferably includes a second clamping assembly sleeve 130 (FIG. 2B) that is desirably secured to the lower end of the second elongated member 110 (FIG. 1A). In one embodiment, the second clamping assembly sleeve 130 preferably includes an upper end 240, a lower end 242, and a hollow, cylindrical-shaped body 244 that desirably extends between the upper end 240 and the lower end 242. In one embodiment, the second clamping assembly sleeve 130 desirably includes an internally extending fastener flange 246, which may be adjacent the lower end 242 of the sleeve 130, having a top surface 248 and a bottom surface 250 with spaced openings 252A-252D extending from the top surface 248 to the bottom surface 250. In one embodiment, the spaced openings 250A-250D are adapted to receive the second clamping assembly fasteners 114 (FIGS. 2A and 2B)

for securing the second clamping assembly sleeve 130 over the lower end of the second elongated member 110 (FIG. 1A).

In one embodiment, the lower sleeve preferably includes a front side 254 having a roughened surface such as a plurality of teeth 256 that project from the outer surface of the cylindrical-shaped body 244. In one embodiment, the plurality of teeth 256 are adapted to engage a substrate for biting into the substrate and preventing the substrate from sliding relative to the second clamping assembly sleeve 130.

In one embodiment, the second clamping assembly sleeve 130 desirably includes a rear side 258 having an opening 260 (FIG. 15A) formed in the outer wall of the cylindrical-shaped body 244.

In one embodiment, the outer surface of the body 244 of the second clamping assembly sleeve 130 desirably includes an upper groove 262A and a lower groove 262B that are adapted to seat the second clamping assembly locking bands 134A, 134B (FIGS. 2A and 2B). In one embodiment, each of the grooves 262A, 262B desirably includes a series of spaced openings 263 (FIGS. 15A and 15B) that may receive fasteners for securing the second clamping assembly bands in place within the grooves 186A, 186B. In one embodiment, the teeth 256 at the outer surface of the second clamping assembly sleeve 130 are adapted to engage an upper end of a substrate when the substrate is secured to the second clamping assembly sleeve 130. The second clamping assembly locking bands 134A, 134B (FIGS. 2A and 2B may be loosened to position an end of a substrate between the bands and the teeth, and tightened to pinch the end of the substrate between the locking bands and the plurality of teeth 256.

Figure 14A:
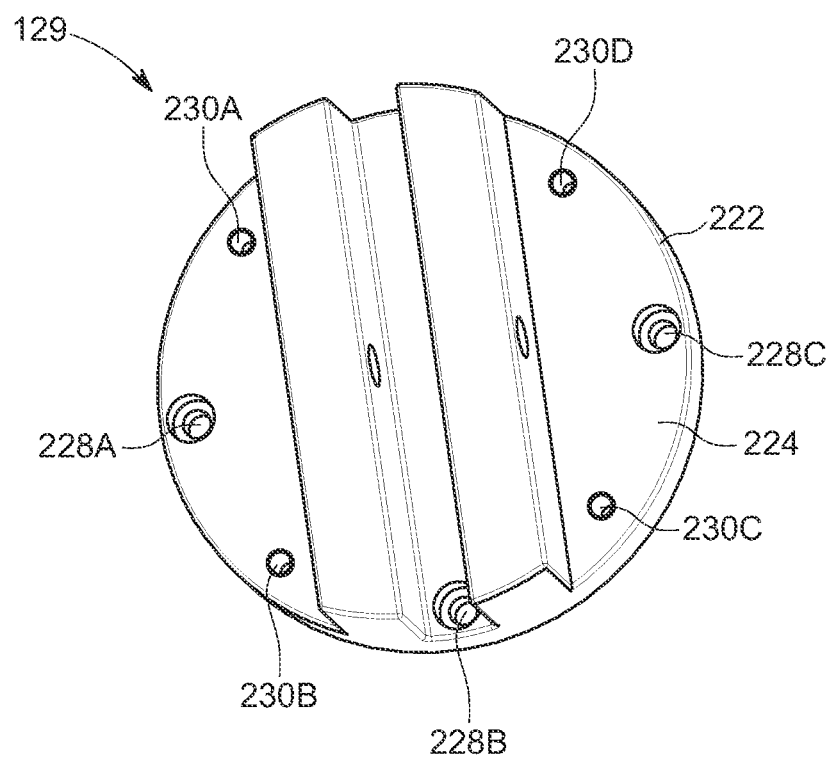
FIG. 14A shows a perspective view of a bottom side of a lower plate that is secured to a lower end of the second elongated member shown in FIGS. 13A-13G, in accordance with one embodiment of the present patent application.
Figure 14B:
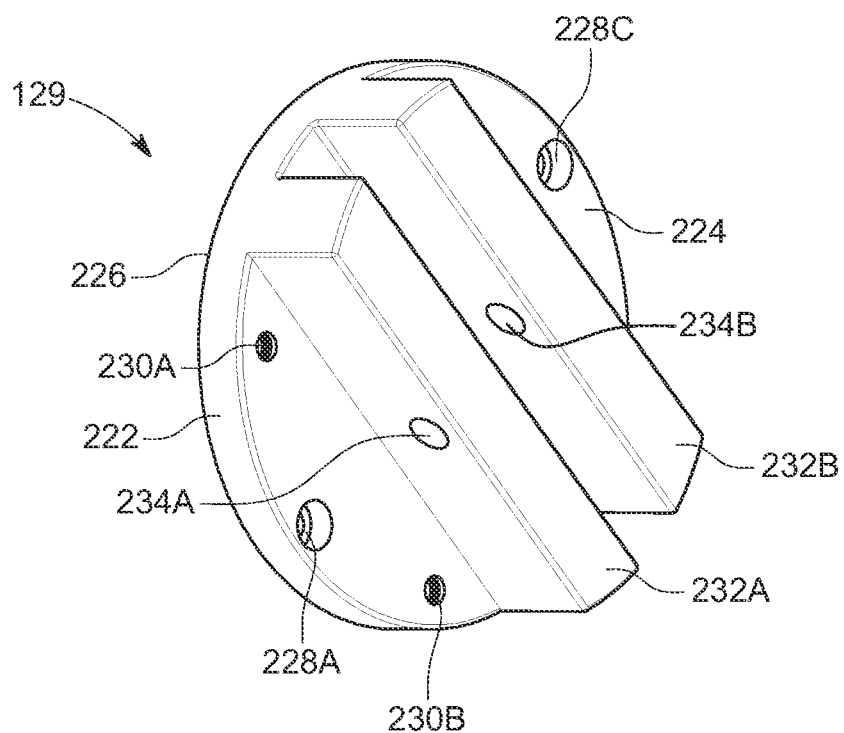
FIG. 14B shows another perspective view of the bottom side of the lower plate shown in FIG. 14A.
Figure 14C:
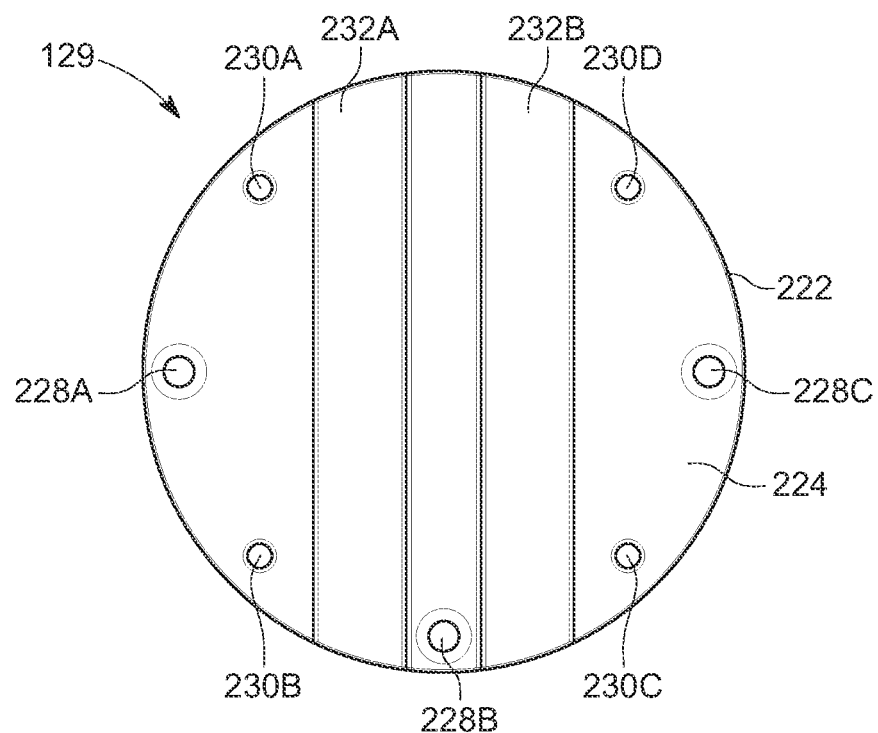
FIG. 14C shows a bottom view of the lower plate shown in FIGS. 14A and 14B.
Figure 14D:
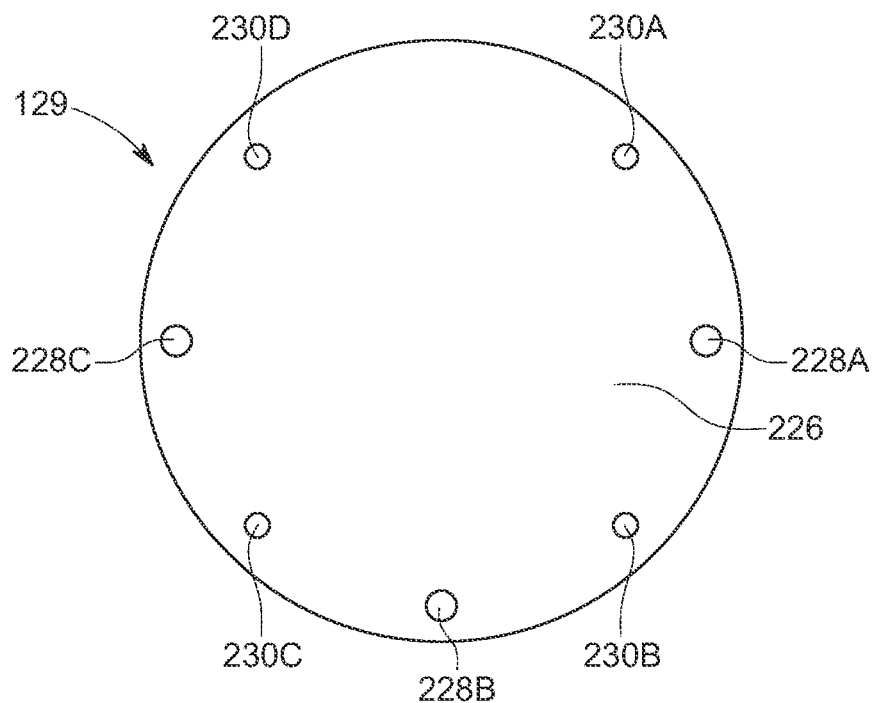
FIG. 14D shows a top plan view of the lower plate shown in FIGS. 14A-14C.
Figure 15A:
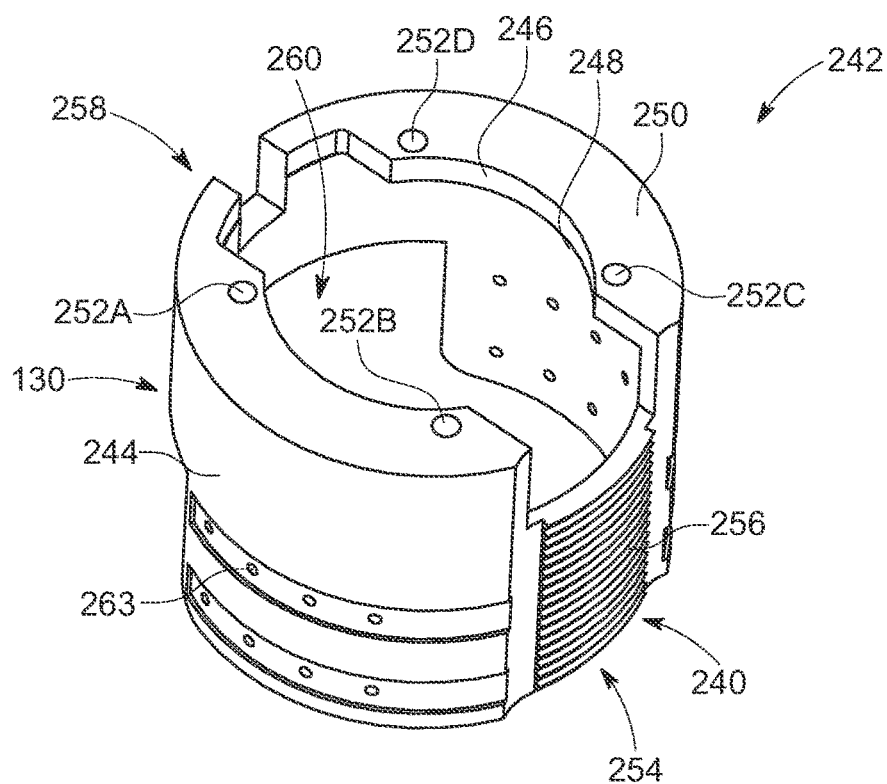
FIG. 15A shows a perspective view of an underside of a second clamping assembly sleeve that is assembled with the second elongated member of FIGS. 13A-13G, in accordance with one embodiment of the present patent application.
Figure 15B:
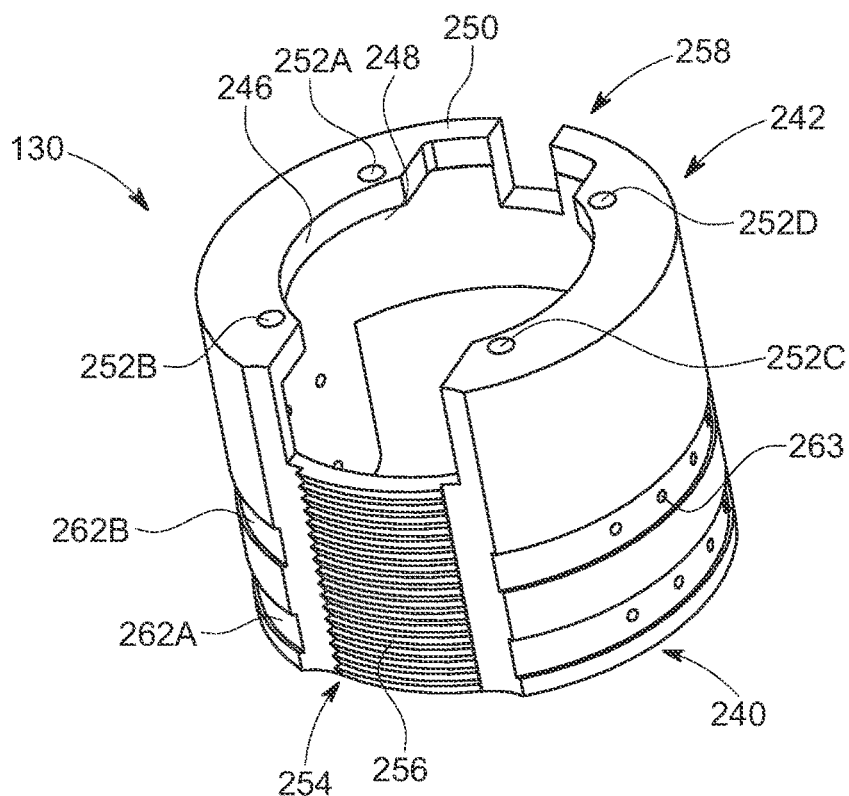
FIG. 15B shows another perspective view of the second clamping assembly sleeve shown in FIG. 15A.
Figure 15C:
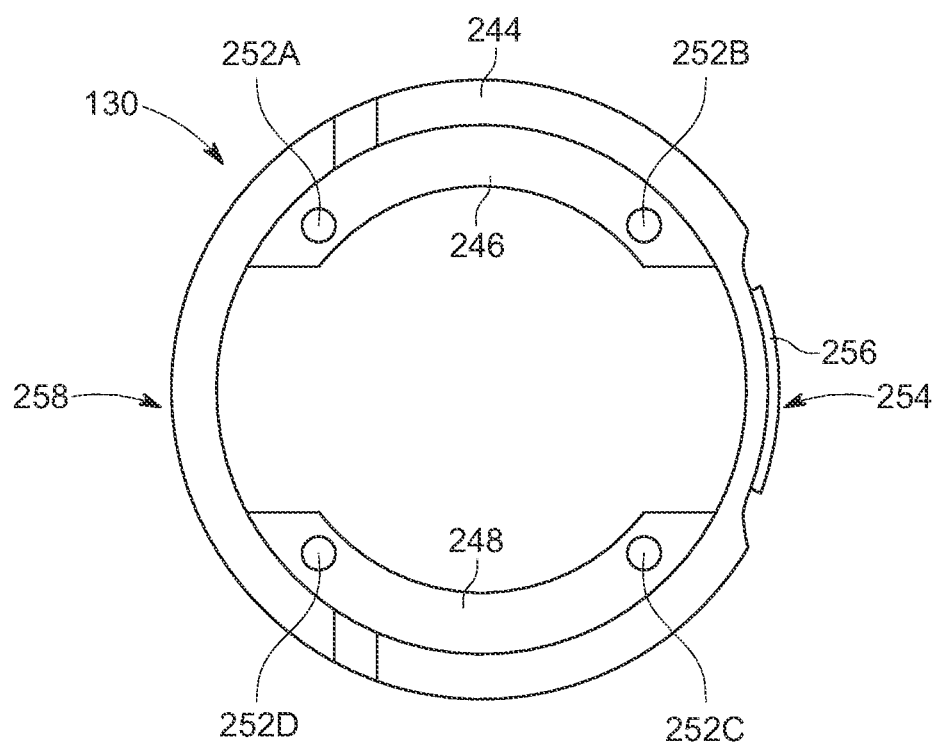
FIG. 15C shows a top plan view of the second clamping assembly sleeve shown in FIGS. 15A and 15B.
Figure 15D:
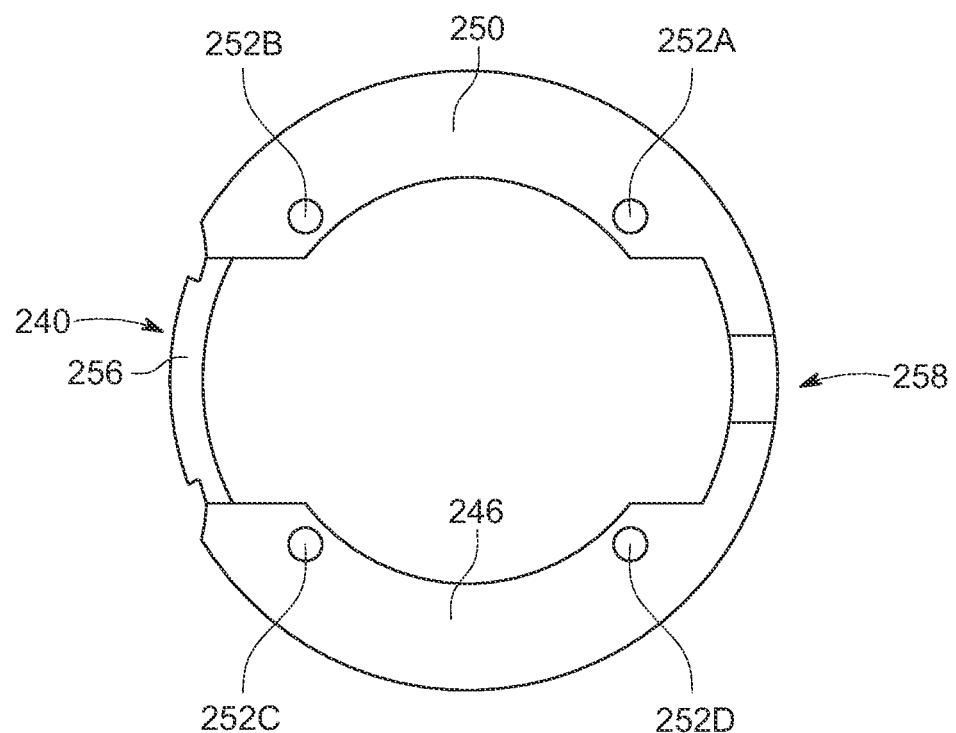
FIG. 15D shows a bottom view of the second clamping assembly sleeve shown in FIGS. 15A-15C.
Figure 16A:
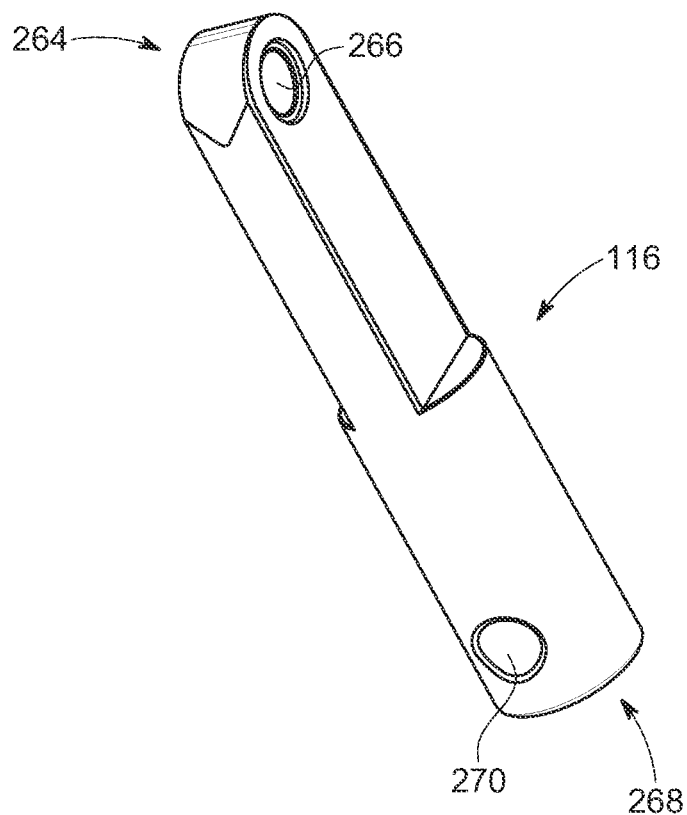
FIG. 16A shows a perspective view of a second external connector that is adapted to be pivotally connected with the lower plate shown in FIGS. 14A-14D, in accordance with one embodiment of the present patent application.
Figure 16B:
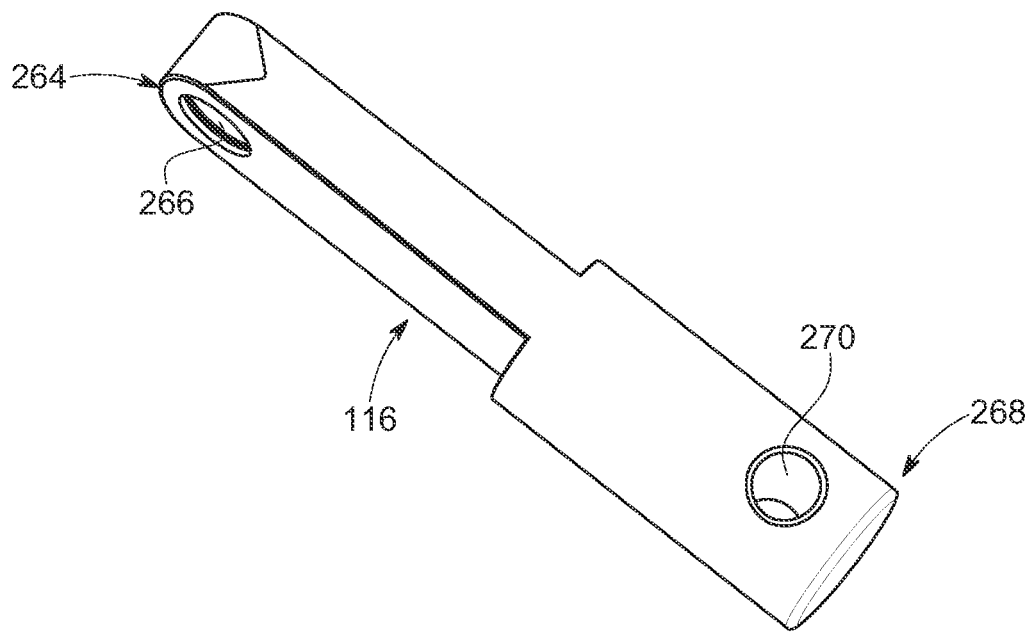
FIG. 16B shows another perspective view of the second external connector shown in FIG. 16A.

Referring to FIGS. 16A and 16B, in one embodiment, the system desirably includes a second external connector 116 that is adapted to be secured to the lower plate 129 (FIGS. 2A and 2B), which, in turn, is secured to the lower end of the second elongated member 110 (FIG. 2A). In one embodiment, the second external connector 116 desirably has an upper end 264 with an upper opening 266 and a lower end 268 with a lower opening 270. In one embodiment, the upper end 264 of the second external connector 116 desirably has a smaller width than the lower end 268 of the second external connector. In one embodiment, a pin may be passed through the upper opening 266 for pivotally coupling the second external connector 116 with the spaced flanges 232A, 232B (FIG. 14B) of the lower plate 129 (FIG. 14B). In one embodiment, a fastener such as a pin may be passed through the lower opening 270 of the second external connector 116 for securing the second external connector 116 with an external component such as an actuator that moves the second elongated member or a stationary base.

Figure 17A:
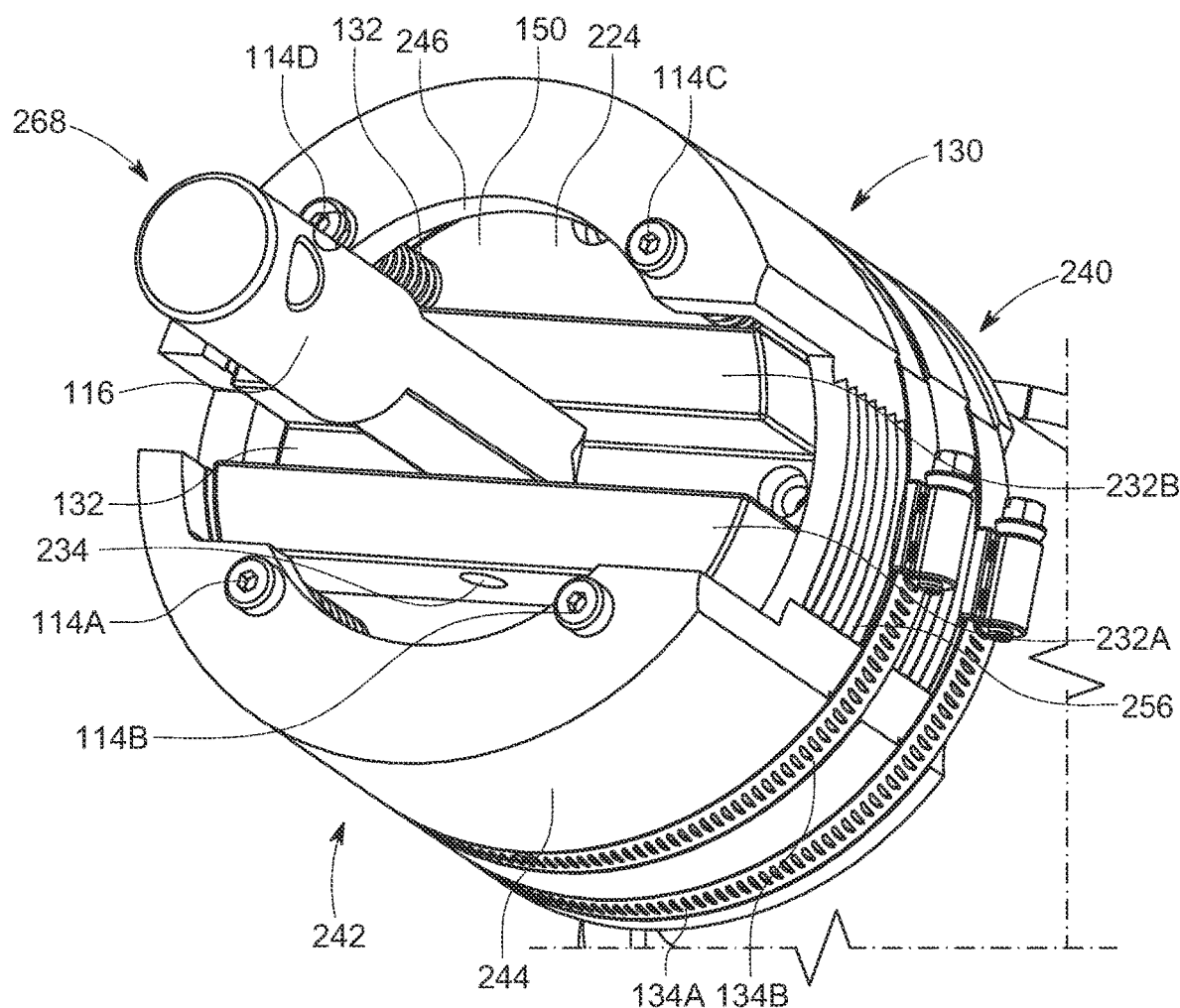
FIG. 17A shows a perspective view of a lower end of a system for testing substrates on a flexible joint including a second elongated member, a second clamping assembly coupled with the second elongated member, and a second external connector pivotally connected a lower end of the second elongated member, in accordance with one embodiment of the present patent application.
Figure 17B:
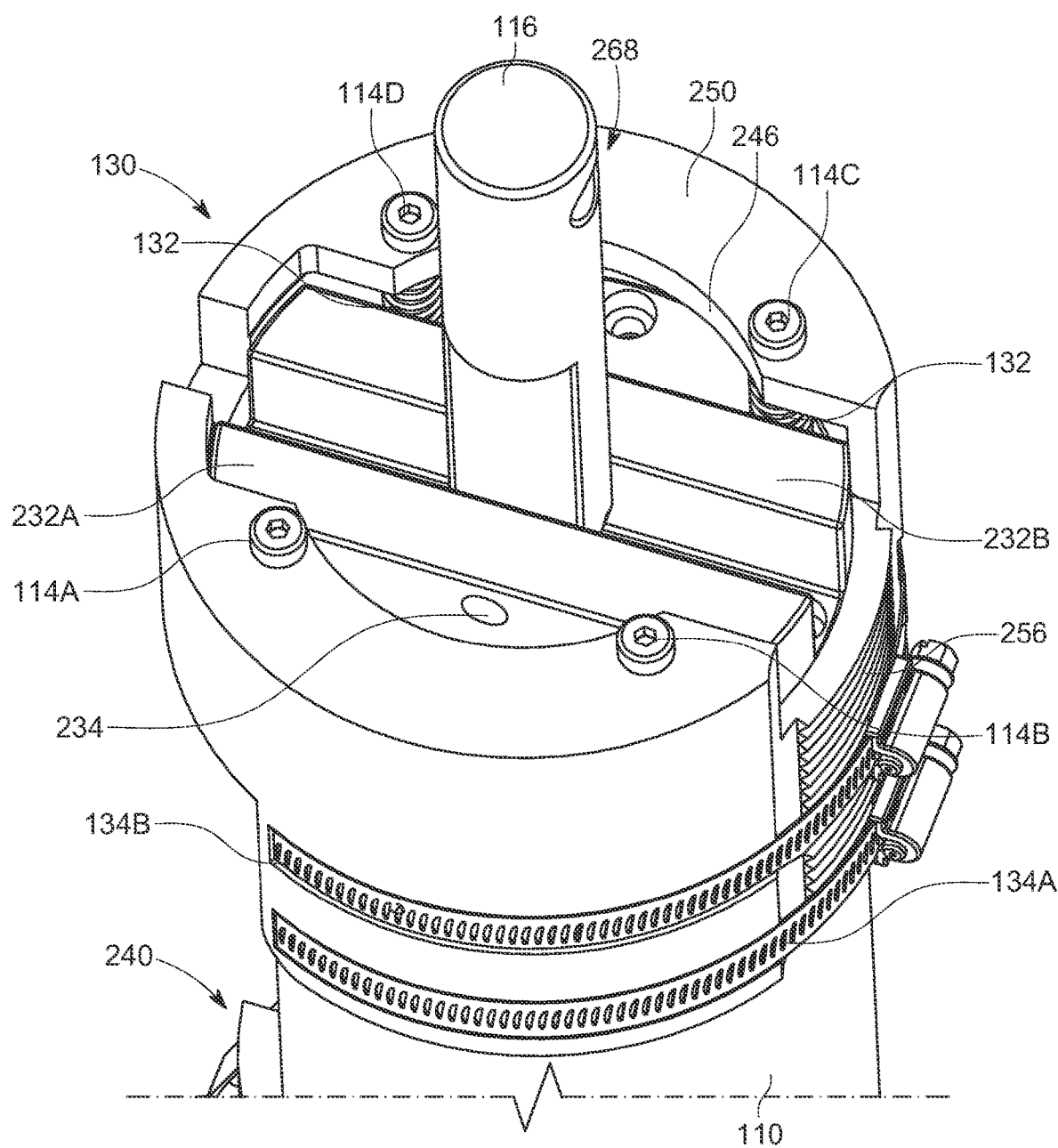
FIG. 17B shows another perspective view of the system shown in FIG. 17A.
Figure 17C:
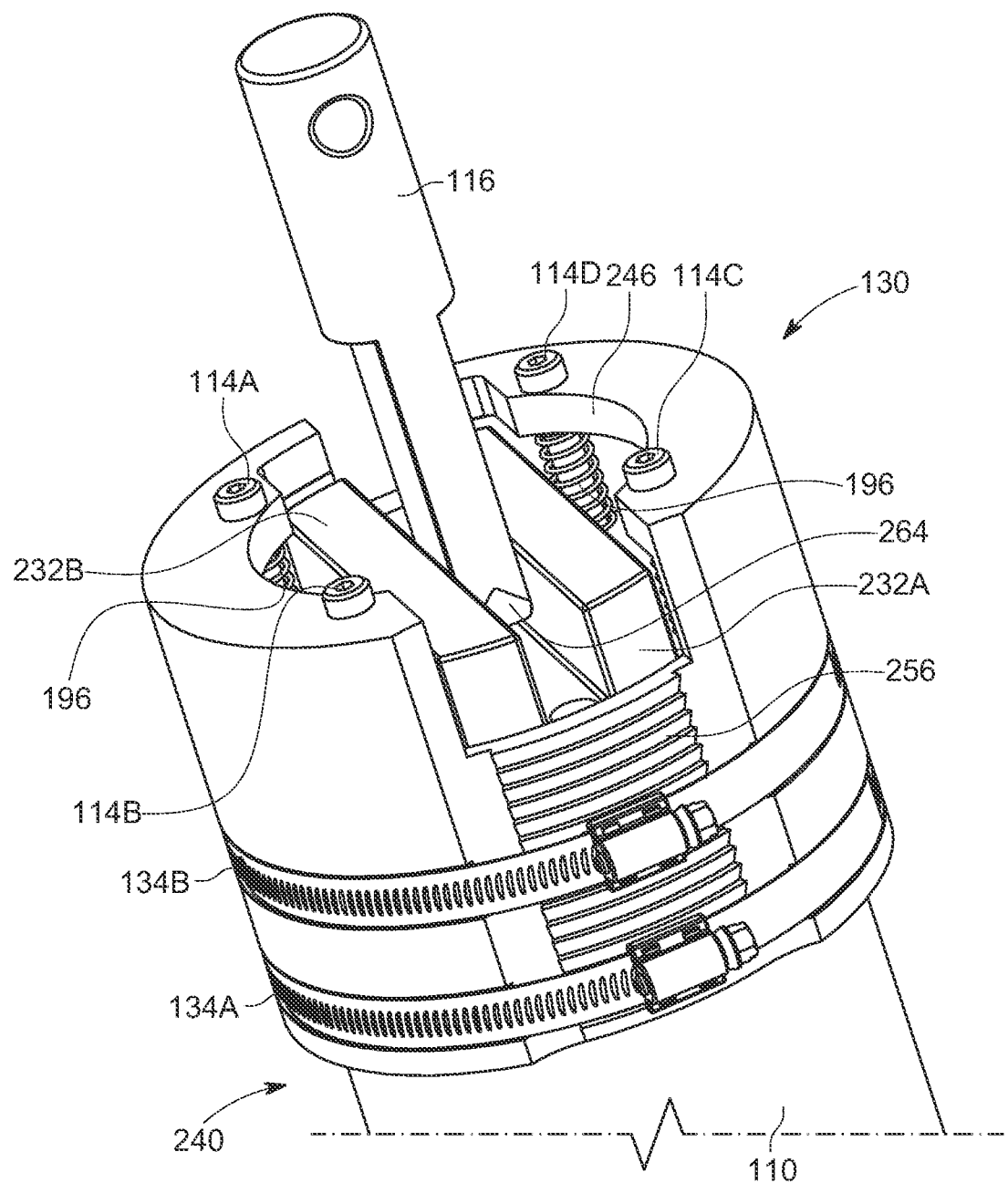
FIG. 17C shows another perspective view of the system shown in FIGS. 17A and 17B.

Referring to FIGS. 17A-17C, in one embodiment, the lower plate 129 may be secured to the lower end of the second elongated member 110 by using fasteners such as screw fasteners and/or clips. The second clamping assembly sleeve 130 is preferably positioned over the lower plate 129 and the lower end of the second elongated member 110 whereupon the spaced flanges 232A, 232B of the lower plate 129 are positioned inside the body 244 of the second clamping assembly sleeve 130, adjacent the inwardly extending fastener flange 246. In one embodiment, second clamping assembly fasteners 114A-114D are preferably passed through the spaced openings 252A-252D (FIG. 15A) provided in the inwardly extending fastener flange 246 that is located at the lower end 242 of the second clamping assembly sleeve 130. As described above, a second clamping assembly spring 132 (FIG. 2B) is preferably positioned over each of the elongated shafts of the respective second clamping assembly fasteners 114A-114D. The springs 132 may be compression springs that store potential energy when compressed. In one embodiment, the second clamping assembly springs 132 preferably extend between the top surface 248 (FIG. 15C) of the fastener flange 246 and the bottom surface 224 (FIG. 14C) of the lower plate 129.

In one embodiment, the upper end 264 of the second external connector 116 is pivotally connected with the spaced flanges 232A, 232B of the lower plate 129 by passing a pin through the aligned openings 234 in the respective spaced flanges. In one embodiment, after the upper end 264 of the second external connector 116 has been pivotally secured to the lower plate 129, the second external connector 116 is free to pivot between the spaced flanges 232A, 232B and relative to the bottom surface 224 (FIG. 14B) of the lower plate 129.

In one embodiment, second clamping assembly locking bands 134A, 134B may be secured within the grooves provided on the second clamping assembly sleeve 130. The respective second clamping assembly locking bands 134A, 134B may be loosened for positioning a section of a substrate between the bands and the plurality of teeth 256 provided at the outer surface of the cylindrical-shaped body 244. When a section of a substrate is positioned below the locking bands 134A, 134B for being positioned between the bands and the teeth 256, the captured screws on the respective locking bands 134A, 134B may be tightened for securing the substrate to the second clamping assembly sleeve 130 so that the substrate does not slide and/or shift relative to the position of the second clamping assembly sleeve 130.

Figure 18A:
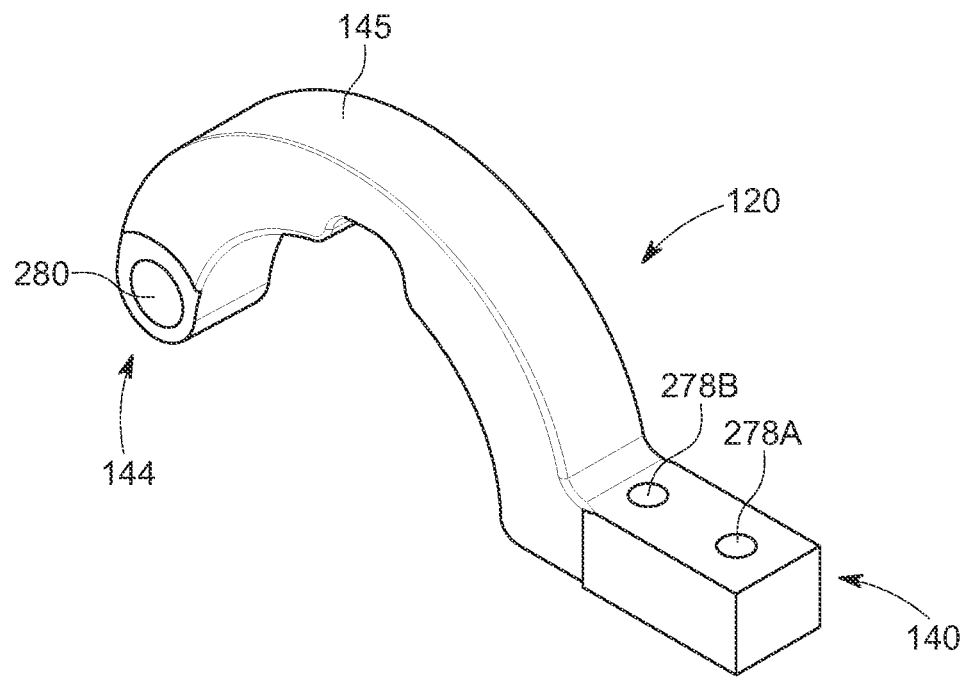
FIG. 18A shows a perspective view of a hinge joint for connecting the first elongated member of FIGS. 4A-4F with the second elongated member of FIGS. 13A-13G, in accordance with one embodiment of the present patent application.
Figure 18B:
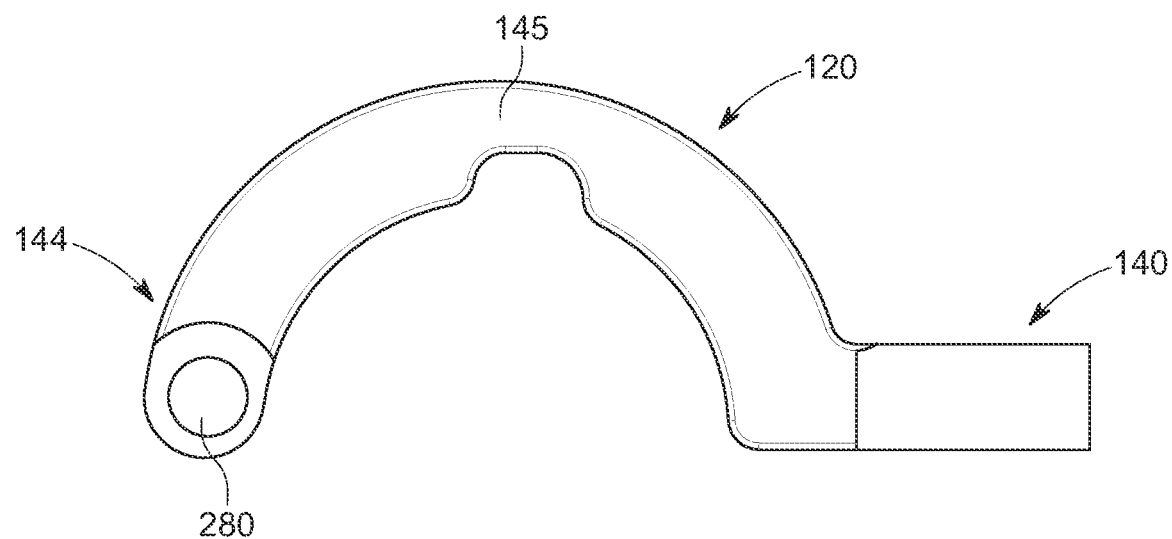
FIG. 18B shows a side view of the hinge joint shown in FIG. 18A.

Referring to FIGS. 18A and 18B, in one embodiment, the system preferably includes a hinge joint 120 (FIG. 3A) that interconnects the first elongated member 102 (FIG. 3B) with the second elongated member 110 (FIG. 3B) and enables the first and second elongated members to move relative to one another (e.g., flex and extend within a plane). In one embodiment, the hinge joint 120 desirably has an upper end 140 and a lower end 144. In one embodiment, the hinge joint 120 desirably has a curved, C-shaped mid-section 145 that extends between the upper end 140 and the lower end 144 thereof. In one embodiment, the upper end 140 of the hinge joint 120 desirably has a pair of spaced openings 278A, 278B that are adapted to receive hinge joint fasteners 142A, 142B (FIGS. 3A and 3B) for securing the upper end 140 of the hinge joint 120 to the rear side of the first elongated member 102 (FIGS. 3A and 3B).

In one embodiment, the lower end 144 of the hinge joint 120 desirably has an opening 280 that is adapted to receive the pivot pin 122 (FIG. 3A) for pivotally connecting the lower end 144 of the hinge joint 120 with the second elongated member 110 (FIGS. 3A and 3B).

Figure 19A:
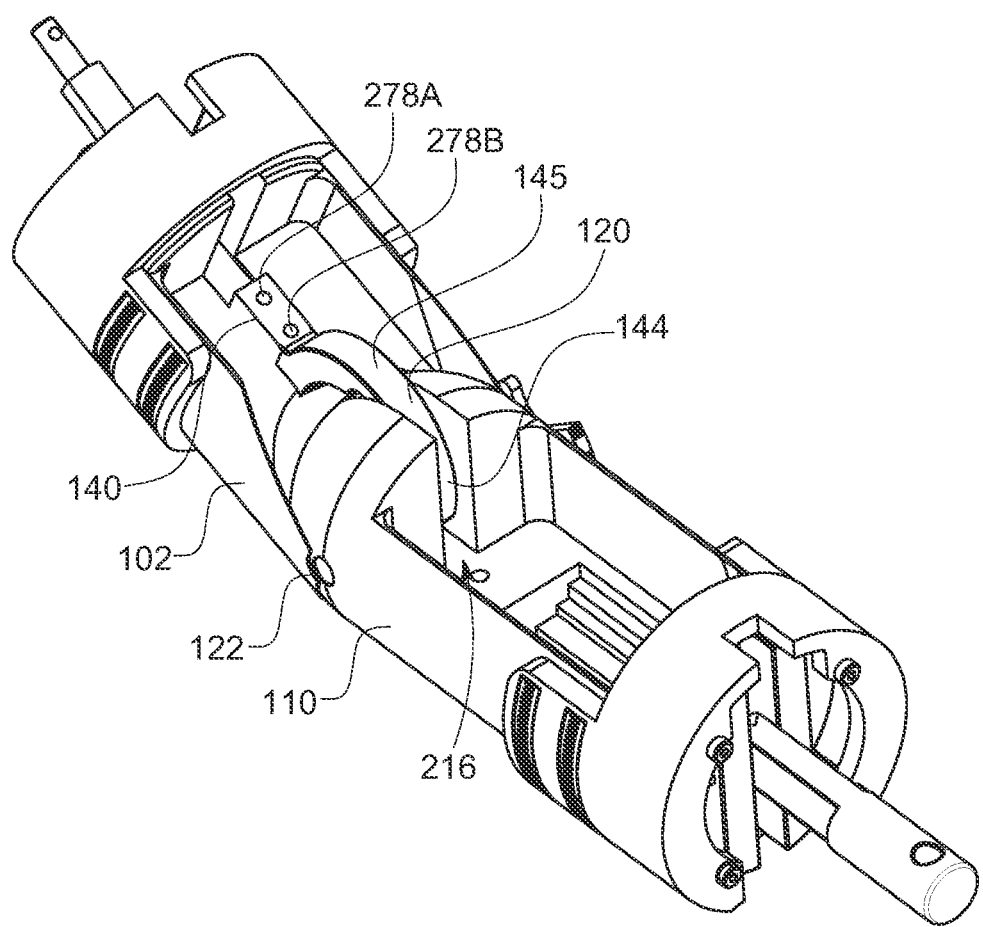
FIG. 19A shows a rear perspective view of a system for testing substrates on a flexible joint including the hinge joint of FIGS. 18A-18B joining an first elongated member with a second elongated member, in accordance with one embodiment of the present patent application.
Figure 19B:
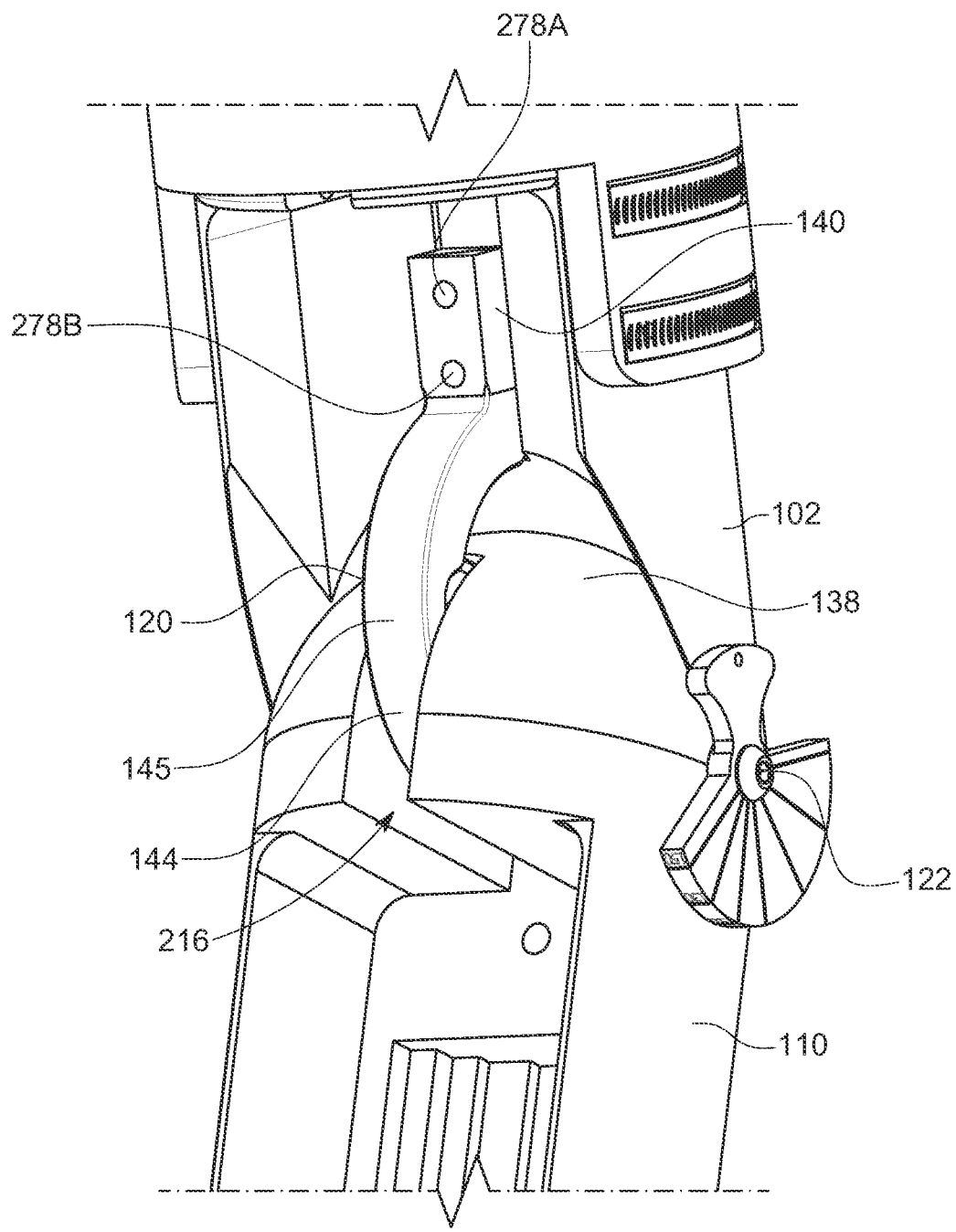
FIG. 19B shows another perspective view of the system shown in FIG. 19A.
Figure 19C:
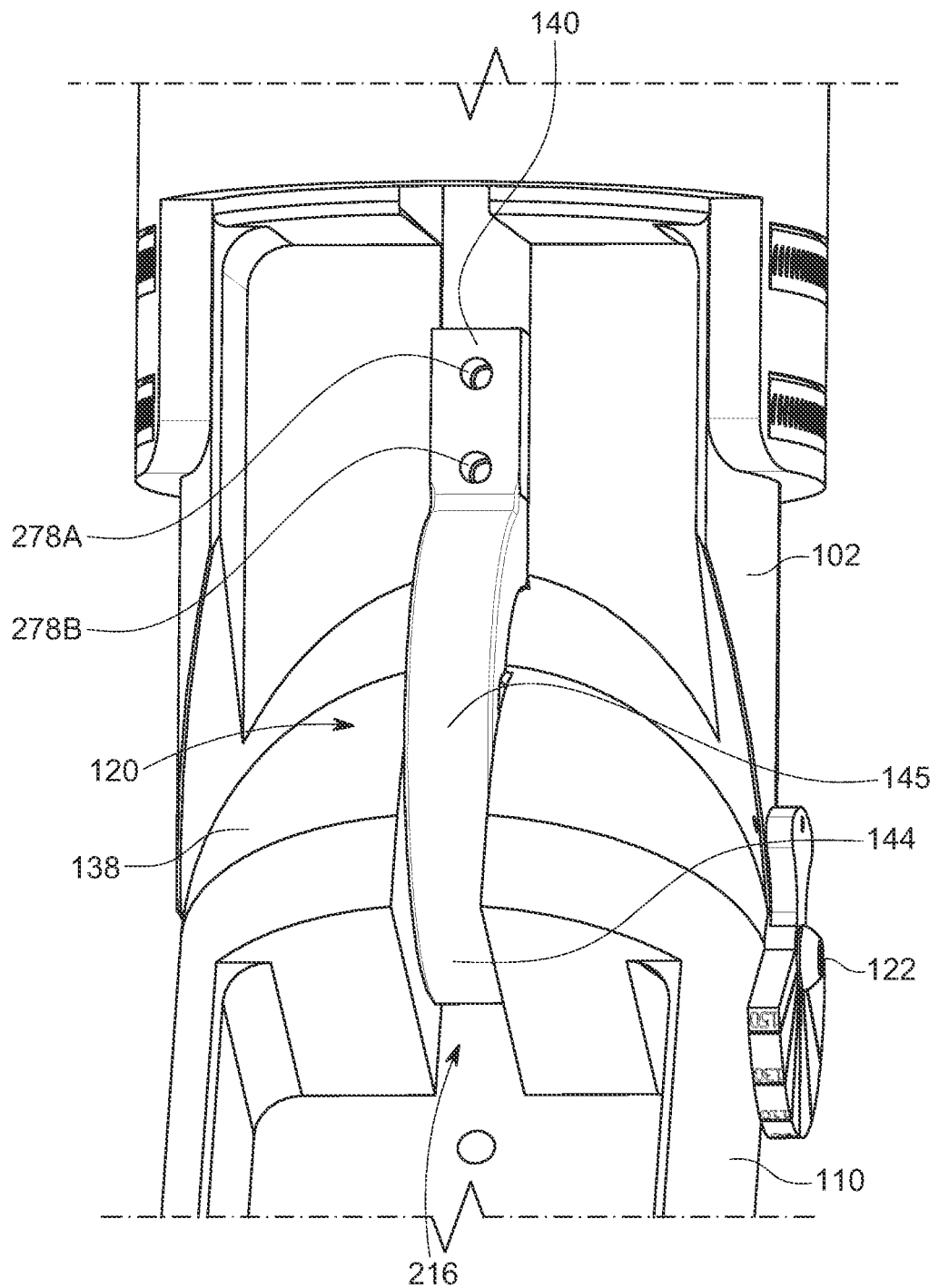
FIG. 19C shows a magnified view of the system shown in FIG. 19B.

Referring to FIGS. 19A-19C, in one embodiment, the hinge joint 120 is desirably utilized for pivotally connecting the lower end of the first elongated member 102 with the upper end of the second elongated member 110. In one embodiment, threaded fasteners 142A, 142B (FIG. 3A) are passed through the spaced openings 278A, 278B at the upper end 140 of the hinge joint 120 for securing the upper end of the hinge joint 120 to the rear side of the first elongated member 102. The curved, C-shaped midsection 145 preferably passes through the vertically extending slot 216 (FIGS. 13C and 13E) formed in the semi-spherical convex surface 138 (FIG. 13E) located at the upper end of the second elongated member 110. The pivot pin 122 desirably passes through the opening 280 (FIG. 18B) at the lower end 144 of the hinge joint 120. In one embodiment, the curved, C-shaped mid-section 145 facilitates the sliding movement of the semi-spherical concave surface at the lower end of the first elongated member over the semi-spherical convex surface at the upper end of the second elongated member. The width of the curved, C-shaped midsection 145 of the hinge joint 122 may closely match the inner dimension of the vertically extending slot 216 formed at the upper end of the second elongated member 210 for guiding pivoting movement of the first elongated member 102 relative to the second elongated member 110. In one embodiment, the hinge joint 120 limits the pivoting movement to one plane. Referring to FIG. 19A, in one embodiment, the cutout 164 at the rear lower end of the first elongated member 102 provides a space for accessing the pivot pin 122 and facilitates pivoting of the first elongated member 102 relative to the second elongated member 110.

Figure 20:
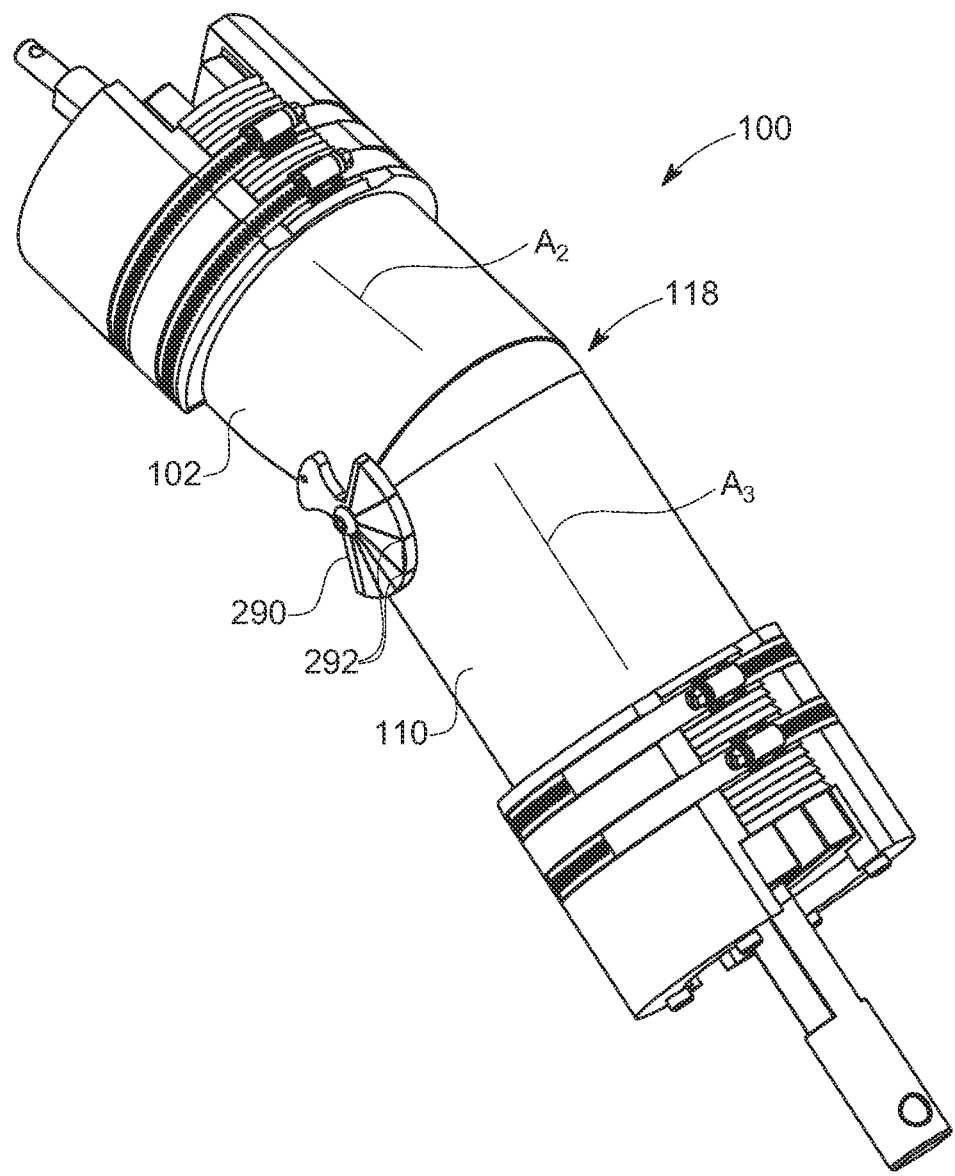
FIG. 20 shows a perspective view of a system for testing substrates on a flexible joint, in accordance with one embodiment of the present patent application.
Figure 21A:
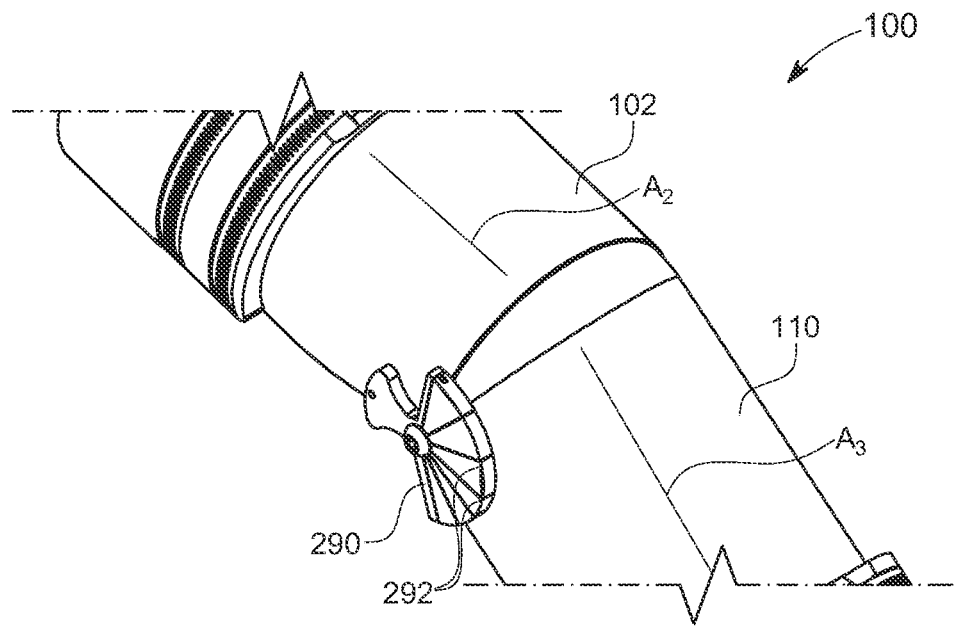
FIG. 21A shows a perspective view of a system for testing substrates on a flexible joint including an angle dial for determining the angle between an first elongated member and a second elongated member, in accordance with one embodiment of the present patent application.
Figure 21B:
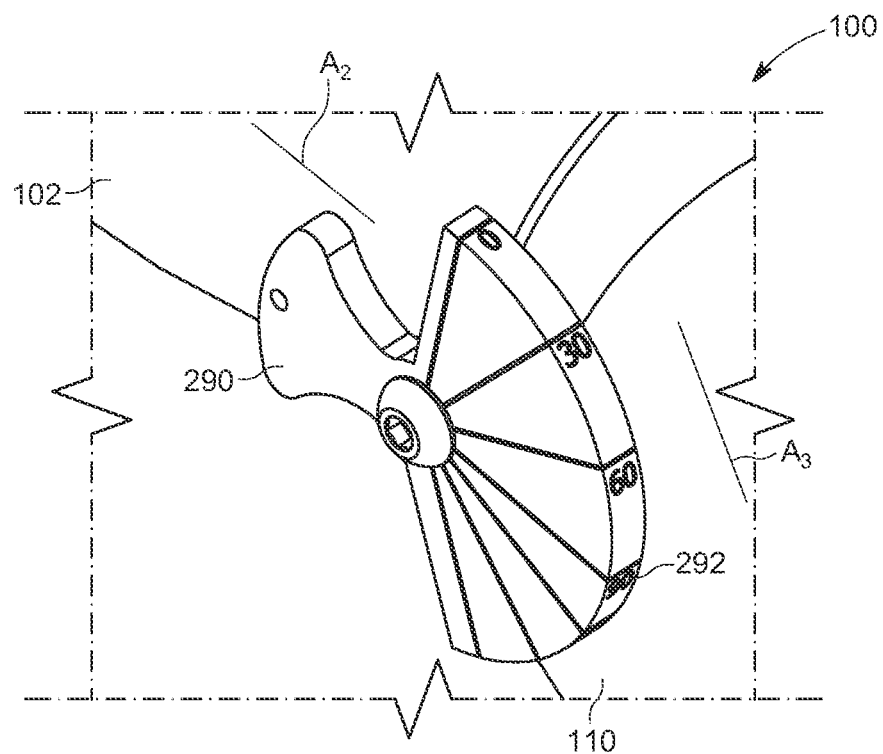
FIG. 21B shows a magnified view of the system and the angle dial shown in FIG. 21A.

Referring to FIG. 20, in one embodiment, the system 100 for testing a substrate on a flexible joint preferably includes the first elongated member 102 that is adapted to pivot relative to the upper end of the second elongated member 110. In one embodiment, the flexible joint 118 permits the first and second elongated members 102, 110 to move between an extended configuration that defines an angle of about zero degrees and a flexed configuration defining an angle of about 150 degrees. Thus, in one embodiment, the flexing and extending range of motion for the system may be about 0-150 degrees. Referring to FIGS. 20 and 21A-21B, in one embodiment, the system 100 may include an angle dial 290 having indicia 292 provided thereon for determining the angle formed between the longitudinal axis $A_2$ of the first elongated member 102 and the longitudinal axis $A_3$ of the second elongated member 110.

Figure 22A:
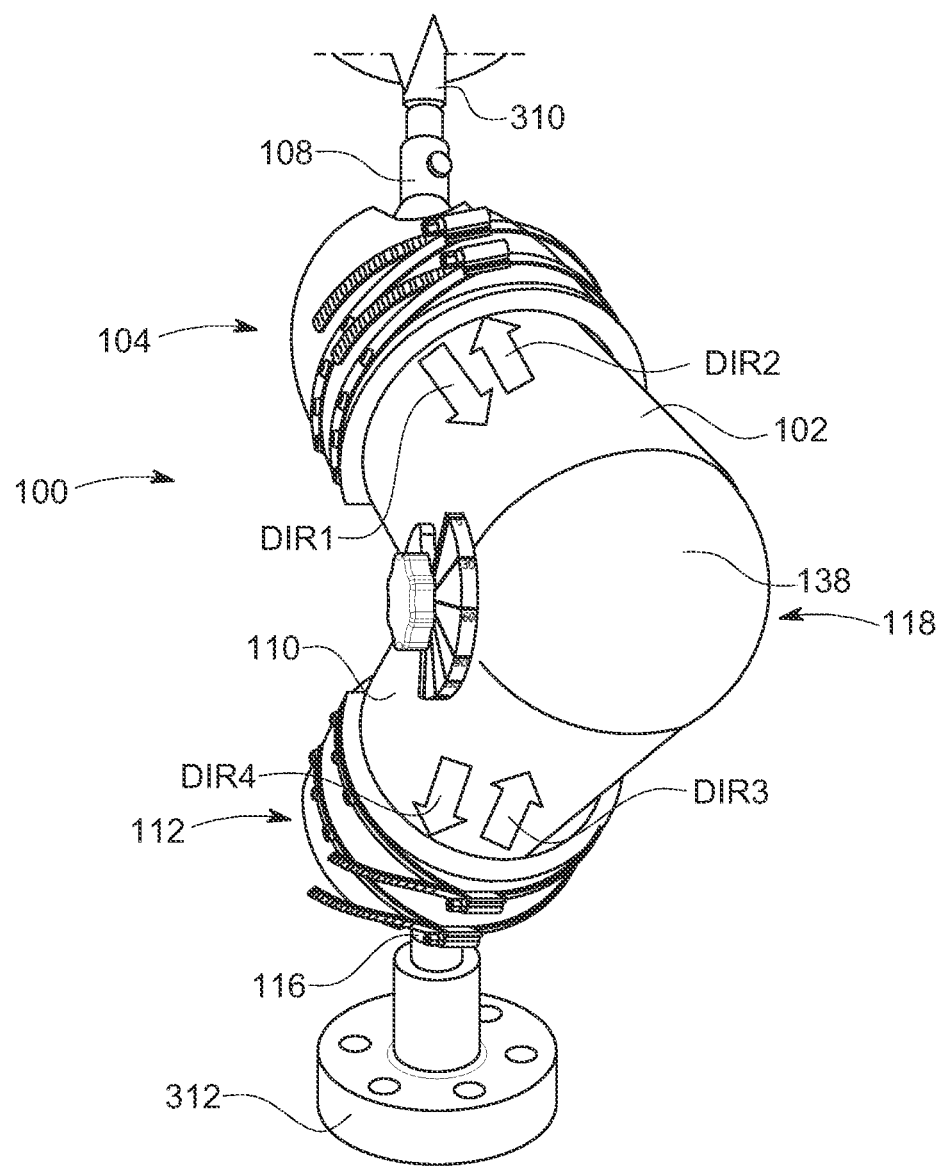
FIG. 22A shows a system for testing a substrate on a flexible joint, in accordance with one embodiment of the present patent application.

Referring to FIG. 22A, in one embodiment, a system 100 having a flexible joint 118 may be utilized for testing a substrate. In one embodiment, the system 100 preferably includes a first elongated member 102 having a lower end with a semi-spherical concave bottom surface 136 (FIG. 3A) and a second elongated member 110 having an upper end with a semi-spherical convex surface 138. In one embodiment, the system 100 desirably includes a first external connector 108 that secures the upper end of the first elongated member 102 to a first external component 310 (e.g., an actuator), and a second external connector 116 that secures the lower end of the second elongated member 110 to a second external component 312 (e.g., a stationary base). In one embodiment, the connection of the first external connector 108 to the first external component 310 may result in the ability to move the first and second elongated members 102, 110 between a substantially extended configuration and a flexed configuration for evaluating a substrate.

In one embodiment, the system 100 preferably includes a first clamping assembly 104 is adapted to slide over the outer surface of the first elongated member 102 in the directions indicated DIR1 (i.e., toward the lower end of the first elongated member) and DIR2 (i.e., toward the upper end of the first elongated member). The movement in the directions DIR1 and DIR2 is preferably along a longitudinal axis of the first elongated member. In one embodiment, as it moves in the direction DIR1, the first clamping assembly 104 compresses the first clamping assembly springs. After energy is stored in the first clamping assembly springs, the first clamping assembly springs urge the first clamping assembly toward the upper end of the first elongated member 102 in the direction DIR2.

In one embodiment, the second clamping assembly 112 is adapted to slide over the outer surface of the second elongated member 110 in the directions indicated DIR3 (i.e., toward the upper end of the second elongated member) and DIR4 (i.e., toward the lower end of the second elongated member). The movement in the directions DIR3 and DIR4 is preferably along a longitudinal axis of the second elongated member 110. In one embodiment, as it moves in the direction DIR3, the second clamping assembly 112 compresses the second clamping assembly springs. After energy is stored in the second clamping assembly springs, the second clamping assembly springs urge the second clamping assembly toward the lower end of the second elongated member 110 in the direction DIR4.

Figure 22B:
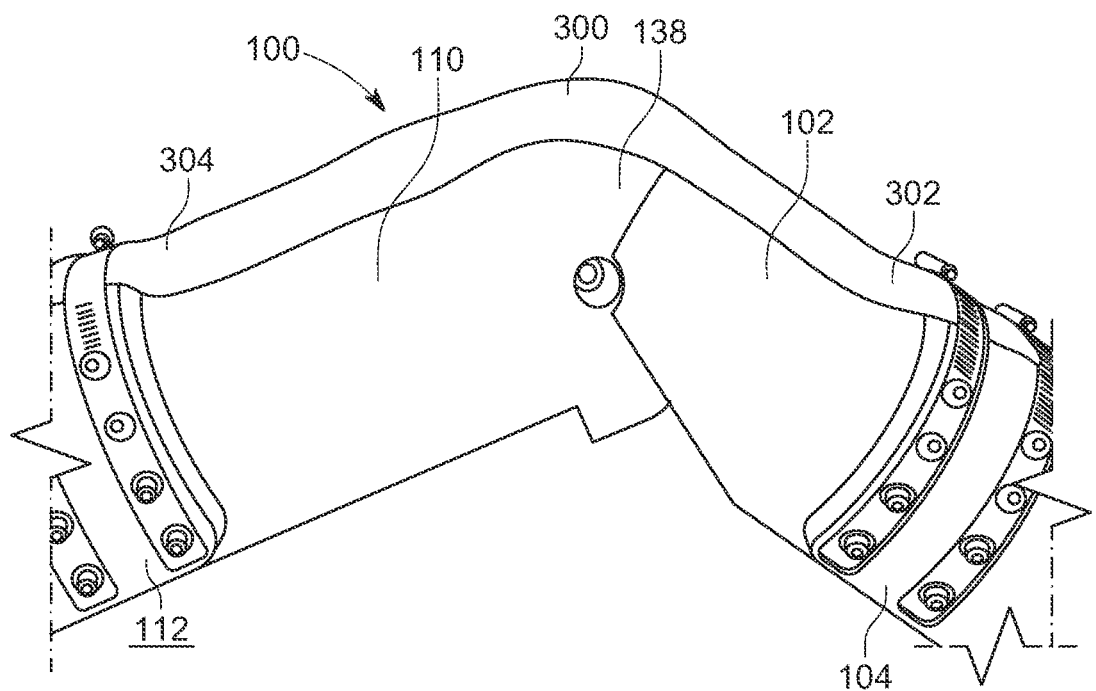
FIG. 22B shows a method of attaching a substrate to the flexible joint shown in FIG. 22A, in accordance with one embodiment of the present patent application.
Figure 22C:
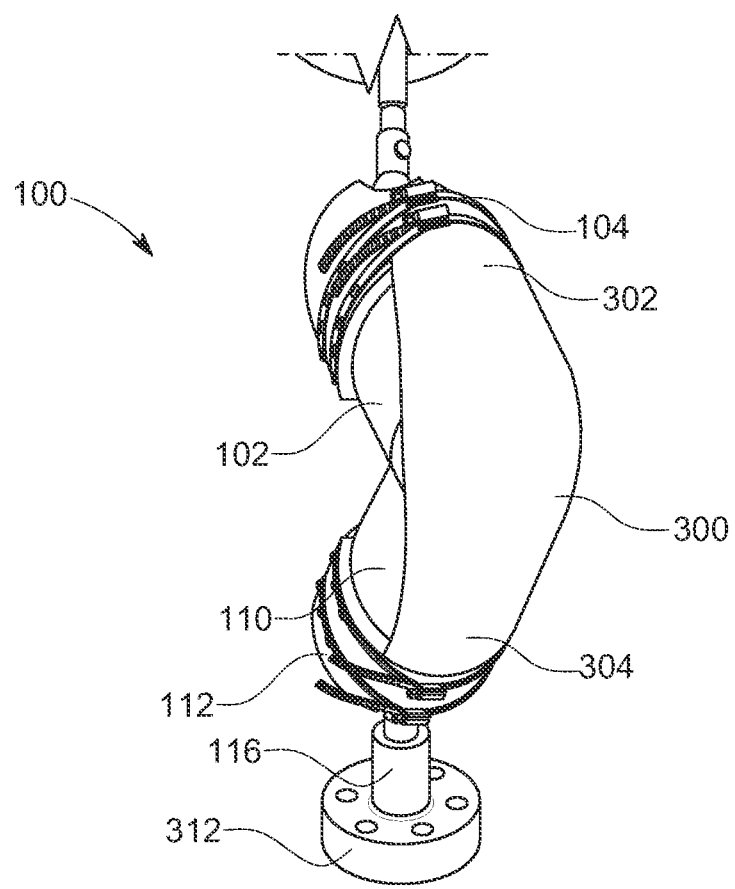
FIG. 22C the flexible joint and the substrate of FIG. 22B in a vertical orientation for testing the substrate, in accordance with one embodiment of the present patent application.

Referring to FIGS. 22B and 22C, in one embodiment, the system 100 preferably includes the first clamping assembly 104 for securing a first end 302 of the substrate 300 to the first elongated member 102 and a second clamping assembly 112 for securing a second end 304 of the substrate 300 to the second elongated member 110.

The substrate 300 may be a pliable substrate that conforms to the outer surfaces of the first and second elongated members 102, 110. In one embodiment, the substrate 300 is adapted to conform to the shapes (e.g., cylindrical surface, convex surfaces, semi-spherical convex surfaces) of the underlying first and second elongated members 102, 110, respectively. In one embodiment, the substrate 300 may be pliable and may be made of polymers, human tissue, human skin, animal tissue and/or animal skin.

Referring to FIG. 22C, in one embodiment, with the substrate 300 secured to the first and second clamping assemblies 104, 112, the system 100 may be secured to a testing machine such as an INSTRON® testing machine. In one embodiment, the first external connector 108 at the upper end of the system 100 is secured to a movable actuator 310 and the second external connector 116 at the lower end of the system is secured to a stationary base 312. In one embodiment, the substrate 300 is positioned over the front of the flexible joint 118.

In one embodiment, the first external connector 108 is cycled up and down by the actuator for moving the flexible joint between a relatively straight configuration and an angulated configuration. The range of motion may be between about 0-150 degrees. The substrate 300 preferably includes a wound closure product 325 (e.g., adhesive, mesh/adhesive, sutures, staples) that has been used to close a surgical opening on the substrate. During testing of the substrate, the efficacy of the wound closure product 325 will be evaluated.

Figure 23A:
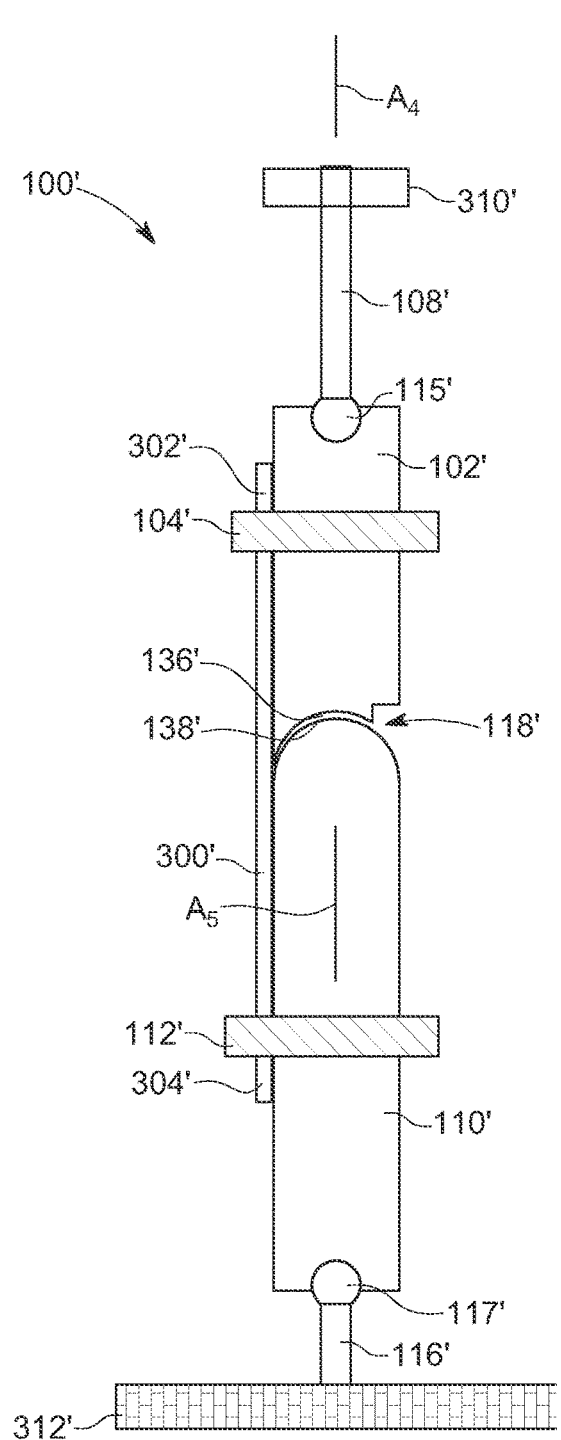
FIG. 23A is a schematic view of a system for testing substrates, in accordance with one embodiment of the present patent application.
Figure 23B:
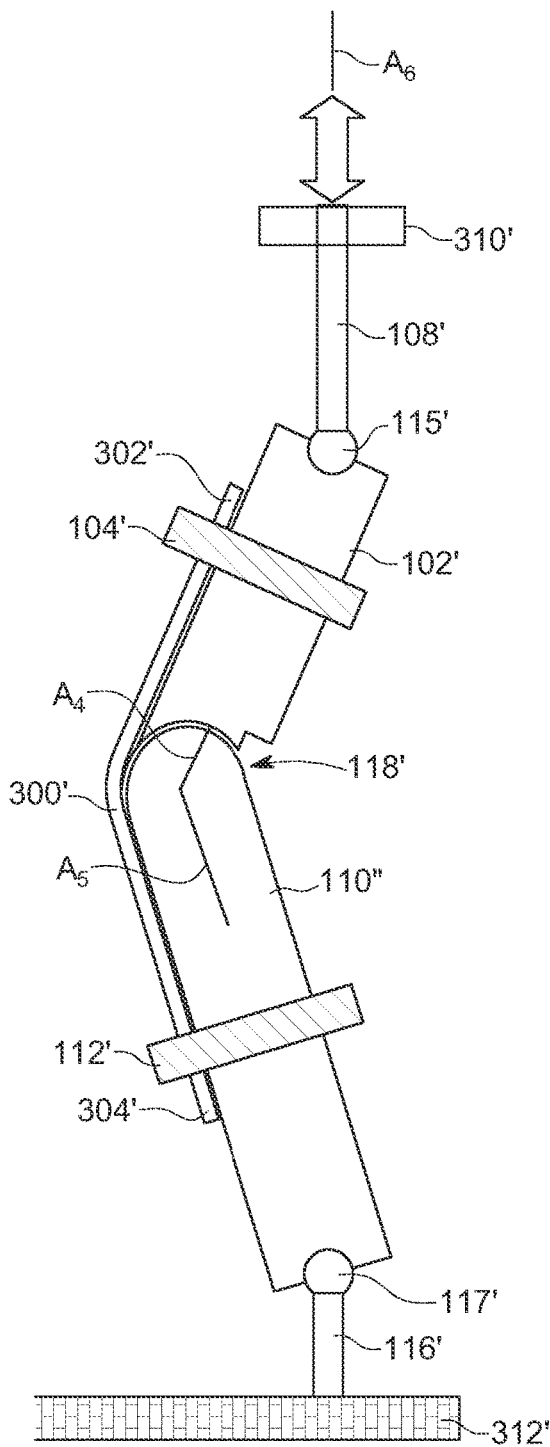
FIG. 23B is another schematic view of the system shown in FIG. 23A with a first elongated member angled relative to a second elongated member, in accordance with one embodiment of the present patent application.

Referring to FIGS. 23A and 23B, in one embodiment, a system 100' for testing substrates preferably includes a first elongated member 102' having an upper end, a lower end, a first longitudinal axis $A_4$ extending between the upper and lower ends, and a concave surface 136' located at the lower end. In one embodiment, the system includes a first clamping assembly 104' coupled with the first elongated member. The first clamping assembly 104' is configured to move over an outer surface of the first elongated member 102' and along the first longitudinal axis $A_4$ between the upper and lower ends of the first elongated member. In one embodiment, the first clamping assembly may include one or more first clamping assembly springs (not shown) that normally urge the first clamping assembly 104' away from the lower end of the first elongated member and toward the upper end of the first elongated member.

In one embodiment, the first clamping assembly 104' may be pulled toward the lower end of the first elongated member 102' (e.g., when a substrate is under tension) for compressing the one or more first clamping assembly springs. In one embodiment, when the first clamping assembly 104' is no longer being pulled toward the lower end of the first elongated member and is free to move toward the upper end of the first elongated member, any energy previously stored in the first clamping assembly springs will urge the first clamping assembly to move away from the lower end of the first elongated member and toward the upper end of the first elongated member.

In one embodiment, the system 100' may include a first external connector 108' having a lower end with a pivot connection 115' that is pivotally connected with the upper end of the first elongated member 102'. The first external connector 108' may have an upper end that is connected to an external component 310' such as an actuator for moving the upper end of the first elongated element 102' up and down (e.g., an INSTRON® testing system).

In one embodiment, the system 100' for testing substrates preferably includes a second elongated member 110' having an upper end, a lower end, a second longitudinal axis $A_5$ extending between the upper and lower ends, and a convex surface 138' located at the upper end. In one embodiment, the system includes a second clamping assembly 112' coupled with the second elongated member. The second clamping assembly 112' is configured to move over an outer surface of the second elongated member 110' and along the second longitudinal axis $A_5$ between the upper and lower ends of the second elongated member. In one embodiment, the second clamping assembly 112' may include one or more second clamping assembly springs (not shown) that normally urge the second clamping assembly 112' away from the upper end of the second elongated member.

In one embodiment, the second clamping assembly 112' may be pulled toward the upper end of the second elongated member 110' (e.g., when a substrate is under tension) for compressing the one or more second clamping assembly springs. In one embodiment, when the second clamping assembly 112' is no longer being pulled toward the upper end of the second elongated member and is free to move toward the lower end of the second elongated member, any energy previously stored in the second clamping assembly springs will urge the second clamping assembly to move away from the upper end of the second elongated member 110' and toward the lower end of the second elongated member.

In one embodiment, the system 100' may include a second external connector 116' having an upper end with a pivot connection 117' that is pivotally connected with the lower end of the second elongated member 110'. The second external connector may have a lower end that is connected to an external component such as a stationary base 312'.

In one embodiment, a substrate 300', such as a pliable substrate, may be positioned over respective outer surfaces of the first elongated member 102' and the second elongated member 110'. The substrate 300' has an upper end 302' secured to the first clamping assembly 104' and a lower end 304' secured to the second clamping assembly 112'. In one embodiment, the actuator 310' may be cycled up and down along an axis $A_6$ for moving the system 100' between an extended configuration shown in FIG. 23A and a flexed configuration shown in FIG. 23B. As the system moves between the extended and flexed positions, the concave surface 136' at the lower end of the first elongated member 102' slides over the convex surface 138' at the upper end of the second elongated member 110'.

In the flexed position shown in FIG. 23B, the first elongated member 102' extends along the longitudinal axis A4 and the second elongated member 110' extends along the longitudinal axis A5 that defines an angle with axis A4. In the flexed position, the substrate 300' is under tension whereupon the first end 302' of the substrate pulls the first clamping assembly 104' toward the lower end of the first elongated member 102' for compressing the one or more first clamping assembly springs and the second end of the substrate pulls the second clamping assembly 112' toward the upper end of the second elongated member 110' for compressing the one or more second clamping assembly springs.

When the actuator 310' returns the system back to the extended position (FIG. 23A), the longitudinal axis $A_4$ of the first elongated member 102' and the longitudinal axis $A_5$ of the second longitudinal member 110' are substantially parallel to one another and/or the axes $A_4$ and $A_5$ define a smaller angle than the angle formed in the flexed position shown in FIG. 23B. In the extended position, the substrate 300' is not under tension whereupon the at least one clamping assembly spring urges the first clamping assembly 104' toward the upper end of the first elongated member 102' and the at least one second clamping assembly spring urges the second clamping assembly 112' toward the lower end of the second elongated member 110'.

In one embodiment, the substrate 300' engages and/or slides over the convex surface 138' at the upper end of the second elongated member 110'. In one embodiment, the substrate 300' is in contact with a larger surface area of the convex surface 138' when the system is in the flexed configuration (FIG. 23A) and a smaller surface area of the convex surface 138' when the system is in the extended configuration (FIG. 23B).

Figure 24:
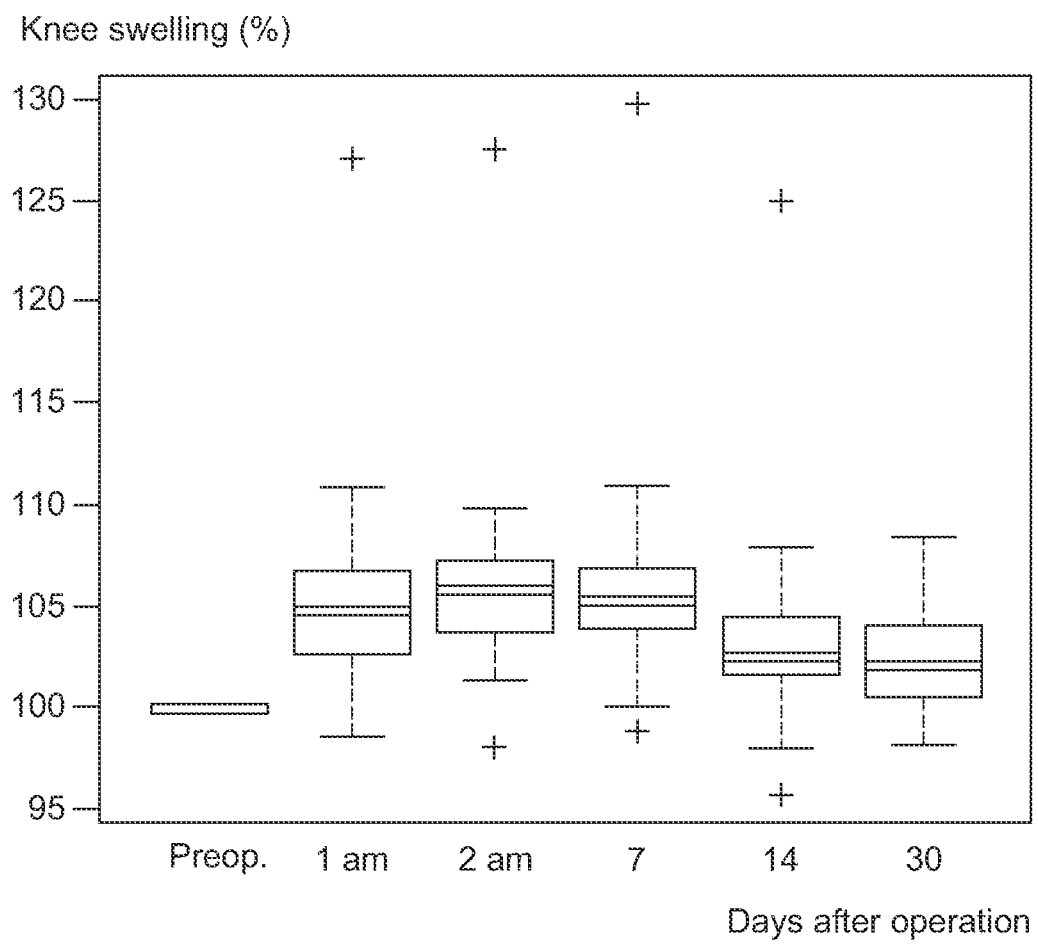
FIG. 24 is a chart that plots postoperative knee swelling, in accordance with one embodiment of the present patent application.

Referring to FIG. 24, after knee surgery, it has been recorded that maximum swelling occurs at about 24 hours after the surgery and then begins to diminish at around one week after the surgery. See Munk et al., "Early Recovery After Fast-Track Oxford Unicompartmental Knee Arthroplasty," *Acta Orthopaedica*, Volume 83(1), Feb. 8, 2012, pages 41-45. See also Ross et al., "Thigh and Calf Girth Following Knee Injury and Surgery," Journal of Orthopaedic & Sports Physical Therapy," Volume 27(1), January 1998, pages 9-15. In one embodiment, a system for testing substrates may include a volume adjustable body that may be modified to evaluate the performance of substrates under different percentages of post-operative swelling.

Figure 25A:
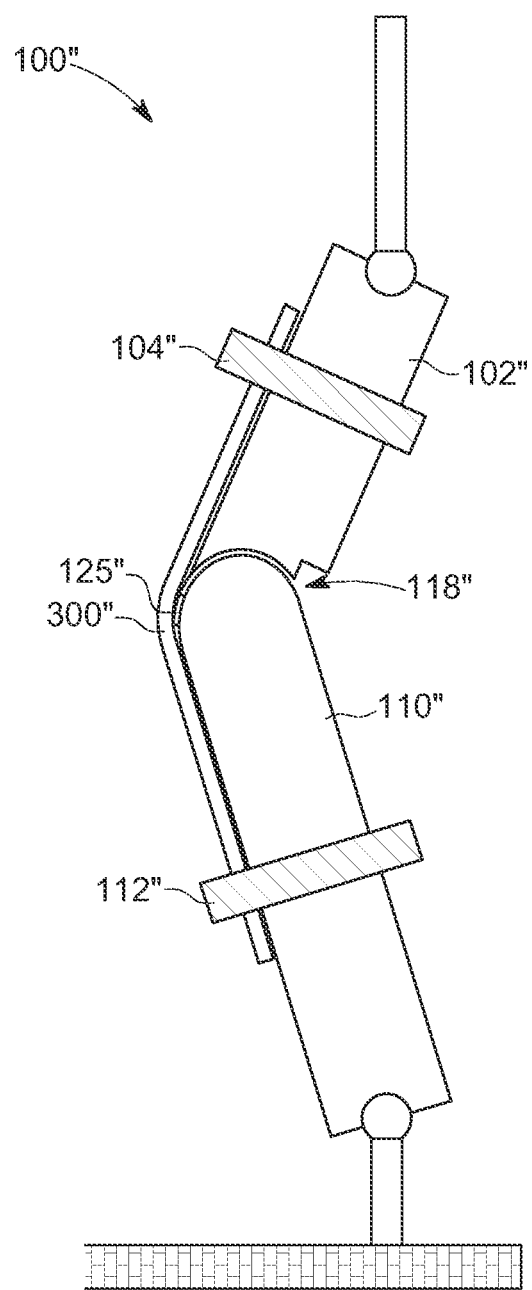
FIG. 25A is a schematic view of a system including an inflatable bladder for testing substrates, in accordance with one embodiment of the present patent application.
Figure 25B:
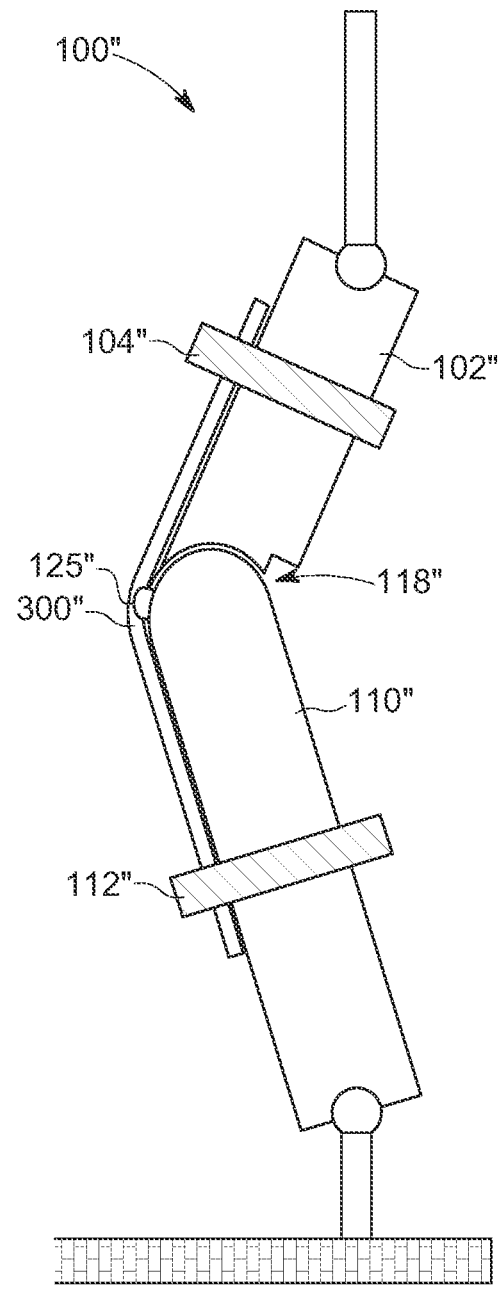
FIG. 25B is another schematic view of the system shown in FIG. 25A after the inflatable bladder has been filled with a fluid, in accordance with one embodiment of the present patent application.

Referring to FIGS. 25A and 25B, in one embodiment, a system 100" for testing substrates 300" is preferably configured to evaluate the effects of post-operative knee swelling by providing a volume adjustable bladder 125" that may be positioned between an underside of the substrate 300" and outer surfaces of first and second elongated members 102" and 110".

In one embodiment, an upper end 302" of the substrate 300" is secured to a first clamping assembly 104" on the first elongated member 102" and a lower end 304" of the substrate 300" is secured to a second clamping assembly 112" of the second elongated member 110". In FIG. 25A, the volume adjustable bladder 125" is not inflated and is substantially flat so that is conforms to the shape of the convex outer surface at the upper end of the second elongated member. In FIG. 25B, the volume adjustable bladder 125" is filled with a fluid (e.g., saline solution) for simulating swelling of a knee or joint. With the bladder 125" at least partially filled, the system may be moved between extended and flexed positions for testing the substrate 300". The volume of the bladder 125" may be adjusted during testing to simulate the percentage of swelling of a joint at particular time periods after surgery.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A mechanical testing system comprising:
   a first elongated member having an outer end and an inner end;
   a second elongated member having an outer end and an inner end, wherein the inner end of said second elongated member opposes the inner end of said first elongated member;
   a joint interconnecting said first elongated member and said second elongated member for enabling said first and second elongated members to move relative to one another;
   a first clamping assembly coupled with said first elongated member, said first clamping assembly including at least one first clamping assembly spring that urges said first clamping assembly away from the inner end of said first elongated member; and
   a second clamping assembly coupled with said second elongated member, said second clamping assembly including at least one second clamping assembly spring that urges said second clamping assembly away from the inner end of said second elongated member.

2. The system as claimed in claim 1, wherein the inner end of said first elongated member has a concave surface and the inner end of said second elongated member has a convex surface that opposes the concave surface of said first elongated member, and wherein the concave surface of said first elongated member and the convex surface of said second elongated member are adapted to slide over one another as said first and second elongated members move relative to one another.

3. The system as claimed in claim 2, wherein the concave surface at the inner end of said first elongated member comprises a semi-spherical concave surface, and wherein the convex surface at the inner end of said second elongated member comprises a semi-spherical convex surface.

4. The system as claimed in claim 1, wherein said joint comprises a hinge joint that limits movement of said first and second elongated members to one axis when moving between an extended configuration and a flexed configuration.

5. The system as claimed in claim 4, wherein said hinge joint comprises:
   a first end that is fixedly secured to said first elongated member;
   a second end that is pivotally secured to said second elongated member;
   the second end of said hinge joint including an opening; and
   a pivot pin extending laterally through said second elongated member and the opening at the second end of said hinge joint for pivotally securing said first elongated member to said second elongated member.

6. The system as claimed in claim 1, further comprising a substrate having a first end secured to said first clamping assembly, a second end secured to said second clamping assembly, and an intermediate section overlying said joint, wherein said substrate overlies and conforms to outer surfaces of said respective first and second elongated members.

7. The system as claimed in claim 6, wherein said substrate comprises pliable materials selected from the group consisting of polymers, human tissue, human skin, animal tissue, and animal skin.

8. The system as claimed in claim 6, further comprising:
   said first clamping assembly including a first roughened surface and at least one first clamping assembly locking band for securing the first end of said substrate against said first roughened surface; and
   said second clamping assembly including a second roughened surface and at least one second clamping assembly locking band for securing the second end of said substrate against said second roughened surface.

9. The system as claimed in claim 8, wherein the outer surface of said first elongated member has a cylindrical shape, and wherein said first clamping assembly comprises:
   a first clamping assembly sleeve adapted to slide over the cylindrical-shaped outer surface of said first elongated member;
   said first clamping assembly sleeve including said first roughened surface in contact with the first end of said substrate;
   said at least one first clamping assembly spring of said first clamping assembly extending between the outer end of said first elongated member and a spring engaging surface on said first clamping assembly sleeve for urging said first clamping assembly sleeve away from the inner end of said first elongated member.

10. The system as claimed in claim 9, wherein the outer surface of said second elongated member has a cylindrical shape, and wherein said second damping assembly comprises:
    a second damping assembly sleeve adapted to slide over the cylindrical-shaped outer surface of said second elongated member;
    said second damping assembly sleeve including said second roughened surface in contact with the second end of said substrate;
    said at least one second damping assembly spring extending between the outer end of said second elongated member and a spring engaging surface on said second damping assembly sleeve for urging said second clamping assembly sleeve away from the inner end of said second elongated member.

11. The system as claimed in claim 10, further comprising:
    at least one first clamping assembly fastener for securing said first clamping assembly sleeve to the outer end of said first elongated member, wherein said at least one first clamping assembly fastener has an elongated shaft with a non-threaded section, and wherein said at least one first clamping assembly spring extends over the non-threaded section of said elongated shaft of said at least one first clamping assembly fastener; and
    at least one second clamping assembly fastener for securing said second clamping assembly sleeve to the outer end of said second elongated member, wherein said at least one second clamping assembly fastener has an elongated shaft with a non-threaded section, and wherein said at least one second clamping assembly spring extends over the non-threaded section of said elongated shaft of said at least one second clamping assembly fastener.

12. The system as claimed in claim 1, further comprising:
a first external connector having an end pivotally secured to the outer end of said first elongated member;
a second external connector having an end pivotally secured to the outer end of said second elongated member.

13. The system as claimed in claim 12, further comprising:
an actuator connected to a second end of said first external connector;
a stationary base connected to a second end of said second external connector, wherein said actuator is configured to cycle between a first position and a second position for moving said first and second elongated members between an extended configuration and a flexed configuration as the second end of said second elongated member remains connected to said stationary base through said second external connector.

14. A mechanical testing system comprising:
a first elongated member including an outer end, an inner end, an outer surface having a cylindrical shape that extends between the outer end to the inner end, and a semi-spherical concave surface at the inner end;
a second elongated member including an outer end, an inner end, and an outer surface having a cylindrical shape that extends between the outer end and the inner end of said second elongated member, the inner end of said second elongated member including a semi-spherical convex surface that opposes the semi-spherical concave surface at the inner end of said first elongated member;
a joint interconnecting the inner end of said first elongated member and the inner end of said second elongated member for guiding sliding movement of the semi-spherical concave surface of said first elongated member over the semi-spherical convex surface of said second elongated member as said first and second elongated members move between an extended configuration and a flexed configuration;
a first clamping assembly coupled with said first elongated member, said first clamping assembly including at least one first clamping assembly spring that urges said first clamping assembly away from the inner end of said first elongated member;
a second clamping assembly coupled with said second elongated member, said second clamping assembly including at least one second clamping assembly spring that urges said second clamping assembly away from the inner end of said second elongated member.

15. The system as claimed in claim 14, further comprising:
said first clamping assembly including a first clamping assembly sleeve configured to slide over the cylindrical-shaped outer surface of said first elongated member, said at least one first clamping assembly spring extending between the outer end of said first elongated member and an opposing spring engaging surface on said first clamping assembly sleeve for urging said first damping assembly sleeve away from the inner end of said first elongated member;
said second damping assembly including a second clamping assembly sleeve configured to slide over the cylindrical-shaped outer surface of said second elongated member, said at least one second clamping assembly spring extending between the outer end of said second elongated member and an opposing spring engaging surface on said second clamping assembly sleeve for urging said second clamping assembly sleeve away from the inner end of said second elongated member.

16. The system as claimed in claim 15, further comprising:
a flexible substrate having a first end and a second end;
the first end of said flexible substrate being secured to said first clamping assembly sleeve;
the second end of said flexible substrate being secured to said second clamping assembly sleeve, wherein when said first and second elongated members are in the flexed configuration said flexible substrate is under tension for pulling said first and second clamping assembly sleeves toward the inner ends of said respective first and second elongated members for compressing said at least one first clamping assembly spring and said at least one second clamping assembly spring.

17. The system as claimed in claim 16, wherein said flexible substrate comprises a pliable material that conforms to the cylindrical-shaped outer surfaces of said respective first and second elongated members as said first and second elongated members move between the extended configuration and the flexed configuration, and wherein said pliable material is in contact with a greater area of the semi-spherical convex surface of said second elongated member when said first and second elongated members are in the flexed configuration and a smaller area of the semi-spherical convex surface of said second elongated member when said first and second elongated members are in the extended configuration.

18. The system as claimed in claim 14, wherein said joint comprises a hinge joint that limits the movement of said first and second elongated members between the flexed configuration and the extended configuration to a single plane.

19. The system as claimed in claim 14, further comprising:
a first external connector having an end pivotally secured to the outer end of said first elongated member;
a second external connector having an end pivotally secured to the outer end of said second elongated member;
an actuator connected to an opposite end of said first external connector;
a stationary base connected to an opposite end of said second external connector, wherein said actuator is configured to cycle between a first position and a second position for moving said first and second elongated members between the extended configuration and the flexed configuration.

20. A system for testing a substrate comprising:
a first elongated member including an outer end, an inner end, an outer surface that extends between the outer and inner ends, and a concave surface at the inner end;
a second elongated member including an outer end, an inner end, and an outer surface that extends between the outer and inner ends of said second elongated member, the inner end of said second elongated member including a convex surface that opposes the concave surface at the inner end of said first elongated member;
a joint interconnecting said first elongated member and said second elongated member for guiding sliding movement of the concave surface of said first elongated member over the convex surface of said second elongated member, wherein said joint is moveable between an extended position and a flexed position;
a first clamping assembly coupled with said first elongated member, said first clamping assembly including at least one first clamping assembly spring that urges said first clamping assembly away from the inner end of said first elongated member;

a second clamping assembly coupled with said second elongated member, said second clamping assembly including at least one second clamping assembly spring that urges said second clamping assembly away from the inner end of said second elongated member;

the substrate overlying the outer surfaces of said respective first and second elongated members, said substrate having a first end secured to said first clamping assembly and a second end secured to said second clamping assembly.

21. The system as claimed in claim 20, wherein when said joint is in the flexed position, said substrate is under tension for pulling said first clamping assembly toward the inner end of said first elongated member to compress said at least one first clamping assembly spring and pulling said second clamping assembly toward the inner end of said second elongated member to compress said at least one second clamping assembly spring.

22. The system as claimed in claim 20, wherein said concave surface at the inner end of said first elongated member comprises a semi-spherical concave surface, and wherein said convex surface at the inner end of said second elongated member comprises a semi-spherical convex surface.

23. The system as claimed in claim 20, wherein the outer surface of said first elongated member has a cylindrical shape, and wherein said first clamping assembly comprises:

a first clamping assembly sleeve adapted to slide over the cylindrical-shaped outer surface of said first elongated member;

said first clamping assembly sleeve including a first roughened surface in contact with the first end of said substrate;

at least one first clamping assembly locking band for securing the first end of said substrate against the first roughened surface of said first clamping assembly sleeve;

said at least one first clamping assembly spring of said first clamping assembly extending between the outer end of said first elongated member and a spring engaging surface on said first clamping assembly sleeve for urging said first clamping assembly sleeve away from the inner end of said first elongated member.

24. The system as claimed in claim 23, wherein the outer surface of said second elongated member has a cylindrical shape, and wherein said second clamping assembly comprises:

a second clamping assembly sleeve adapted to slide over the cylindrical-shaped outer surface of said second elongated member;

said second clamping assembly sleeve including a second roughened surface in contact with the second end of said flexible substrate;

at least one second clamping assembly locking band for securing the second end of said substrate against the second roughened surface of said first clamping assembly sleeve;

said at least one second clamping assembly spring extending between the outer end of said second elongated member and a spring engaging surface on said second clamping assembly sleeve for urging said second clamping assembly away from the inner end of said second elongated member.

25. The system as claimed in claim 24, further comprising:

at least one first clamping assembly fastener for securing said first clamping assembly sleeve to the outer end of said first elongated member, wherein said at least one first clamping assembly fastener has an elongated shaft with a non-threaded section, and wherein said at least one first clamping assembly spring extends over the non-threaded section of said elongated shaft of said at least one first clamping assembly fastener; and at least one second clamping assembly fastener for securing said second clamping assembly sleeve to the outer end of said second elongated member, wherein said at least one second clamping assembly fastener has an elongated shaft with a non-threaded section, and wherein said at least one second clamping assembly spring extends over the non-threaded section of said elongated shaft of said at least one second clamping assembly fastener.

* * * * *